(12) United States Patent
Bucuvalas et al.

(10) Patent No.: US 11,720,334 B2
(45) Date of Patent: *Aug. 8, 2023

(54) INDUCTIVE EQUIVALENCE IN MACHINE-BASED INSTRUCTION EDITING

(71) Applicant: PHASE CHANGE SOFTWARE LLC, Golden, CO (US)

(72) Inventors: Steven Bucuvalas, Bernalillo, NM (US); Hugolin Bergier, Boulder, CO (US)

(73) Assignee: PHASE CHANGE SOFTWARE LLC, Golden, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/482,745

(22) Filed: Sep. 23, 2021

(65) Prior Publication Data

US 2022/0012027 A1 Jan. 13, 2022

Related U.S. Application Data

(63) Continuation of application No. 16/769,077, filed as application No. PCT/US2017/064710 on Dec. 5, 2017, now Pat. No. 11,157,250.

(51) Int. Cl.
*G06F 8/41* (2018.01)
*G06F 8/36* (2018.01)

(52) U.S. Cl.
CPC ............ *G06F 8/443* (2013.01); *G06F 8/36* (2013.01); *G06F 8/427* (2013.01)

(58) Field of Classification Search
CPC ............ G06F 8/443; G06F 8/36; G06F 8/427
(Continued)

(56) References Cited

U.S. PATENT DOCUMENTS 6,021,220 A * 2/2000 Anderholm .......... G06K 9/6256
382/224
6,026,241 A 2/2000 Chow et al.
(Continued)

FOREIGN PATENT DOCUMENTS

WO WO 2016/130542 8/2016
WO WO 2016/130551 8/2016

OTHER PUBLICATIONS

Alhusain et al, "Towards Machine Learning Based Design Pattern Recognition", IEEE, pp. 244-251 (Year: 2013).*

(Continued)

*Primary Examiner* — Anil Khatri
(74) *Attorney, Agent, or Firm* — Jason H. Vick; Sheridan Ross, PC

(57) ABSTRACT

Computer software development has produced many advances within computer science and in most aspects of modern society. Even with modern quality control, bug finding, and other code checking applications, computer software is often less than ideal. A developer may write code that is functionally accurate but lacks security, documentation, speed, storage, reusability, or other element that may make a segment of software code less than ideal. Identifying equivalent code, within a defined hypothesis strength and/or resource limitation, and, when found, replacing it with a vetted equivalent promotes the deployment of software that is more robust, secure, usable and reusable, and/or satisfies performance or other objectives.

20 Claims, 84 Drawing Sheets

(58) Field of Classification Search
USPC .................................................. 717/124–152
See application file for complete search history.

(56) References Cited

U.S. PATENT DOCUMENTS

| | | | |
|---|---|---|---|
| 6,400,996 B1* | 6/2002 | Hoffberg ................ | G06F 18/00 |
| | | | 700/86 |
| 6,466,923 B1* | 10/2002 | Young .................... | G16B 25/20 |
| | | | 382/103 |
| 6,473,794 B1 | 10/2002 | Guheen et al. | |
| 6,640,249 B1* | 10/2003 | Bowman-Amuah ..... | G06F 8/36 |
| | | | 709/228 |
| 6,662,362 B1* | 12/2003 | Arora .................... | G06F 8/4441 |
| | | | 714/E11.209 |
| 7,203,932 B1* | 4/2007 | Gaudet ............... | G06F 9/45504 |
| | | | 717/136 |
| 7,496,892 B2 | 2/2009 | Nuss | |
| 8,156,481 B1* | 4/2012 | Koh ........................ | G06F 8/35 |
| | | | 717/154 |
| 8,176,468 B2 | 5/2012 | Ogami et al. | |
| 8,234,636 B2 | 7/2012 | Kawahito et al. | |
| 8,561,044 B2 | 10/2013 | Chen et al. | |
| 8,739,144 B2* | 5/2014 | Stoicescu .............. | G06F 8/4435 |
| | | | 717/154 |
| 9,038,037 B1 | 5/2015 | Biggerstaff | |
| 9,128,722 B2* | 9/2015 | Betouin .................. | G06F 8/423 |
| 9,594,849 B1 | 3/2017 | Todd et al. | |
| 9,836,283 B2 | 12/2017 | Pudiyapura et al. | |
| 10,025,566 B1 | 7/2018 | Ahmed et al. | |
| 10,114,624 B1* | 10/2018 | Makkar ............... | G06F 9/30196 |
| 10,133,557 B1 | 11/2018 | Tripathi et al. | |
| 10,296,330 B2 | 5/2019 | Bucuvalas et al. | |
| 10,452,390 B2 | 10/2019 | Bucuvalas et al. | |
| 10,453,117 B1 | 10/2019 | Reavely et al. | |
| 10,521,209 B2* | 12/2019 | Bucuvalas .............. | G06F 8/443 |
| 10,877,748 B2 | 12/2020 | Bucuvalas et al. | |
| 10,884,904 B2 | 1/2021 | Hamilton, II et al. | |
| 11,043,205 B1* | 6/2021 | Su ......................... | G10L 15/183 |
| 11,282,088 B1* | 3/2022 | Lancaster ............ | G06Q 10/083 |
| 11,354,491 B1* | 6/2022 | Wade .................... | G06F 16/258 |
| 11,531,529 B2* | 12/2022 | Zhang .................... | G06N 3/105 |
| 2011/0126179 A1 | 5/2011 | Hartman et al. | |
| 2011/0138362 A1 | 6/2011 | Keidar-Barner et al. | |
| 2011/0225572 A1 | 9/2011 | Stoicescu et al. | |
| 2013/0232468 A1 | 9/2013 | Betouin et al. | |
| 2018/0349106 A1 | 12/2018 | Makkar | |
| 2020/0334021 A1 | 10/2020 | Bucuvalas et al. | |

OTHER PUBLICATIONS

Balanyi et al, "Mining Design Patterns from C++ Source Code", IEEE, pp. 1-10 (Year: 2003).*
Misek et al, "Mapping of Dynamic Language Constructs into Static Abstract Syntax Trees", IEEE, pp. 625-630 (Year: 2010).*
Guan et al, "Research on EEG Signal Recognition Method Based on Whale Algorithm Optimized Support Vector Machine", IEEE, pp. 1-6 (Year: 2020).*
Simao et al, "A Review on Electromyography Decoding and Pattern Recognition for Human-Machine Interaction", IEEE, pp. 39564-39582 (Year: 2019).*
Zheng et al, "An Approach to Constraint Inductive Logic Programming", IEEE, pp. 1597-1601 (Year: 2003).*
Abdel-Galil, et al, "Partial Discharge Pulse Pattern Recognition using an Inductive Inference Algorithm", IEEE, pp. 320-327 (Year: 2005).*
Examiner's Report for Canadian Patent Application No. 2,975,305, dated Jan. 28, 2022.
Notice of Allowance for Israel Patent Application No. 284340, dated Nov. 2, 2021.
Office Action for European Application No. 17825321.7, dated Nov. 23, 2021.
Alhusain, Sultan et al. "Towards Machine Learning Based Design Pattern Recognition" IEEE 2013.
Berners-Lee, Tim "Weaving the Web: The Original Design and Ultimate Destiny of the World Wide Web by its Inventor" Harper Collins, 1999, 231 pages.
Bledsoe, W.W. et al. "Pattern Recognition and Reading by Machine" Proceedings of the Eastern Joint Computer Conference; 1959.
Bradley, Aaron et al. "The Calculus of Computation" ACM Computing Classification; 1198; 377 pages.
Brooks, Jr., Frederick P. The Mythical Man-Month: Essays on Software Engineering (20th Anniversary Edition), 1995, Addison-Wesley, pp. 1-322.
Casella, Francesco et al. "On the Importance of Scaling in Equation-Based Modelling" 8th International Workshop on Equation-Based Object-Oriented Languages and Tools; Weßling Germany; Dec. 1, 2017.
Collard, Jean-Francois "Reasoning About Program Transformations: Imperative Programming and Flow of Data" Springer-Verlag; 2010; 258 pages.
Dargahi, Vahid et al. "A New Control Technique for Improved Active-Neutral-Point-Clamped (I-ANPC) Multilevel Converters Using Logic-Equations Approach" IEEE Transactions on Industry Applicatoins, vol. 56, No. 1; Jan./Feb. 2020.
Dharmapurikar, Sarang et al. "Fast and Scalable Pattern Matching for Content Filtering" Symposium on Architectures for Networking and Communications Systems (ANCS), 2005, pp. 183-192.
Grobe, Daniel et al. "Simulation-Based Equivalence Checking Between SystemC Models at Different Levels of Abstraction" ACM GLSVSI'11, May 2-4, 2011; pp. 223-228.
Gutierrez-Osuna, Ricardo "Pattern Analysis for Machine Olfaction: A Review" IEEE Sensors Journal, vol. 2, No. 3; Jun. 2002.
Ogawa, Hideto et al. "Lessons Learned from Formal Method Applications to Software Development" (Includes an English Translation of the Abstract) Ginowan Paper; Jan. 15, 2015; pp. 43-44.
Kroening, Daniel et al. "Decision Procedures, An Algorithmic Point of View" Second Edition; Springer; 2008.
Manna, Zohar "Mathematical Theory of Computation" McGraw-Hill, New York, 1974; 453 pages.
Sipser, Michael "Introduction to the Theory of Computation" PWS Publishing Company; 1997; 398 pages.
Thole, Niels et al. "Equivalence Checking on ESL Utilizing a Priori Knowledge" 2016 Forum on Specification and Design Languages (FDL), Bremen, 2016, pp. 1-8.
Tóth, Melinda et al. "Pattern Candidate Discovery and Parallelization Techniques" Proceeding IFL 2017 Proceedings of the 29th Symposium on the Implementation and Application of Functional Programming Languages; ACM 2017.
Yun, SangKyun et al. "Optimization of Regular Expression Pattern Matching Circuit Using At-Most Two-Hot Encoding on FPGA" 2010 International Conference on Field Programmable Logic and Applications; IEEE Computer Society; 2010.
International Search Report for International Application No. PCT/US2016/017160, dated Jun. 3, 2016.
Written Opinion for International Application No. PCT/US2016/017160, dated Jun. 3, 2016.
International Preliminary Report on Patentability for International Application No. PCT/US2016/017160, dated Aug. 24, 2017.
Office Action for European Patent Application No. 16709845.8, dated Sep. 22, 2017.
Office Action for European Patent Application No. 16709845.8, dated Feb. 7, 2018.
Summons to Attend Oral Proceedings for European Patent Application No. 16709845.8, dated Oct. 19, 2018.
Provision of the Minutes in Accordance with Rule 124(4) EPC for European Patent Application No. 16709845.8, dated Aug. 5, 2019.
Decision to Refuse a European Patent Application for European Patent Application No. 16709845.8, dated Aug. 7, 2019.
Office Action (Including translation) for Israel Patent Application No. 253424, dated Jun. 22, 2020.
Notice of Allowance for Israel Patent Application No. 253424, dated Apr. 27, 2021.
First Examination Report for Indian Patent Application No. 201717027034, dated Sep. 24, 2020.

(56) References Cited

OTHER PUBLICATIONS

Office Action (including machine translation) for Japanese Patent Application No. 2017-560472, dated Nov. 19, 2019.
International Search Report for International Application No. PCT/US2017/064710, dated Aug. 9, 2018.
Written Opinion for International Application No. PCT/US2017/064710, dated Aug. 9, 2018.
International Preliminary Report on Patentability for International Application No. PCT/US2017/064710, dated Jun. 18, 2020.
Office Action for European Application No. 17825321.7, dated Mar. 31, 2020.
Office Action for U.S. Appl. No. 15/544,377, dated Sep. 6, 2018.
Notice of Allowance for U.S. Appl. No. 15/544,377, dated Mar. 22, 2019.
Office Action for U.S. Appl. No. 16/400,598, dated Jun. 12, 2019.
Notice of Allowance for U.S. Appl. No. 16/400,598, dated Aug. 14, 2019.
Notice of Allowance for U.S. Appl. No. 16/654,650, dated Sep. 2, 2020.
Office Action for U.S. Appl. No. 16/769,077 dated Apr. 9, 2021.
Notice of Allowance for U.S. Appl. No. 16/769,077 dated Aug. 10, 2021.
Notice of Allowance for Canadian Patent Application No. 2,975,305, dated Aug. 24, 2022.
Summons to Attend Oral Proceedings for European Patent Application No. 16709845.8, dated Oct. 18, 2022.

* cited by examiner

Practical and Ugly Problems

CEO's Acquisition Problem:
I want to buy companies to absorb market share and reduce costs with increased operational efficiency Ugly Truths:
Comparing large applications and doing a functional analysis of best processing is never done
Integrating existing capabilities is never done
The "operational" efficiencies are almost never achieved Example: Bank of America and Mortgage In the new *PHASE*, how do you compare/merge two mortgage systems?
Normalize both systems into "databases"
Subtract one from the other
Use "queries" and "views" to zoom in and out on differences
Select best-of-breed capabilities without reading code for the new integrated capability
Do only limited testing to verify the result

*FIG. 10*

Intuition: "I don't believe it"

In the new *PHASE*, how do you compare/merge two mortgage systems?

Normalize both systems into "databases"
Subtract one from the other;
Use "queries" and "views" to zoom in and out on differences
Select best-of-breed capabilities without reading code for the new integrated capability
Do only limited testing to verify the result What seems *intuitively* wrong with this? Much.

Differing programming languages
Differing architectures
Opaque spaghetti source code
Project Cost
Quality
Project Duration
...

*FIG. 11*

Phase and Essence Goals

| | OLD PHASE | NEW PHASE |
|---|---|---|
| Professional Labor | Labor Intensive<br>Slow | Automation Leverages<br>100X Multiplier |
| Quality | Labor Intensive<br>Haphazard<br>Slow | Automatically Verified<br>Often Unnecessary<br>100x Faster |
| Programming Specification | Chaotically Idiosyncratic | Normalized to Coherent |
| Programming Media | Programming Language<br>Important | Programming Languages<br>Peripheral |
| Comprehending System "Knowledge" | Opaque<br>Painful Learning Curve | Transparent<br>Easy Learning Curve |
| Application Architecture | Chaotically Idiosyncratic | Normalized to Coherent |
| Leveraging Application "knowledge" for Productivity | Human Engineers<br>Experience | Application System<br>becomes Active Agent |

*FIG. 12*

AI and the Symbolic Species

- Understanding, either in human or AI starts with an elemental unit, a symbol

- In AI, this extends to the "Physical Symbol Hypothesis," adoption of which is controversial

- It is the first of the fundamental "gates" one must go through to be successful

*the*
SYMBOLIC
SPECIES

Terrence W. Deacon

*FIG. 14*

Formally: What's the Symbol Mean?

Although this sounds like a dinnertime conversation among philosophy majors,
it is the starting point

- A symbol corresponds to a function and its meaning is the function's definition, ultimately expressed in a programming language.

- A specific function corresponds to a specific number (e.g., "1") and the meaning of both is defined in set theory

- This will become clearer and deeper as we proceed

*FIG. 15*

Functional Equivalence (Gate)

- The journey starts with equality

- The core problem is variability in specification:
  - Programming language
  - Many specifications to one behavioral definition

- This variability is a huge source of chaos

FIG. 16

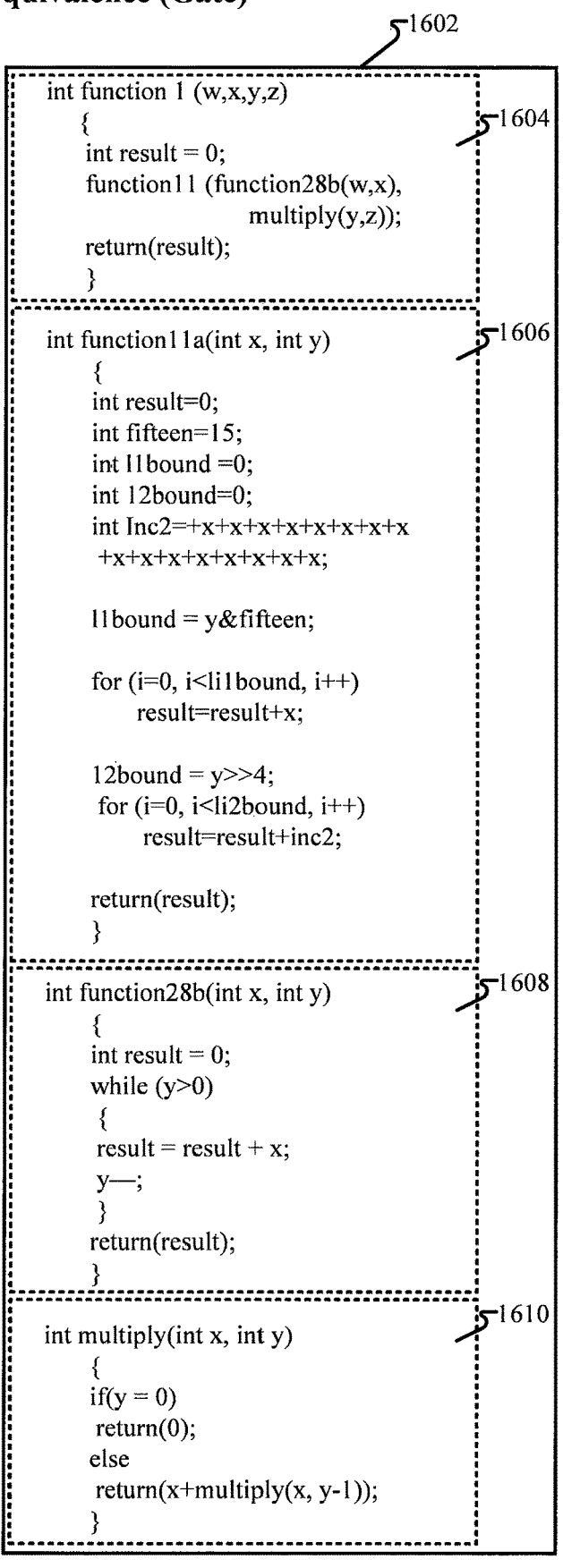

1602

```
int function1 (w,x,y,z)
{
int result = 0;
function11 (function28b(w,x),
                multiply(y,z));
return(result);
}
```
1604

```
int function11a(int x, int y)
{
int result=0;
int fifteen=15;
int l1bound =0;
int l2bound=0;
int Inc2=+x+x+x+x+x+x+x+x
  +x+x+x+x+x+x+x+x;

l1bound = y&fifteen;

for (i=0, i<li1bound, i++)
    result=result+x;

l2bound = y>>4;
for (i=0, i<li2bound, i++)
      result=result+inc2;

return(result);
}
```
1606

```
int function28b(int x, int y)
{
int result = 0;
while (y>0)
{
result = result + x;
y—;
}
return(result);
}
```
1608

```
int multiply(int x, int y)
{
if(y = 0)
 return(0);
else
 return(x+multiply(x, y-1));
}
```
1610

Create Equivalence Class

Use advanced logical and enumerative techniques to determine functional equivalence, for example:

For all x and y,
Function11a(x, y) = function28b(x, y)

Result:
(function1,
{function1}
)

(function11a,
{function11a, function28b, multiply}
)

Consolidate and Update Source

Consolidate and Update Source

Symbols and Source

The function is represented as a symbol;
It means the behavior of each source specification in the equivalence class

- Problem class: Simplification
  - Code cloning, legacy bloat, "subroutine" creation
- Productivity
  - No human needs to read source code; this is a machine algorithm on functions.
  - Human reading vs. invoking algorithm classes: >>100x
- Quality
  - This is a perfect process, no errors. In math-speak: complete and correct (though potentially intractable*)

Implications

*FIG. 21*

Productivity Gain*

Any task involving Reading, Comprehension, Solving

|  | Labor Leverage |
|---|---|
| Mortgage Underwriting | 300x (30,000%) |
| Functional Equivalence | 600x (60,000%) |

*Experiments

Phase, Essence, Intuition

- Only Humans can interpret code, but here no reading required
- Programmer and multiple "specifications" are collapsed to the best specification
- In many cases, testing and verification is not necessary even when doing major changes

*FIG. 23*

Phase and Essence Goals

| | OLD PHASE | NEW PHASE |
|---|---|---|
| Professional Labor | Labor Intensive<br>Slow | Automation Leverages<br>100X Multiplier |
| Quality | Labor Intensive<br>Haphazard<br>Slow | Automatically Verified<br>Often Unnecessary<br>100x Faster |
| Programming Specification | Chaotically Idiosyncratic | Normalized to Coherent |
| Programming Media | Programming Language<br>Important | Programming Languages<br>Peripheral |
| Comprehending System "Knowledge" | Opaque<br>Painful Learning Curve | Transparent<br>Easy Learning Curve |
| Application Architecture | Chaotically Idiosyncratic | Normalized to Coherent |
| Leveraging Application "Knowledge" for Productivity | Human Engineers<br>Experience | Application System<br>becomes Active Agent |

*FIG. 24*

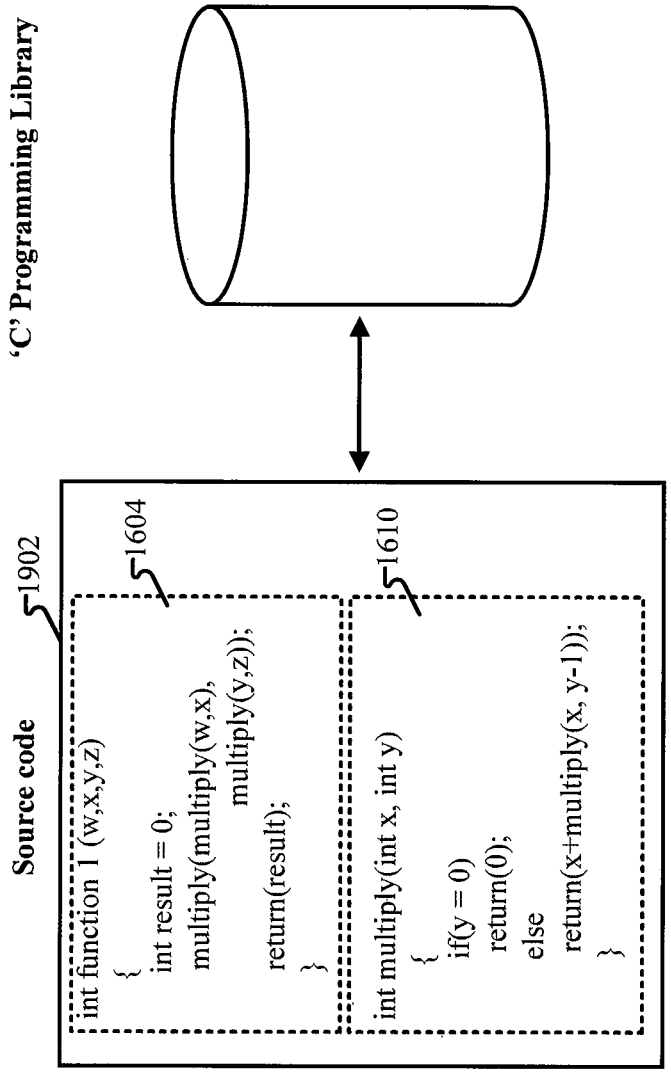
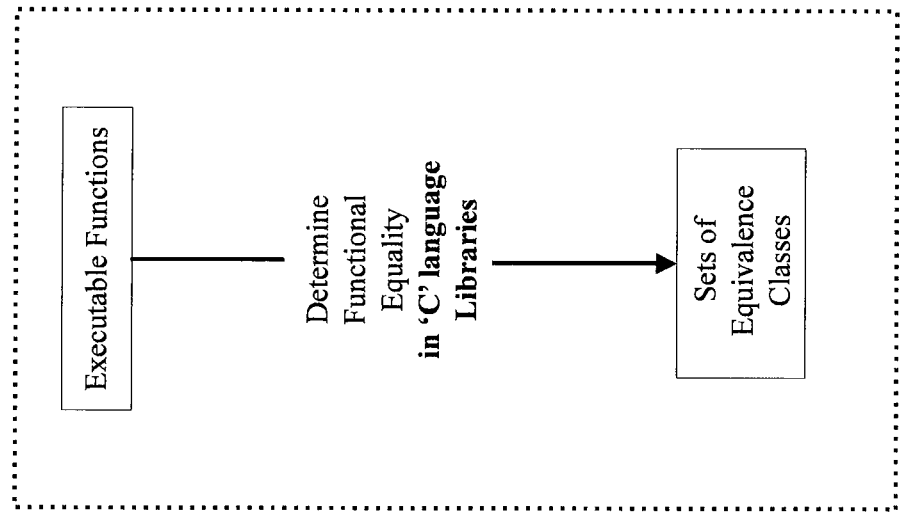
FIG. 27

Implications

- Problem Class: Reuse
  - Component assembly, application libraries, etc.
  - Envision programmer "spell checker" for reuse built into IDE

- Productivity:
  - Same as functional equivalence, >>100x

- Quality
  - Complete and correct

- Implications continue ...
  - Example: the Kernel of Social Computing: using each other's code without talking, meeting, or written documentation

*FIG. 29*

Really a "Phase Change?"

stackoverflow       July 2015

Is finding the equivalence of two functions undecidable?
Is it impossible to know if two functions are equivalent? For example, a compiler writer wants to determine if two functions that the developer has written perform the same operation, what methods can he use to figure that one out? Or what can we do to find out that two TMs are identical? Is there a way to normalize the machines?

Given an arbitrary function, $f$, we define a function $f^{-1}$ which returns $1$ on input $n$ if $f$ halts on input $n$. Now, for some number $x$ we define a function $g$ which, on input $n$, returns $1$ if $n = x$, and otherwise calls $f^{-1}(n)$.

If functional equivalence were decidable, then deciding whether $g$ is identical to $f^{-1}$ decides whether $f$ halts on input $x$. That would solve the Halting problem. Related to this discussion is Rice's theorem.

Conclusion: <u>functional equivalence is decidable.</u>

Paraphrase: we can't do reuse
     because functional equivalence is undecidable This is an Applied vs. Pure category mistake

---

- Aren't people already doing this?
  No.
  - Social media proof from the compiler community
    - 1000's of vicious participants

- These folks are practical; they know the math; they have enormous economic incentive to innovate and yet they don't see it

*FIG. 30*

Functions and Definitions

- There are multiple senses of the word function in computer science
  - The historically mathematical sense of a function
  - The programming language sense, as in a functional language
  - The pragmatic sense, as in: what is the *function* of that tool?

We define *functions* in terms of the historical mathematical sense, as developed in early 20$^{th}$ century computation theory This definition gives us language independence

*FIG. 31*

Math Functions, Not Programming Languages (Gate)

- A programming language function, as in 'C' examples, is syntactic structure

- Using compiler and program analysis techniques, we extract the mathematical functions implicit in the source code

- This makes the "functional symbols" language independent

```
struct Act {
    int Act;
    int cBI;
};

struct Log {
    int fAct;
    char tranId;
    int tranAmt;
    time_t stamp;
};

void
wTran(pw,acct,amt)
    {
    bool scTk;
    int fRate=0. 10,
    char withId='w';
    int fee=10;
    time_t timeStamp;
    Log logRec;
    Act acctRec;

scTk= secChk(pw,acct);
    timeStamp=time(NULL);

actHnd=getHandl("chkAcct");
    lgHnd=getHandl("chkLog");

readDirect(actHnd,acctRec);
    acctRec.cBI=acctRec.cBi-amt;
    logRec.fAct=acct;
    logRec.tranId=withId;
    logRec.tranAmt;
    memcpy (logRec, timeStamp, sizeof (time_t));

if(secTk)
        {
        writeSeq(lgHnd,logRec);
        );

fee=rRate*amt
    acctRec.cBI=acctRec.cBI-fee;
    if(secTk)
        {
        writeDirect(actHnd,acctRec);
        );
    return(NULL);
    }
```

Function: Formal Dependency Analysis

```
void
wTran(pw,acct,amt)
    {
    int fRate=0.10;
    char withId='w';
    int fee=10;
    time_t timeStamp;
    Log logRec
    Act acctRec;

scTk= secChk(pw,acct);
    timeStamp=time(NULL);

actHnd=getHandI("chkAcct");
    lgHnd=getHandI("chkLog");

readDirect(actHnd,acctRec);
    acctRec.cBI=acctRec.cBi-amt;
    logRec.fAct=acct;
    logRec.tranId-withId;
    logRec.tranAmt;
    memcpy (logRec, timeStamp, sizeof (time_t));

if(secTk)
        {
        writeSeq(lgHnd,logRec);
        );

fee=rRate*amt
    acctRec.cBI=acctRec.cBI-fee;
    if(secTk)
        {
        writeDirect(actHnd,acctRec);
        );

return(NULL);
    }
```

For all functions

```
void
wTran(pw,acct,amt)                    ⌐3402
    {
    int fRate=0.10;
    char withId='w';
    int fee=10;
    time_t timeStamp;
    Log logRec
    Act acctRec;

scTk= secChk(pw,acct);
    timeStamp=time(NULL);

actHnd=getHandI("chkAcct");
    lgHnd=getHandI("chkLog");

readDirect(actHnd,acctRec);
    acctRec.cBI=acctRec.cBi-amt;
    logRec.fAct=acct;
    logRec.tranId-withId;
    logRec.tranAmt;
    memcpy (logRec, timeStamp, sizeof (time_t));

if(secTk)
         {
         writeSeq(lgHnd,logRec);
         );

fee=rRate*amt
    acctRec.cBI=acctRec.cBI-fee;
    if(secTk)
         {
         writeDirect(actHnd,acctRec);
         );

return(NULL);
    }
```

*FIG. 34A*

Refactor to Function in 'C'

```c
struct Act {
   int Act;
   int cBI;
};

struct Log {
   int fAct;
   char tranId;
   int tranAmt;
   time_t stamp;
};

void
wTran(pw,acct,amt)
   {
   bool scTk;
   int fRate=0. 10;
   char withId='w';
   int fee=10;
   time_t timeStamp;
   Log logRec;
   Act acctRec;

scTk= secChk(pw,acct);
   timeStamp=time(NULL);

actHnd=getHandI("chkAcct");
   lgHnd=getHandI("chkLog");

readDirect(actHnd,acctRec);
   acctRec.cBI=acctRec.cBi-amt;
   logRec.fAct=acct;
   logRec.tranId=withId;
   logRec.tranAmt;
   memcpy (logRec, timeStamp, sizeof (time_t));

if(secTk)
       {
       writeSeq(IgHnd,logRec);
       );
   fee=rRate*amt
   acctRec.cBI=acctRec.cBI-fee;
   if(secTk)
       {
       writeDirect(actHnd,acctRec);
       );
   return(NULL);
   }
```

Refactor to Function in 'C'
*FIG. 35B*
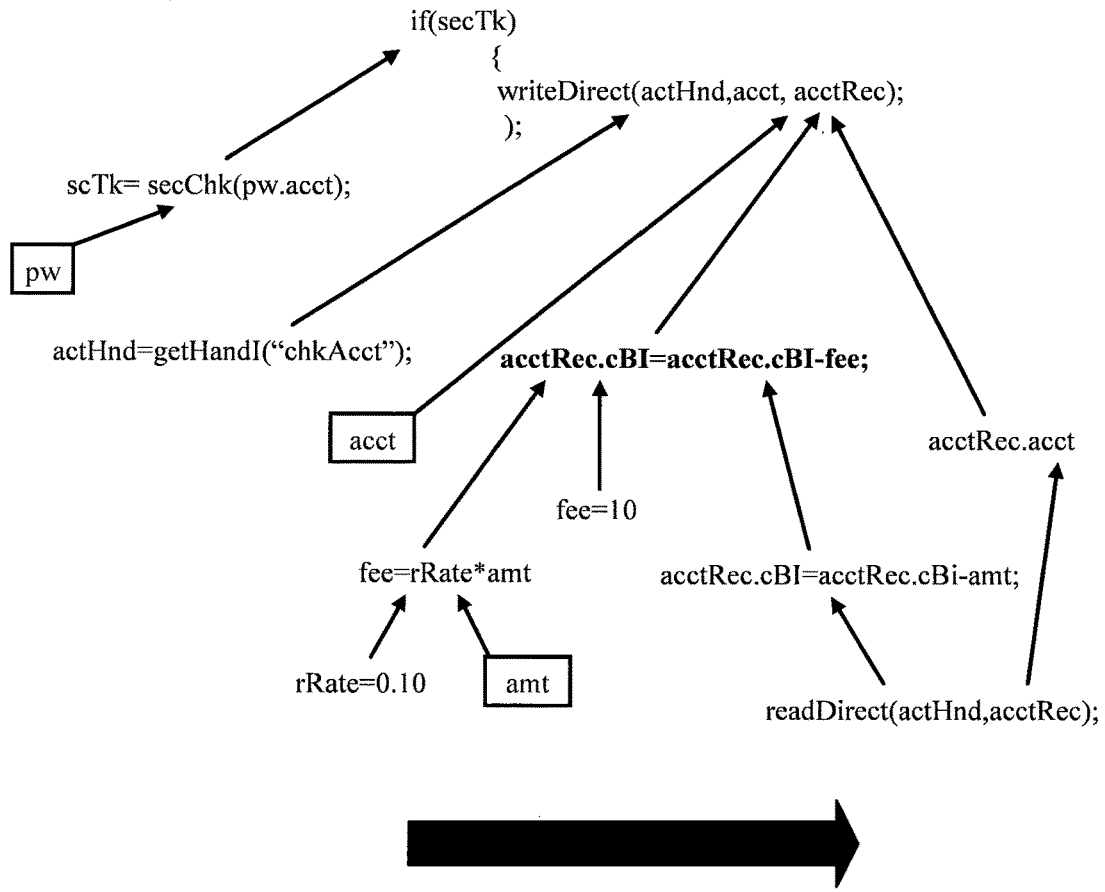
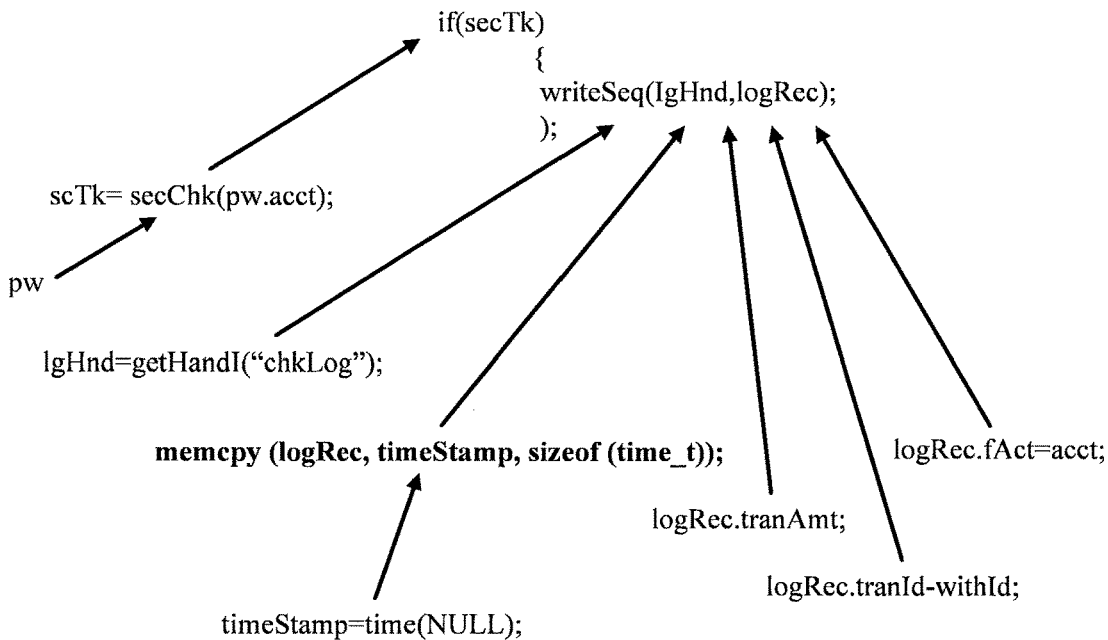

Refactor to Function in 'C'

Additive Representation, not Changing

- Functional Structure
- Dependency Graph
- Original Source

- We're not changing source, we're annotating it with layers of representation*
- The layers are linked together so that they enable viewing source from different perspectives

*Derivative: we could be converting

- Problem Classes: Dependency, Separation of Concerns, Comprehension, Separation of Concerns
  - Language independence!!!
  - Dependency is at the root of many engineering and evolution tasks, and they don't scale well for individual cognition, but do in the machine.
    - Logging should be a separate *concern* architecturally speaking
    - Cohesion of integral functions is easier to understand and maintain
- Productivity and Quality:
  - The same

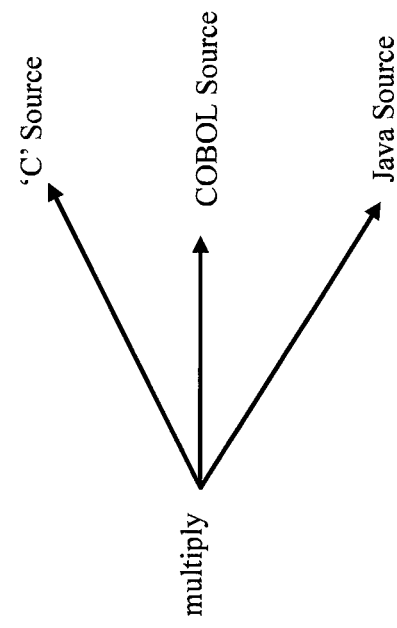

FIG. 37

Operations, Abstraction, and Source Code

- Our formal algebra, SEAL, provides a natural, intuitive, and comprehensive solution to both abstraction and operating on software without touching the programming languages

- It allows one to think of code as a symbol, and manipulate it as such, like a universal CASE tool, layered on any language

- Considering refactoring the 'C' withdrawal function

Dependency of Functions

Independence/Dependence of function is exposed by defining the elemental functions

4002

```
void
logging(acct,amt,secTk)
    {
    time_t timeStamp;
    Log logRec
    timeStamp=time(NULL);

lgHnd=getHandl("chkLog");

logRec.fAct=acct;
    logRec.tranId-withId;
    logRec.tranAmt;
    memcpy (logRec, timeStamp, sizeof (time_t));

if(secTk)
        {
        writeSeq(lgHnd,logRec);
        );

return(NULL);
    }
```

3502

```
void
wTran(pw,acct,amt)
    {
    bool scTk;

scTk=secChk(pw,acct);

newbie1(acct, amt, secTk);

newbie2(acct, amt, secTk);

return(NULL);
    }
```

4004

```
void
withdrawal(acct, amt, secTk)
    {
    int fRate=0.10;
    char withId='w';
    int fee;
    Act acctRec;

actHnd=getHandl("chkAcct");

readDirect(actHnd,acctRec);
    acctRec.cBI=acctRec.cBi-amt;

fee=rRate*amt
    acctRec.cBI=acctRec.cBI-fee;
    if(secTk)
        {
        writeDirect(actHnd,acctRec);
        );

return(NULL);
    }
```

*FIG. 40*

Algebraically Factoring-Out Logging

Can manipulate the expressions like high school algebra $$\text{secChk} \odot (\text{logging} \oplus \text{withdrawal}) \xrightarrow{\text{expand}} (\text{secChk} \odot \text{logging}) \oplus (\text{secChk} \odot \text{withdrawal})$$

Just like with elemental functions, there's source mapping (secChk ⊙ logging) ⊕
(secChk ⊙ withdrawal)

| map

3502

```
void
wTran(pw,acct,amt)
    {
    bool scTk;

scTk=secChk(pw,acct);

logging(acct, amt, secTk);

withdrawal(acct, amt, secTk);

return(NULL);
    }
```

3508

```
void
logging(acct,amt,secTk)
    {
    time_t timeStamp;
    Log logRec
    timeStamp=time(NULL);

lgHnd=getHandl("chkLog");

logRec.fAct=acct;
    logRec.tranId-withId;
    logRec.tranAmt;
    memcpy (logRec, timeStamp, sizeof (time_t));

if(secTk)
        {
        writeSeq(lgHnd,logRec);
        );

return(NULL);
    }
```

3510

```
void
withdrawal(acct, amt, secTk)
    {
    int fRate=0.10;
    char withId='w';
    int fee;
    Act acctRec;

actHnd=getHandl("chkAcct");

readDirect(actHnd,acctRec);
    acctRec.cBI=acctRec.cBi-amt;

fee=rRate*amt
    acctRec.cBI=acctRec.cBI-fee;
    if(secTk)
        {
        writeDirect(actHnd,acctRec);
        );

return(NULL);
    }
```

*FIG. 42*

Changing Source is Solving Equations*

| Delete the old logging? Make equality subtract from both sides. Simplify |

(secChk ⊙ logging) ⊕ (secChk ⊙ withdrawal) - (secChk ⊙ logging)

| Source mapping allows us to *parallel* the algebraic in the source |

| We're now operating at an abstract level that's easier for both humans and AI's, totally algorithmic and less complex |

Additive Representation, not Changing

Algebraic
↕
Functional
↕
Dependency
↕
Original Source

Implications

- Problem Class: Software Abstraction and Manipulation
  - Replaces specialized high-level languages, design languages, etc.
  - It is both more comprehensible and operational (unlike UML, etc.) because you can change software with it
  - This the CASE di tutti CASE, the boss of all bosses
    - This provides the basis for a lingua franca of software, any programming language, any application. Enabling active communication between agents and humans.

- Productivity and Quality:
  - The same

*FIG. 45*

Phase, Essence, Intuition

- A single theoretical framework inherits hundreds of years of applicable results, e.g., solving equations for unknowns
- Reducing solving engineering problems to solving simple equations!
- Making these changes that have to be right, correct, error-free
- Universality: One abstraction for all languages, reducing the chaos of how to model to a single symbolic formulation

*FIG. 46*

Phase and Essence Goals

| | OLD PHASE | NEW PHASE |
|---|---|---|
| Professional Labor | Labor Intensive<br>Slow | Automation Leverages<br>100X Multiplier |
| Quality | Labor Intensive<br>Haphazard<br>Slow | Automatically Verified<br>Often Unnecessary<br>100x Faster |
| Programming Specification | Chaotically Idiosyncratic | Normalized to Coherent |
| Programming Media | Programming Language<br>Important | Programming Languages<br>Peripheral |
| Comprehending System "Knowledge" | Opaque<br>Painful Learning Curve | Transparent<br>Easy Learning Curve |
| Application Architecture | Chaotically Idiosyncratic | Normalized to Coherent |
| Leveraging Application "Knowledge" for Productivity | Human Engineers<br>Experience | Application System<br>becomes Active Agent |

*FIG. 47*

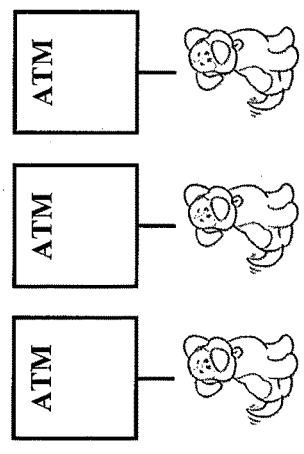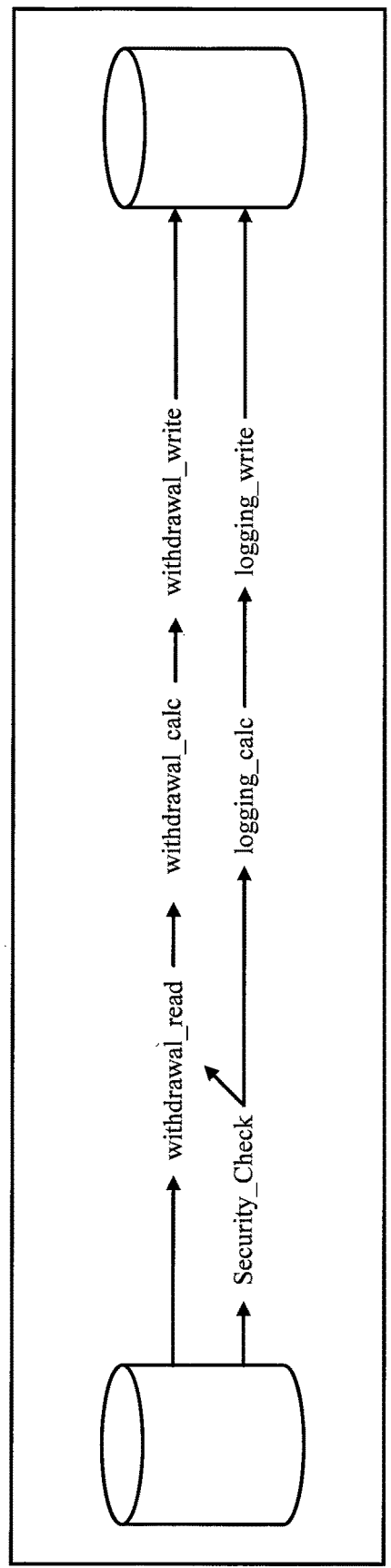
FIG. 56

Included: Simplification with Equivalence

Included: Simplification with Equivalence

```
                                    ┌─6002
                            ┌────────┴──────────────┐
                            │ int function 1 (w,x,y,z)
                            │   {
                            │   int result = 0;
                            │   multiply(multiply(w,x),
                            │               multiply(y,z));
                            │   return(result);
                            │   }
                            │
                            │ int multiply(int x, int y)
                            │   {
                            │   if(y = 0)
                            │    return(0);
                            │   else
                            │    return(x+multiply(x, y-1));
                            │   }
                            └───────────────────────┘
```

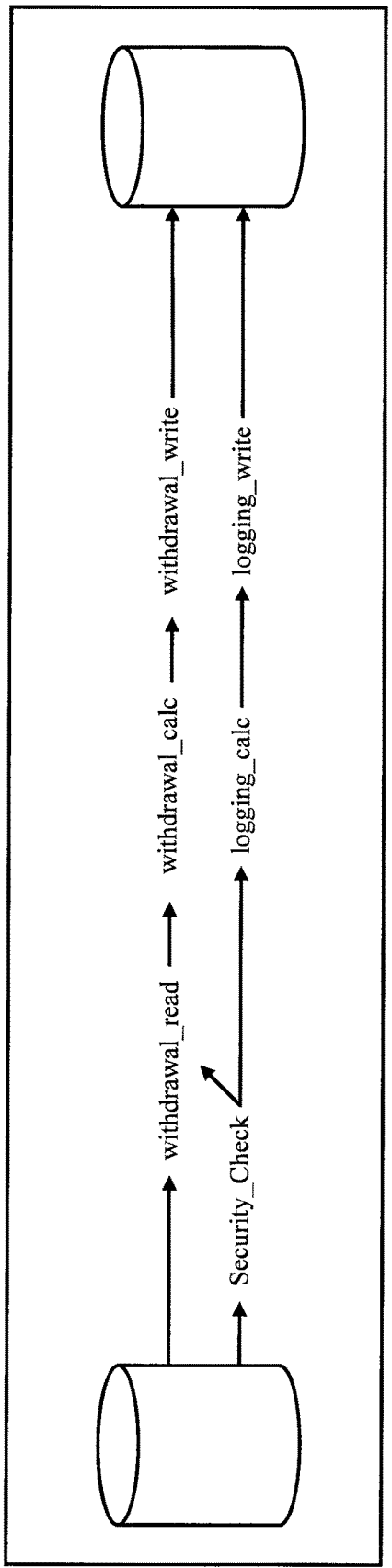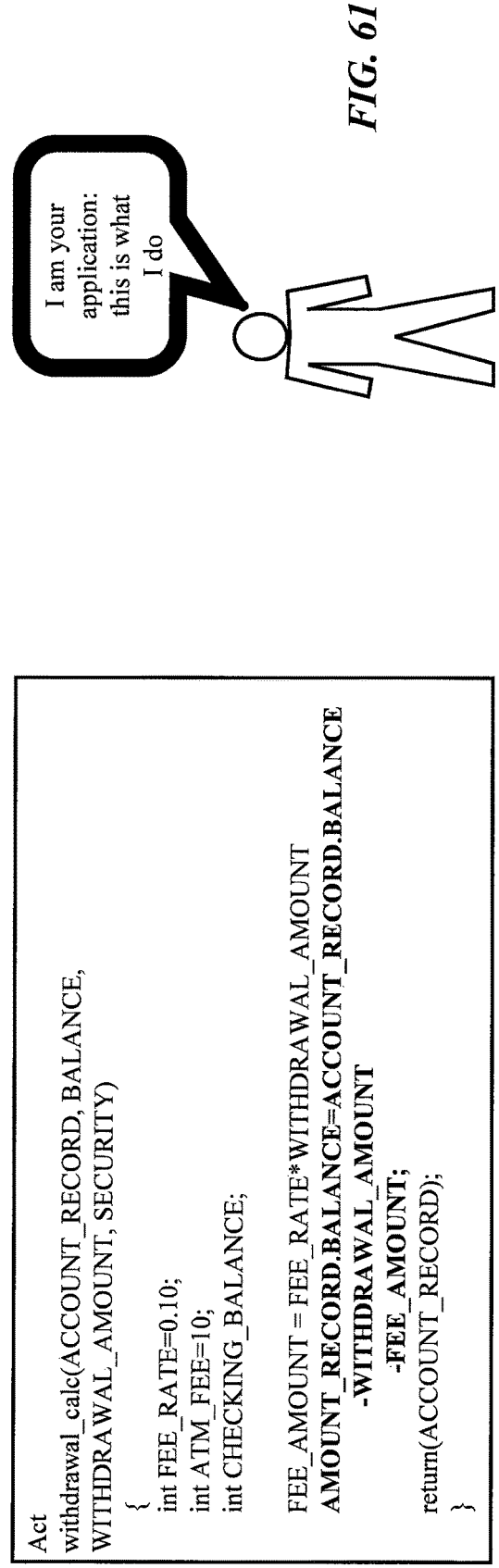
FIG. 61

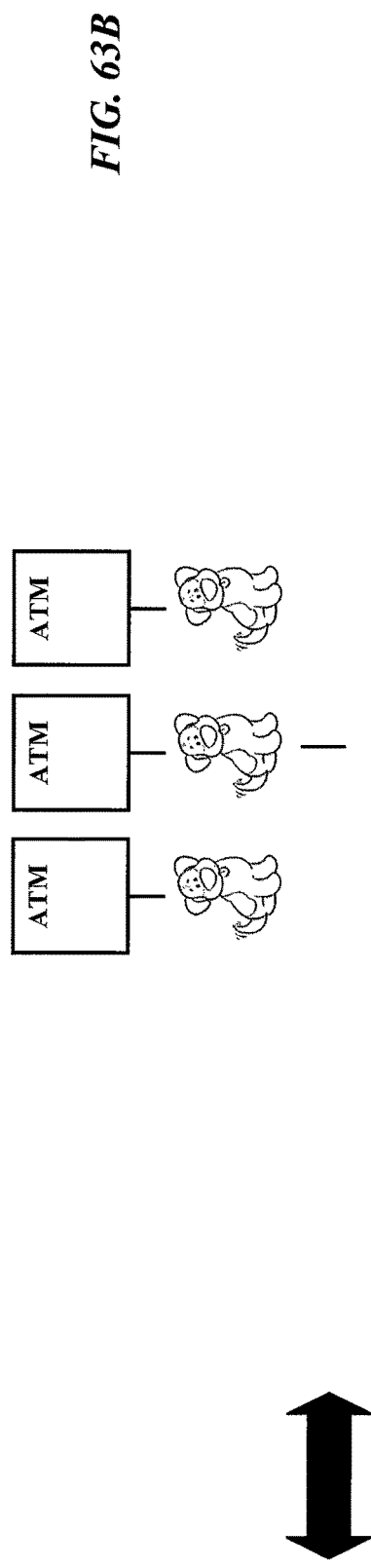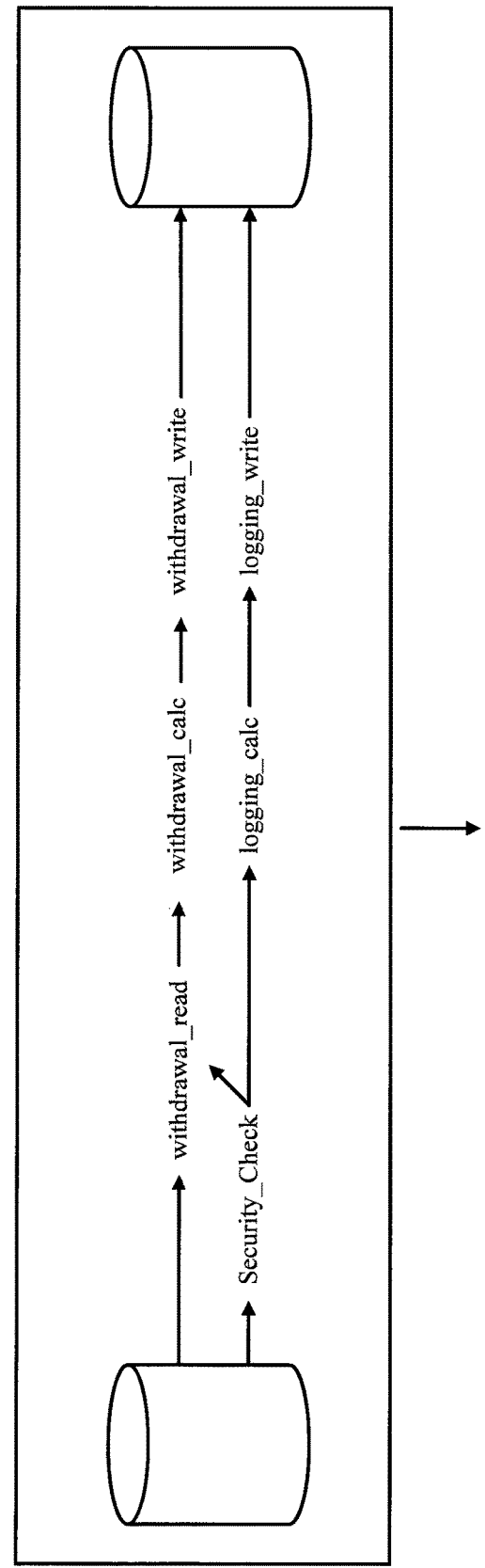
FIG. 63B

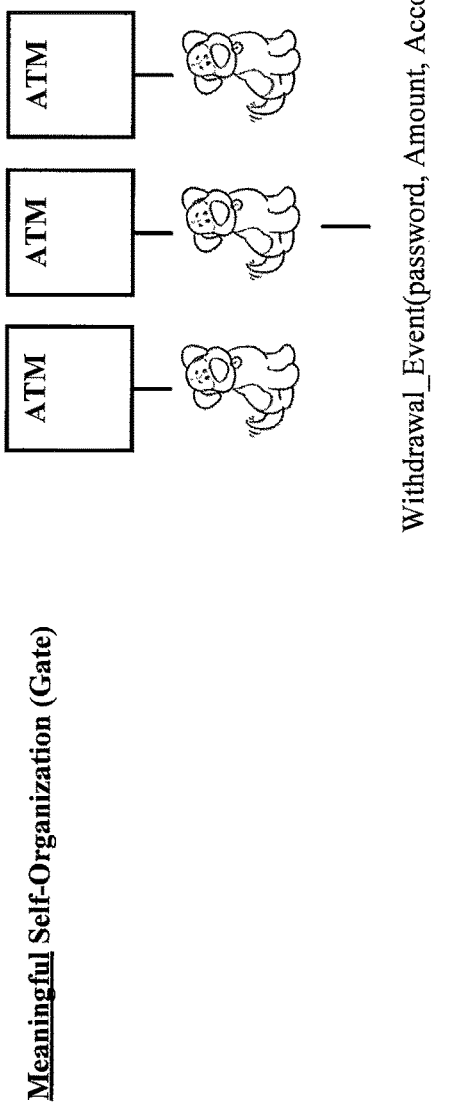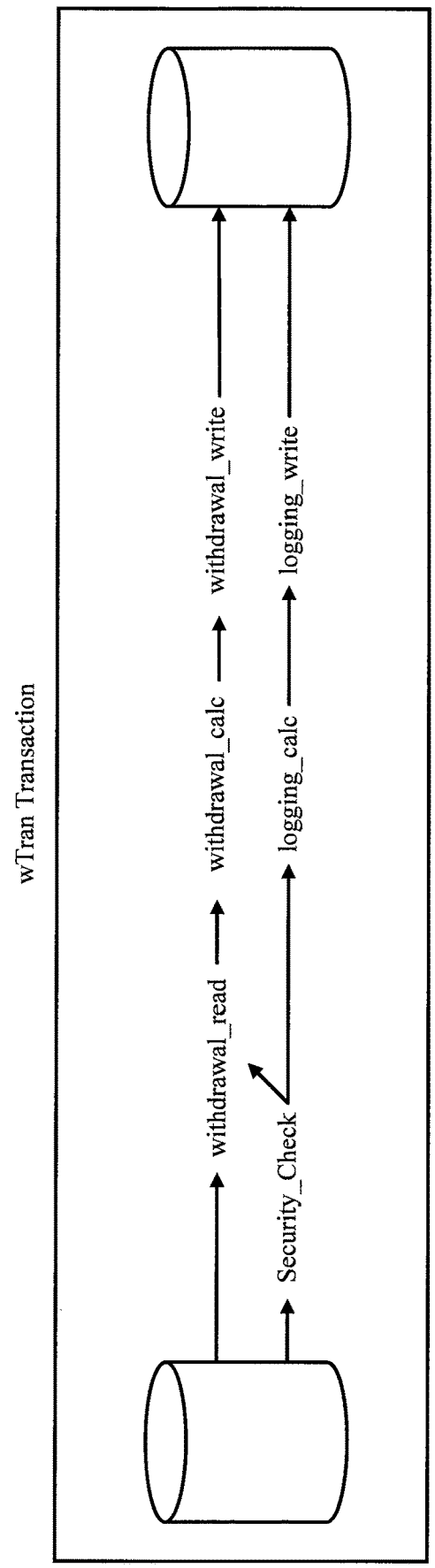
FIG. 69A

Meaningful Self-Organization (Gate)

```
Act
withdrawal_calc(ACCOUNT_RECORD, BALANCE, WITHDRAWAL_AMOUNT, SECURITY)
{
  int FEE_RATE=0.10;
  int ATM_FEE=10;
  int CHECKING_BALANCE;

FEE_AMOUNT = FEE_RATE*WITHDRAWAL_AMOUNT
  AMOUNT_RECORD.BALANCE=ACCOUNT_RECORD.BALANCE
       -WITHDRAWAL_AMOUNT
       -FEE_AMOUNT;
  return(ACCOUNT_RECORD);
}
```

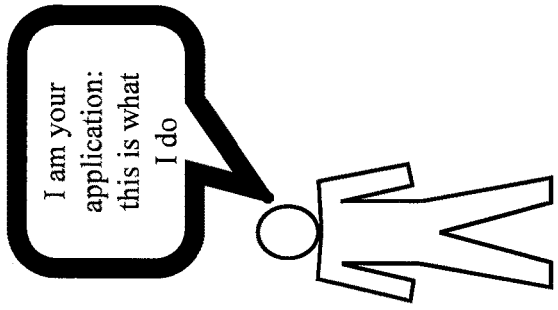

Implies <u>self-documentation</u>

The user creates event and the system does state transition of the model

This maps to:

<subject> <transitive-verb> <object>

*FIG. 69B*

Phase and Essence

| | OLD PHASE | NEW PHASE |
|---|---|---|
| Professional Labor | Labor Intensive Slow | Automation Leverages 100X Multiplier |
| Quality | Labor Intensive Haphazard Slow | Automatically Verified Often Unnecessary 100x Faster |
| Programming Specification | Chaotically Idiosyncratic | Normalized to Coherent |
| Programming Media | Programming Language Important | Programming Languages Peripheral |
| Comprehending System "Knowledge" | Opaque Painful Learning Curve | Transparent Easy Learning Curve |
| Application Architecture | Chaotically Idiosyncratic | Normalized to Coherent |
| Leveraging Application "Knowledge" for Productivity | Human Engineers Experience | Application System becomes Active Agent |

*FIG. 70*

INDUCTIVE EQUIVALENCE IN MACHINE-BASED INSTRUCTION EDITING

CROSS REFERENCE TO RELATED APPLICATIONS

This application is a Continuation of U.S. patent application Ser. No. 16/769,077, filed Jun. 2, 2020, now U.S. Pat. No. 11,157,250, which is a national stage application under 35 U.S.C. 371 of PCT Application No. PCT/US2017/064710, having an international filing date of Dec. 5, 2017, which designated the United States, each of which are incorporated herein by reference in their entirety.

FIELD OF THE DISCLOSURE

The present disclosure is generally directed toward one or more of machine-based pattern recognition and selective editing.

BACKGROUND

Programmable machines continue to progress as software and software writing tools advance. However, programmers may still write software that has already been written due to the time requirements associated with finding and reviewing existing software, personal preference, lack of knowledge of the presence of existing software, or other reasons. As a result, software often includes code portions that may be less than ideal, even if functionally equivalent. Previous solutions include "Software Equivalence Checking," U.S. Patent Publication 2011/0138362, incorporated herein by reference in its entirety.

Compilers and interpreters convert human-readable source code into machine-readable code (e.g., object code, executable code, etc.) for execution. Compilers can negate the effects of many coding issues, but not all and not always completely. For example, a piece of software code comprising the traversal of each element of array may have different performance characteristics if the coder traverses the array by row elements and then incrementing the column, or by column elements and then incrementing the row. Object code, such as an assembler, may store values differently and require more processing steps using one technique versus another, even though the end result is the same. Similarly, the choice of a particular sorting methodology may have a significant impact on performance based on the data being sorted. For example, a bubble sort is efficient when sorting a relatively small number of elements or a large number of elements that have only a few elements that are not in sort-order. However, bubble sort is likely to be a poor choice for most other applications.

Even if two sets of software each produce the same result, not all software has the same effect, such as within an application or within a software management system. Software may have inefficiencies or other undesirable issues. As a result, computers or other machines executing software may operate in a less than ideal capacity.

SUMMARY

Certain embodiments disclosed may utilize SMT solvers and may be more readily understood with the benefit of "Decision Procedures, An Algorithmic Point of View," Kroening and Strichman, 2008, ISBN: 978-3-540-74104-6, which is incorporated herein by reference in its entirety and for all that it teaches. Additionally, embodiments disclosed herein may be more readily understood with benefit of "Machine-Based Instruction Editing," international application PCT/US2016/017160 filed on Feb. 9, 2016 and published as WO 2016/130551, which is incorporated herein by reference in its entirety and for all that it teaches.

Software or "code" refers to instructions written by a human for use by a machine, such as a microprocessor(s) (or, more commonly, "processor"), once the code is put into a machine-readable form. Software may also be embodied in circuitry (e.g., logic circuit, firmware, etc.). Software has many attributes beyond the functionality for which it was written or the result it produces. For example, software requires space, requires machine cycles, is read by humans who may or may not have written the software, may have security vulnerabilities, may require updating, may require porting to a different platform, and/or other aspects. Often an ideal or preferred function, which has previously been reviewed, vetted, and identified as preferred, is available. As a general introduction and in one embodiment, a machine-based instruction is provided to automatically identify a candidate function source code, determine whether the candidate function is functionally equivalent (e.g., produces the same result) to a preferred function source code that was previously vetted and identified as an authorized source code and, if equivalent within a determined hypothesis strength and/or resource limitation, transform the candidate source code into a preferred source code by substituting the preferred function for the candidate function and saving or otherwise making the transformed source code available for future access and/or processing.

A "function" as used herein, includes software functions, subroutines, procedures, (machine executable) methods, predicate, sequences of instructions or rules within a larger computer program, a relation that associates an input to a single output according to a rule. The single output may comprise a primitive data type or a more complex data type such as a composite or abstract data type.

In one embodiment, two portions of source code are considered: a candidate function and a preferred function. As will be discussed in more detail herein, the determination is made that the candidate function and the preferred function produce identical results or identical results with at least a predetermined hypothesis strength. For example, over all inputs provided, the output from the candidate function and the preferred function is equivalent. In another embodiment, a logic equation is determined for the candidate function and the preferred function and then provided to an automated theorem prover, such as a Satisfiability Modulo Theories ("SMT") solver, operable to determine equivalence of the functions over a finite set of inputs. However, differences may still exist. The candidate function may have been vetted for one or more factors, such as storage efficiency, execution performance, readability, maintainability, security, and/or other functionally agnostic differences. In one embodiment, the difference comprises the programming language. In another embodiment, the difference comprises compactness of code. For example, "C=2A+2B" may be preferred over "C=A+A+B+B" and C=2*(A+B) may be preferred over "C=2A+2B." In another embodiment, the difference comprises readability. For example, "RectanglePerimeter=2(sideA+sideB)" may be preferred over "X=2A+2B." In another embodiment, the difference may comprise resource efficiency. For example, it may be more efficient to access the entirety of a record from a remote database and hold the record in memory, even if not all fields within the record will be needed, versus accessing the remote database repeatedly to retrieve only the needed fields. The foregoing provides an introduction to functionally agnostic differences that may exist between a candidate function and a preferred function and is not meant to be an exhaustive list.

In another embodiment, the candidate function is different from the preferred function; however, the difference is confined to members (e.g., inputs and/or outputs) within the same equivalence class. For example, one equivalence class may be the binary value pairs (e.g., {(1,0), (TRUE, FALSE), (ON, OFF)}) or numeric equivalents (e.g., {"0.1", "0.1", "0.1000"}).

If the candidate function and the preferred function, given the same input(s), produce different outputs, but the different outputs are each within the same equivalence class, then the preferred function and the candidate function may be determined to be functionally equivalent. For example, if the same inputs are provided to the preferred and candidate functions and the preferred function outputs "TRUE" and the candidate function produces "1" (of a binary data type) then functional equivalence may be provided, even with non-identical outputs. Alternatively, if given the same input, the preferred function produces "ON" and the candidate function produces "0," then equivalence has been disproven.

With respect to certain embodiments disclosed herein, the problems created by prior computer systems and software development may be mitigated. Computer programming industry has been able to ignore many issues related to finite processing, bandwidth, and storage capabilities. Hardware has become ever cheaper and smaller. The investment required to make adequate software code, code that performs the function for which it was developed, into efficient code is often solved with hardware. Improving the software, beyond its functionality, has been largely abandoned in favor of developing adequate functionality and, once done, moving on to other tasks—a tradeoff readily accepted by prior art development practices.

In the early days of programming, succinct programming was an artifact of the language. Languages like Assembly left little opportunity to do more than what was essential to enable the processor to provide the required functionality. Today, there are many functional and object-oriented languages that allow ample opportunity for programmers to embellish their programming and documentation. However, if the program performs its functional task, it is rare than anything more is provided.

Providing software that merely performs a required function is no longer enough. Certain computer implementations remain highly sensitive to code storage requirements, processing time, and power requirements. While desktop and other fixed-location computer systems often solve any processing or storage constraint with additional hardware, mobile computing remains particularly sensitive to storage, processing, and power requirements. Even a very modest improvement in any one of storage, processing, and power may represent an epic breakthrough, whereby a previously impractical device is now a viable product. Additionally, factors such as reusability are always touted, but as a practical matter are rarely deployed and when they are, require a significant investment by a human programmer to ensure functional equivalence. However, with benefit of the disclosure provided herein, the computing sciences may benefit from machine-provided editing of software to provide more robust, secure, and reusable code.

As a further benefit of the embodiments disclosed herein, testing and verification can be reduced or even eliminated as functional equivalence is guaranteed within a provided limitation of hypothesis strength and/or resource utilization (e.g., processors, process cycles, time, etc.). A significant portion of any software development project utilizing the prior art involves confirmation that the functional objectives are satisfied by the program. However, with benefit of the disclosure herein, once a function is approved, any functionally equivalent subsequent code encountered may be replaced with the approved code and functional equivalence is guaranteed without the need to perform subsequent testing on the approved code.

The phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium," as used herein, refers to any tangible storage that participates in providing instructions to a processor for execution. Such a medium may take many forms, including, but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, an EPROM, a FLASH-EPROM, a solid-state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

While machine-executable instructions may be stored and executed locally to a particular machine (e.g., personal computer, mobile computing device, laptop, etc.), it should be appreciated that the storage of data and/or instructions and/or the execution of at least a portion of the instructions may be provided via connectivity to a remote data storage and/or processing device or collection of devices, commonly known as "the cloud," but may include a public, private, dedicated, shared and/or other service bureau, computing service, and/or "server farm."

The terms "determine," "calculate," and "compute," and variations thereof, as used herein, are used interchangeably and include any type of methodology, process, mathematical operation, or technique.

The term "module," as used herein, refers to any known or later-developed hardware, software, firmware, artificial intelligence, fuzzy logic, or combination of hardware and software that is capable of performing the functionality associated with that element. Also, while the disclosure is described in terms of exemplary embodiments, it should be appreciated that other aspects of the disclosure can be separately claimed.

The term "human-readable" as applied to source code, code, software, or equivalents, as used herein, refers to computer instructions utilizing a human-readable format that, without interpreting or compiling, is unable to be read by a machine for the purposes of execution of the instructions. Source code may comprise symbolic representations, such as named variables, functions (e.g., "float payment (int principle, float interest)") which may comprise spoken language representations (e.g., "if," "return," "get," "fetch," etc.) and spoken language character representations (e.g., "=", ".", "(", ")", etc.), which may be known as "reserved words." The programming language utilized to embody the human-readable source code may have specific rules as to what is and is not a reserved word or equivalent symbol. Generally, source code is the human output of a developed programming instruction and commonly known by the source code language (e.g., Python, C, C++, FORTRAN, BASIC, etc.).

The term "machine-readable" as applied to machine code, code, software, or equivalents, as used herein, refers to human-readable code that has been processed via a compiler or interpreter to comprise a machine-readable and executable form of the human-readable source code. In one embodiment, machine-readable code is Assembler. In another embodiment, machine-readable code is machine code (e.g., binary). The machine-readable code may utilize standardized identifier naming translation of symbolic representations of human-readable source code (e.g., "principle" and "interest" become "$01" and $02", "sales" and "tax" become "$03" and "$04", etc.) such as to completely or partially remove differences between similar functionality provided by different source code languages and may also become more hardware platform (e.g., Intel x86, Motorola® 8000x, CISC, RISC, etc.) specific to accommodate the instruction set for processors or processor families. Machine-readable code may not require further processing to be readable by a machine, such as a microprocessor, but may require additional processing (e.g., linking) to executable by the machine. While a skilled programmer may be able to "read" machine-code, such a form of the software omits language-based symbols, such machine-code is considered to be outside of the realm of human-readable.

The term "data repository," as used herein, is any one or more of a device, media, component, portion of a component, collection of components, and/or other structure capable of storing data accessible to a processor. Examples of data repositories contemplated herein include, but are not limited to, processor registers, on-chip storage, on-board storage, hard drives, solid state devices, fix media devices, removable media devices, logically attached storage, networked storage, distributed local and/or remote storage (e.g., server farms, "cloud" storage, etc.), media (e.g., solid state, optical, magnetic, etc.), and/or combinations thereof. The data repository is accessible to at least one processor but may be logically and/or physically detached from the processor during times when no processor has a present need for access. The data repository may be directly accessible or via one or more intervening components, including but not limited to, a cache and/or buffer. In certain embodiments, the data repository may be organized into a database, file, record, or other logical storage structure and/or portion or collection thereof.

BRIEF DESCRIPTION OF THE DRAWINGS

The present disclosure is described in conjunction with the appended figures:

FIGS. 10-71 depict a solution in accordance with embodiments of the present disclosure.

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising an element number, without a subelement identifier when a subelement identifier exists in the figures, when used in the plural, is intended to reference any two or more elements with a like element number. When such a reference is made in the singular form, it is intended to reference one of the elements with the like element number without limitation to a specific one of the elements. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices that may be shown in block diagram form and are well known or are otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
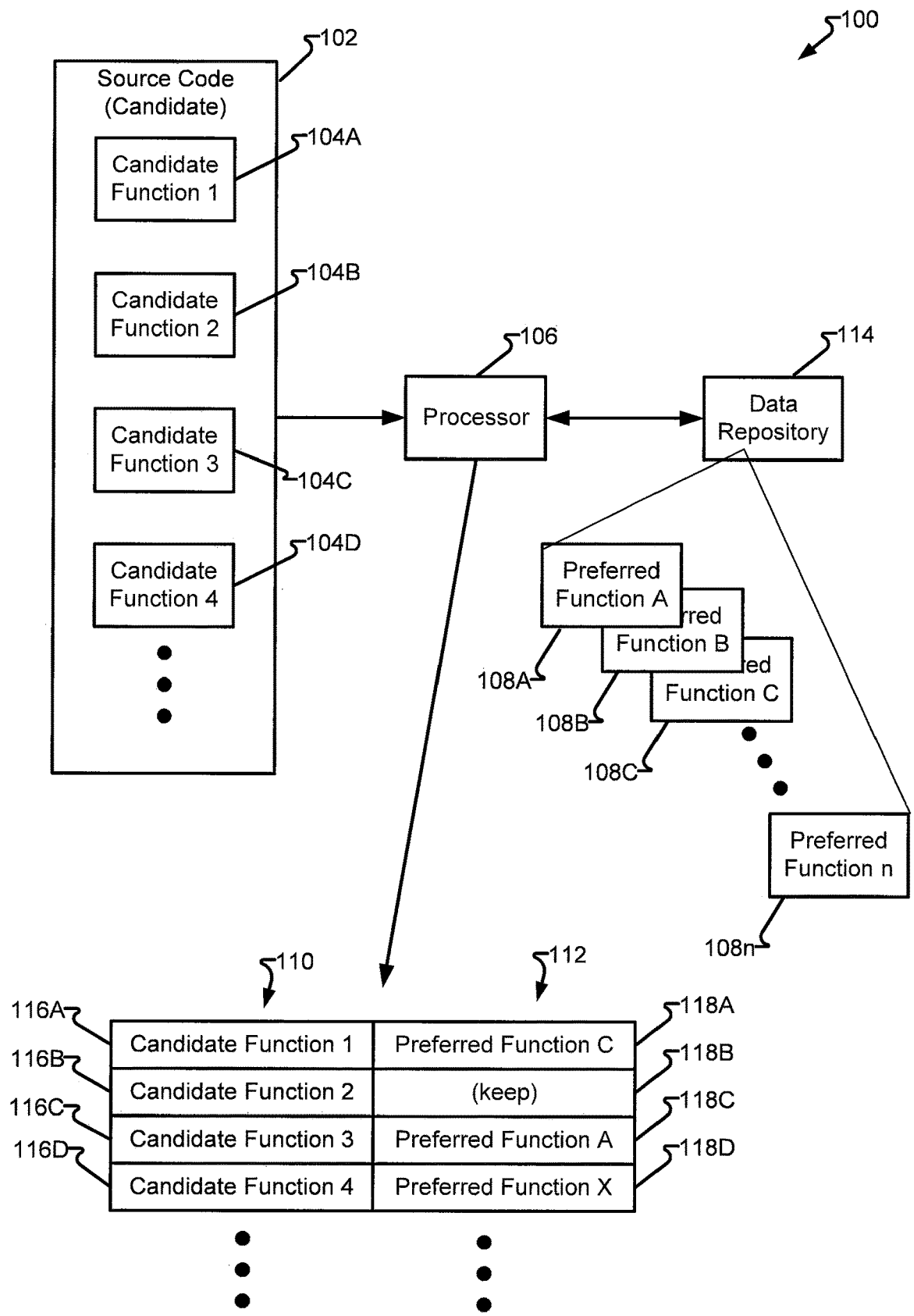
FIG. 1 depicts a first system in accordance with embodiments of the present disclosure.

FIG. 1 depicts system 100 in accordance with embodiments of the present disclosure. System 100 comprises processor 106 accessing source code 102 having therein candidate functions 104A-104D. In one embodiment, at least one of candidate functions 104 comprises a function receiving at least one input to produce at least one output. In another embodiment, at least one of the input and the output may be a function parameter, input from a human input device, memory address, register, port, or other data source. In another embodiment, the output may be a function output, written to an address, presented on an output device, written to a memory address or register, output on a port, and/or any other input and/or output means known in the electronic computing arts.

In one embodiment, source code 102 may comprise candidate functions 104 as written by a programmer, such as by using an integrated development environment or other software authoring tool. Source code 102 is illustrated with a plurality of functions 104 in one embodiment. In another embodiment, source code 102 may comprise a single function 104, such as 104A.

Processor 106 accesses a source code 102 and functions 104 and compares ones of candidate function 104 to ones of preferred functions 108A-108n maintained in data repository 114. Processor 106 may then identify ones of candidate functions 104 to be replaced by ones of preferred functions 108 and processor 106 may then create records, such as those comprising function identifiers 110 associated with indicia 112 to provide an association between ones of candidate function identifiers 116A-116D and ones of replacement indicia 118A-118-D. For example, function identifier 116A ("Candidate Function 1") identifying a particular function, Candidate Function 1 (104A), is associated with function indicia 118A indicating replacement by preferred function 108C (identified as "Preferred Function C"). In another embodiment, replacement indicia 118B associated with function identifier 116B may indicate associated function Candidate Function 2 (104B) is to be maintained. For example, Candidate Function 2 (104B) may not have a counterpart or an identifiable counterpart within data repository 114 or otherwise not be functionally equivalent to any one of preferred functions 108. In another embodiment, a recommendation or teaching may be implemented in addition or alternatively to performing the replacement. For example, a message may be presented to a programmer to indicate a function wrote by the programmer (e.g., "Candidate Function 1") may be improved, and optionally present the improvement criterion, to be more like another function (e.g., "Preferred Function C").

Indicia 112 is illustrated as comprising human-readable English data entries as one embodiment selected, in part, for descriptive clarity. Other embodiments contemplated herein include a data value, such as an entry in a data element (e.g., binary, enumerated data type, data structure, etc.) and/or presence of a data element (e.g., flag/no flag, record/no record, object/no object, etc.) maintained in a volatile memory, non-volatile memory, media, data repository 114, other data repository, media, and/or other data storing component, collection of components, or portions thereof and may be implemented in the embodiments disclosed herein without departing from the scope of the disclosure.

Figure 2:
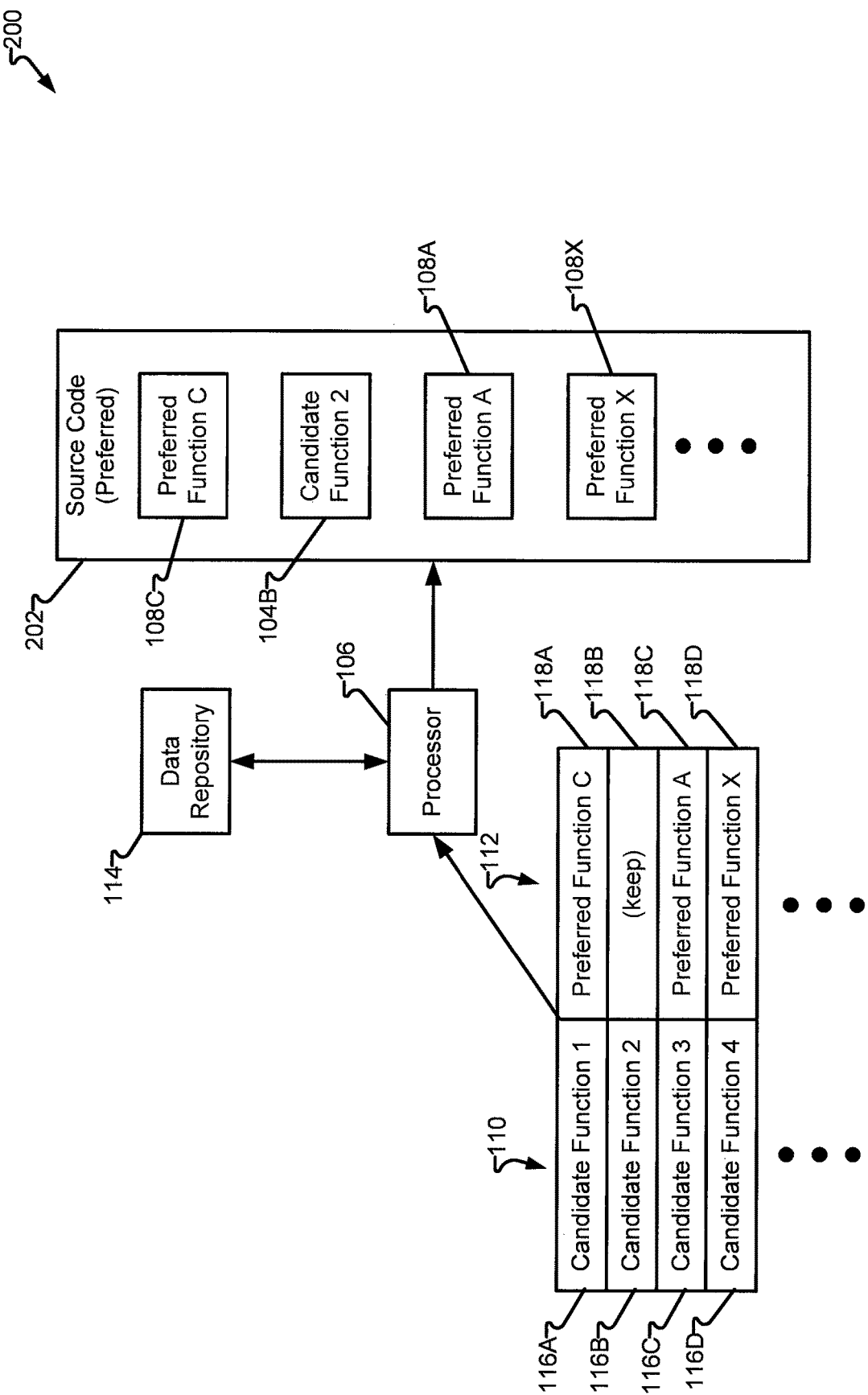
FIG. 2 depicts a second system in accordance with embodiments of the present disclosure.

FIG. 2 depicts system 200 in accordance with embodiments of the present disclosure. In one embodiment, FIG. 2 illustrates system 200 transforming source code 102 (see FIG. 1) to preferred source code 202 via utilization of function indicia 112. Processor 106 accesses function indicia 112 comprising entries 118 and associated with respective function identifiers 110 comprising entries 116. Processor 106 then accesses source code 102 to produce preferred source code 202, a functionally equivalent source code to source code 102 albeit with substitutions provided wherein at least one candidate function 104 is replaced with a functionally equivalent preferred function 108, wherein equivalence is within a defined hypothesis strength and/or resource limitation. Processor 106 accesses preferred functions 108 indicated in function indicia 112 from data repository 114 and provides automatic substitution to produce preferred source code 202.

In one embodiment, Candidate Function 1 (104A) is replaced by Preferred Function C (108C), Candidate Function 2 (104B) is maintained, Candidate Function 3 (104C) is replaced by Preferred Function A (108A), and Candidate Function 4 (104D) is replaced by Preferred Function X (108X). Preferred source code 202 may then be saved and identified as preferred source code and further provided for additional development, compiling or interpreting, linking, execution, and/or saving to be accessible at a future time.

Figure 3:
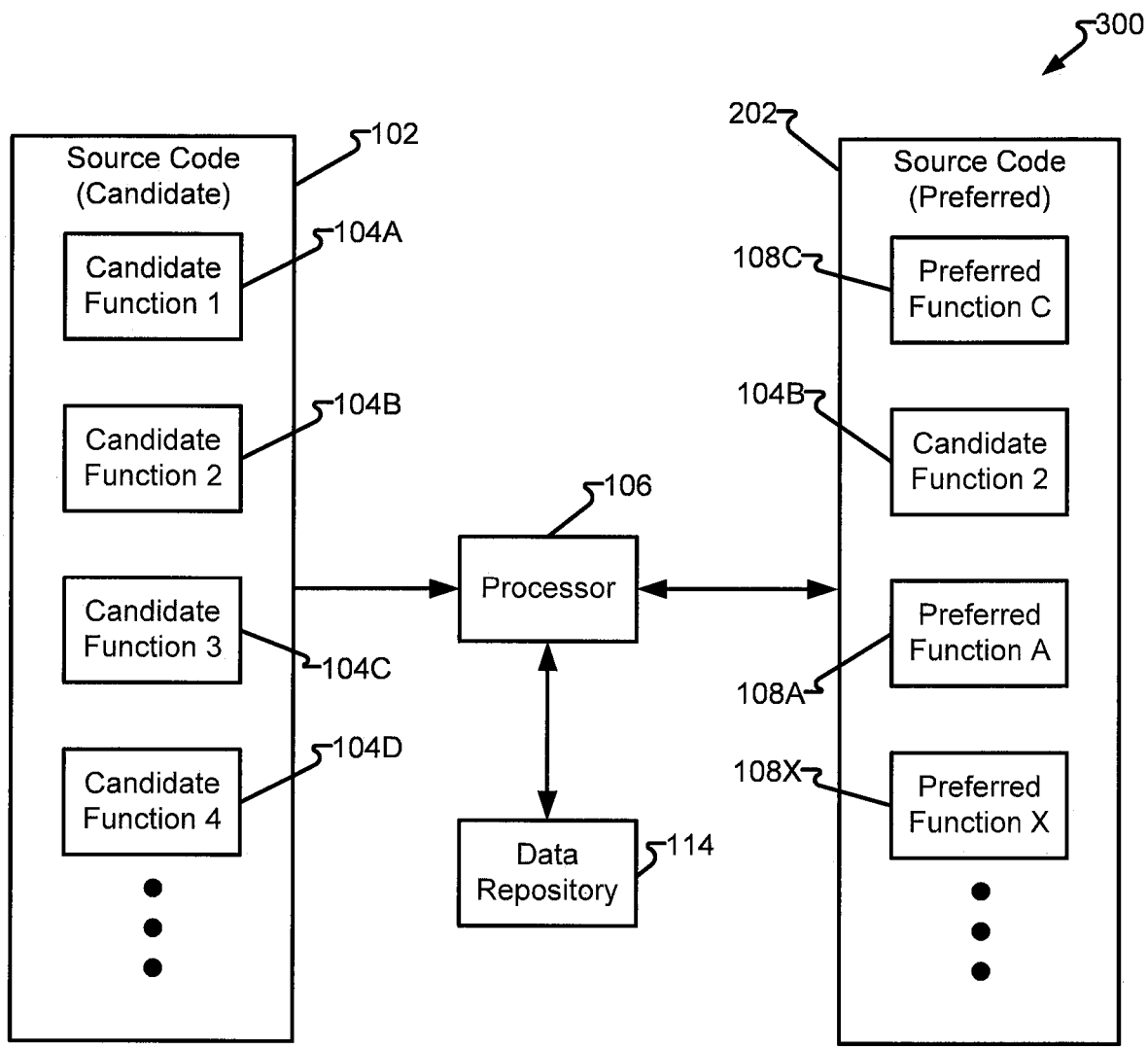
FIG. 3 depicts a third system in accordance with embodiments of the present disclosure.

FIG. 3 depicts system 300 in accordance with embodiments of the present disclosure. In one embodiment, system 300 illustrates source code 102 transforming into preferred source code 202 wherein the indicia of functional equivalence, within a defined hypothesis strength and/or resource limitation, is maintained solely by processor 106 allowing for processor 106 to directly output preferred source code 202. For example, processor 106 may access source code 102 and determine Candidate Functions 1 (104A), 3 (104C), 4 (104D) are to be replaced by Preferred Functions 108 (see FIG. 1) maintained by data repository 114. As a result, processor 106 may directly output preferred source code 202 comprising Preferred Function C (108C), maintaining Candidate Function 2 (104B), Preferred Function A (108A), and Preferred Function X (108X).

Figure 4:
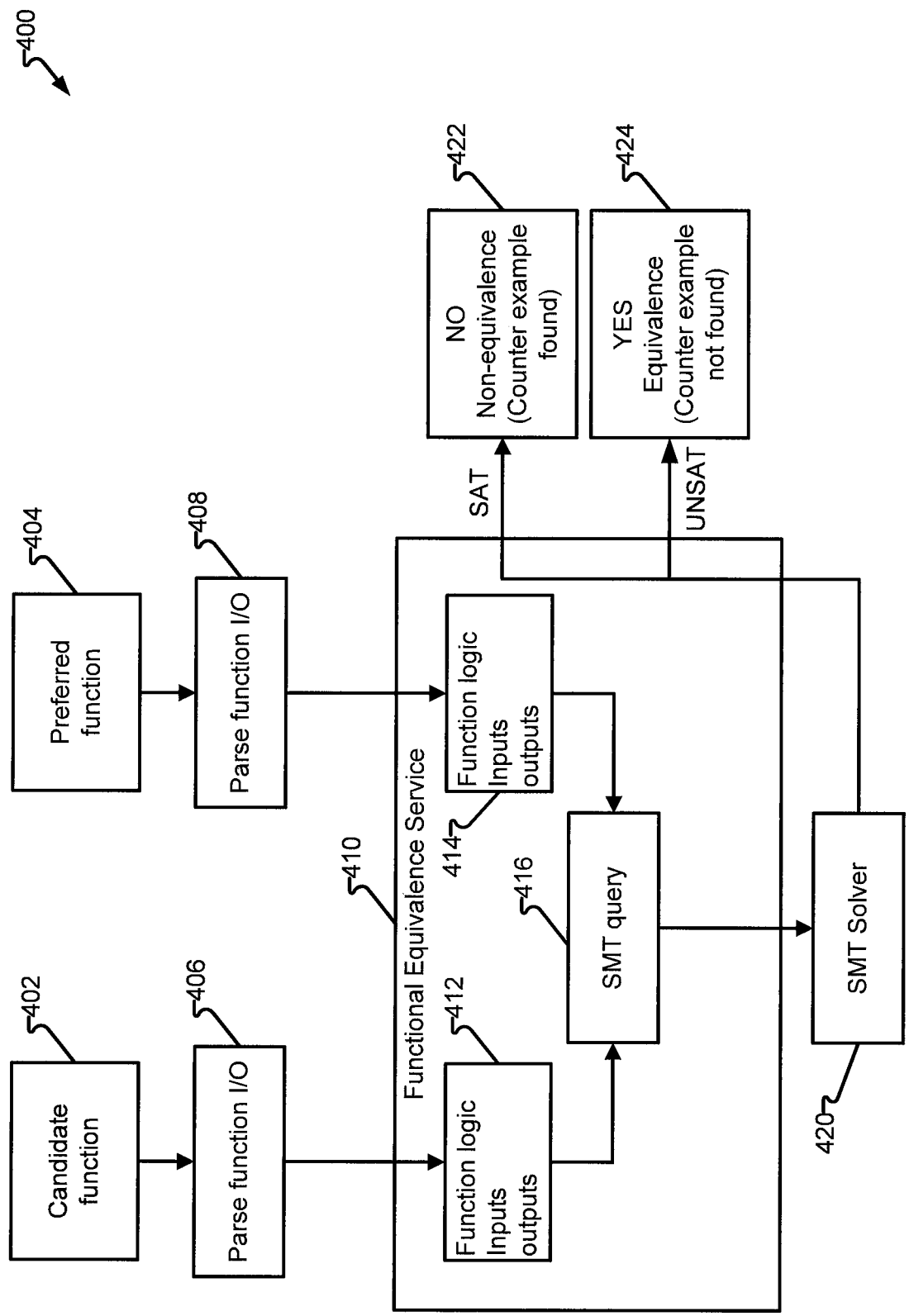
FIG. 4 depicts a fourth system in accordance with embodiments of the present disclosure.

FIG. 4 depicts system 400 in accordance with embodiments of the present disclosure. In one embodiment, the determination is made as to whether two functions are equivalent, within a defined hypothesis strength and/or resource limitation, for example Candidate Function 1 (104A) is functionally equivalent to Preferred Function C (108C), is equivalent within a defined hypothesis strength and/or resource limitation and via the application of a logic. The logic is variously embodied. In one embodiment, the logic comprises a first-order logic, in another embodiment, the logic equation comprises a second-order logic. In one embodiment, a single candidate function 402 is considered to determine equivalence to a single preferred function 404. In other embodiments, candidate function 402 may comprise a plurality of functions, such as a plurality of candidate functions 104 and/or preferred function 404 may comprise a plurality of functions, such as a plurality of preferred functions 108. While a logic equation may demonstrate equivalence with identical values, for example, "A or B" is identical, and therefore equivalent to "A or B." However, non-identical but functionally equivalent representations may also indicate equivalence, for example, "A or B" is non-identical, but functionally equivalent to "B or A." Additionally, symbolic representations may be utilized to represent at least a portion of an equation, for example, "A or B" is non-identical, but functionally equivalent to "A or (X and Y nor Z)," when "B" represents "X and Y nor Z."

In another embodiment, functional equivalence is determined by non-equivalence with all but one member of an enumerated set, for which candidate function 402 is a known member. For example, candidate function 402 may be known to perform a basic mathematical function, one of addition, subtraction, multiplication, and division. Preferred function 404 may be determined to be functional equivalent to candidate function 402 when, preferred function 404 is a member of the set of four basic mathematical functions and non-equivalence is determined for three other functions, thereby leaving preferred function 404 as the only function for which non-equivalence is determined and, therefore, functionally equivalent.

Candidate function 402 has an input/output signature parsed via parse function I/O 406. Similarly, preferred function 404 has an input/output signature parsed via parse function I/O 408. Table 1 provides one example of candidate function 402:

TABLE 1

```
int sum_mod (int x, int y) {
    if (y == 0) {
        throw domain_error ("Modulus cannot be 0.");
    }
    if (y<0) {
        int pos_y = -y;
        return sum_mod(x, pos_y);
    }
    if (x<0) {
        while (x<0) {
            x += y;
        }
        return x;
    }
    while (x>=0) {
        x -= y;
    }
    return (x+y)
}
```

Table 2 provides one example function of preferred function 404:

TABLE 2

```
int div_mod (int x, int y) {
    if (y == 0) {
        throw domain_error ("Modulus cannot be 0.");
    }
    int div = x/y;
    int rem = x - (div*y);
    return rem;
}
```

In one embodiment, preferred function 404 has been vetted and identified as preferred, such as due to conciseness of the human-readable code therein. Conciseness may be provided by an abstract syntactic structure, such as an Abstract Syntax Tree (AST). For example, few nodes, fewer leaf nodes, depth of nodes, width of nodes, may provide a conciseness metric. Functional equivalence service 410 then determines whether the equivalence is true. In one embodiment, functional equivalence service derives first-order logic 412 for parsed candidate function 402 and first-order logic 414 for parsed preferred function 404 to derive a first-order logic, which, in one embodiment, comprises SMT query 416.

Table 3 illustrates one example of a function decomposed into logic, inputs, and outputs.

TABLE 3 f1-sum_mod:
[...f1 Logic ...]
Inputs:
[f1 (x), f1 (y)]

TABLE 3-continued

Outputs:
[f1(retVal)]

Table 4 illustrates another example of a function decomposed into logic, inputs, and outputs.

TABLE 4 f2-div mod:
[...f2 Logic ...]
Inputs:
[f2(x), f2(y)]
Outputs:
[f2(retVal)]

Table 5 illustrates one example of an SMT query.

TABLE 5

(f1 Logic)^(f2 Logic)^(f1(x)=f2(x))^(f1(y)=f2(y))^(¬(f1(retVal)=f2(retVal))

In another embodiment, SMT query 416 is provided to SMT solver 420 to produce an output indicating satisfied ("SAT") non-equivalence result or NO result 422 or unsatisfiable ("UNSAT") equivalence result or YES result 424.

Figure 5:
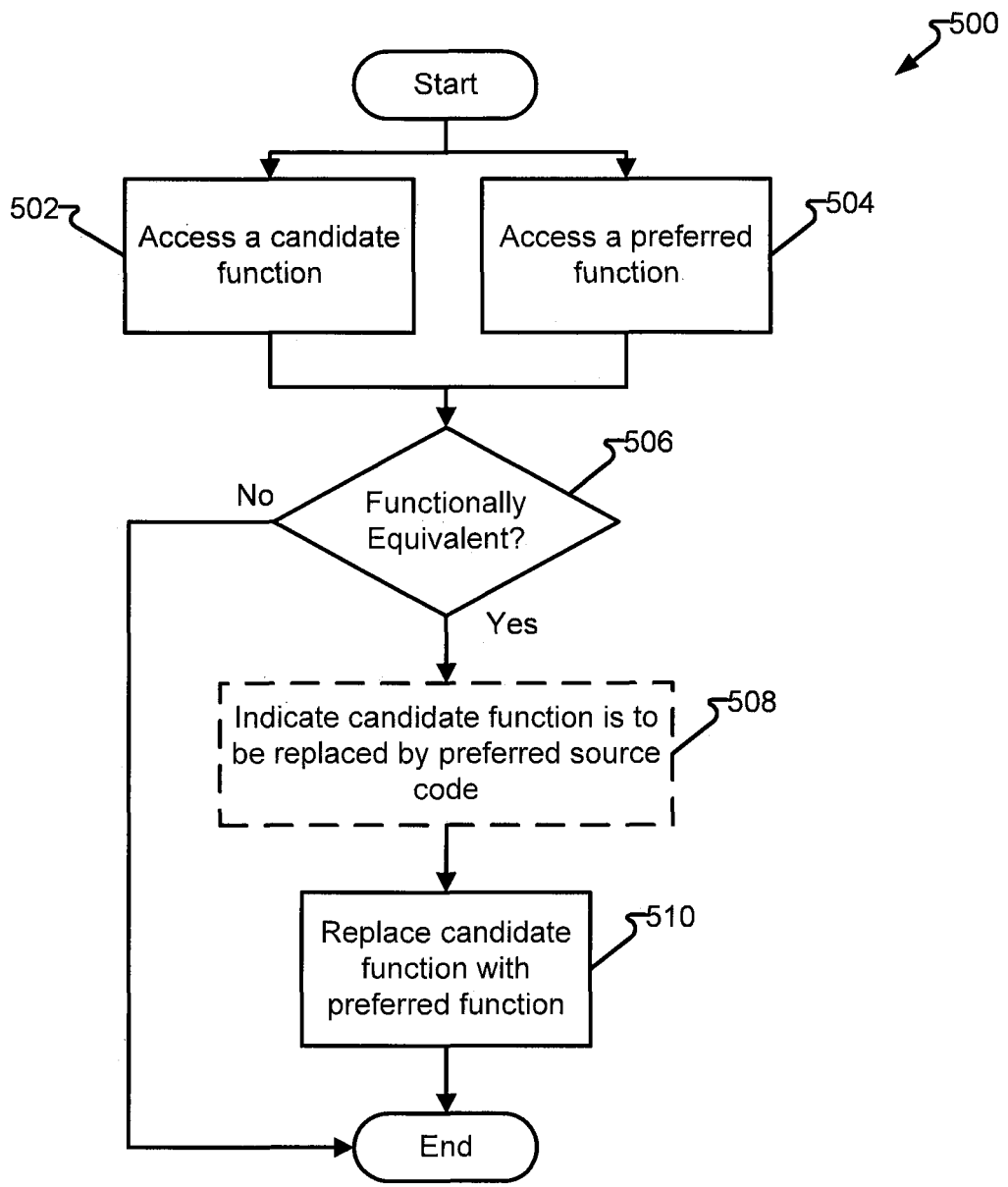
FIG. 5 depicts a process in accordance with embodiments of the present disclosure.

FIG. 5 depicts process 500 in accordance with embodiments of the present disclosure. In one embodiment, process 500 is executed, such as by processor 106. Process 500 may begin with one or both of steps 502, 504, wherein step 502 accesses a candidate function, such as from a candidate source code 102, which may comprise a plurality of functions 104. Step 504 accesses a preferred function, such as comprising one or more preferred functions 108 within preferred source code 202.

Next, step 506 determines if the functions are functionally equivalent (e.g., produce the same results when given the same inputs) within a defined hypothesis strength and/or resource limitation and, if yes, process 500 continues to optional step 508 to provide indicia of the replacement or, if step 508 is not implemented, to provide the indicia externally to process 500. Otherwise processing continues to step 510. Step 510 replaces candidate function 502 with preferred function 504. If step 506 is determined in the negative, then no substitution is required and process 500 may end. Optionally, following step 510 the source code comprising the, now replaced, preferred function 504 may be saved to a media or otherwise maintained for additional or future processing and/or reference.

As provided herein, preferred source code, such as comprising one or more preferred functions 108, may be provided by automatically replacing a functionally equivalent, but not preferred, candidate source code, such as comprising one or more candidate functions 104. The preferred source code may be determined to be preferred based upon a prior vetting wherein the preferred source code becomes authorized for use. The preferred source code may be determined to be preferred due to storage requirements of the human-readable form and/or machine-readable form, performance metric, security, presences of internal documentation, presences of a particular volume of internal documentation, use of verbose variable names, conciseness of instructions, error handling, and/or other attribute. In another embodiment, the source code is preferred due to a prior vetting. In a further embodiment, the candidate source code has not been subject to a prior vetting. In a still further embodiment, the preferred source code has been vetted by a higher authority as compared to the candidate source code, which may have been vetted by a lower authority, such as the developer of the candidate source code. In yet another embodiment, the determination of a preferred source code may be determined in accord with a criterion, for example, any one or more of fewer lines of code, fewer procedural calls, more comments, longer variable names, etc.

Figure 6:
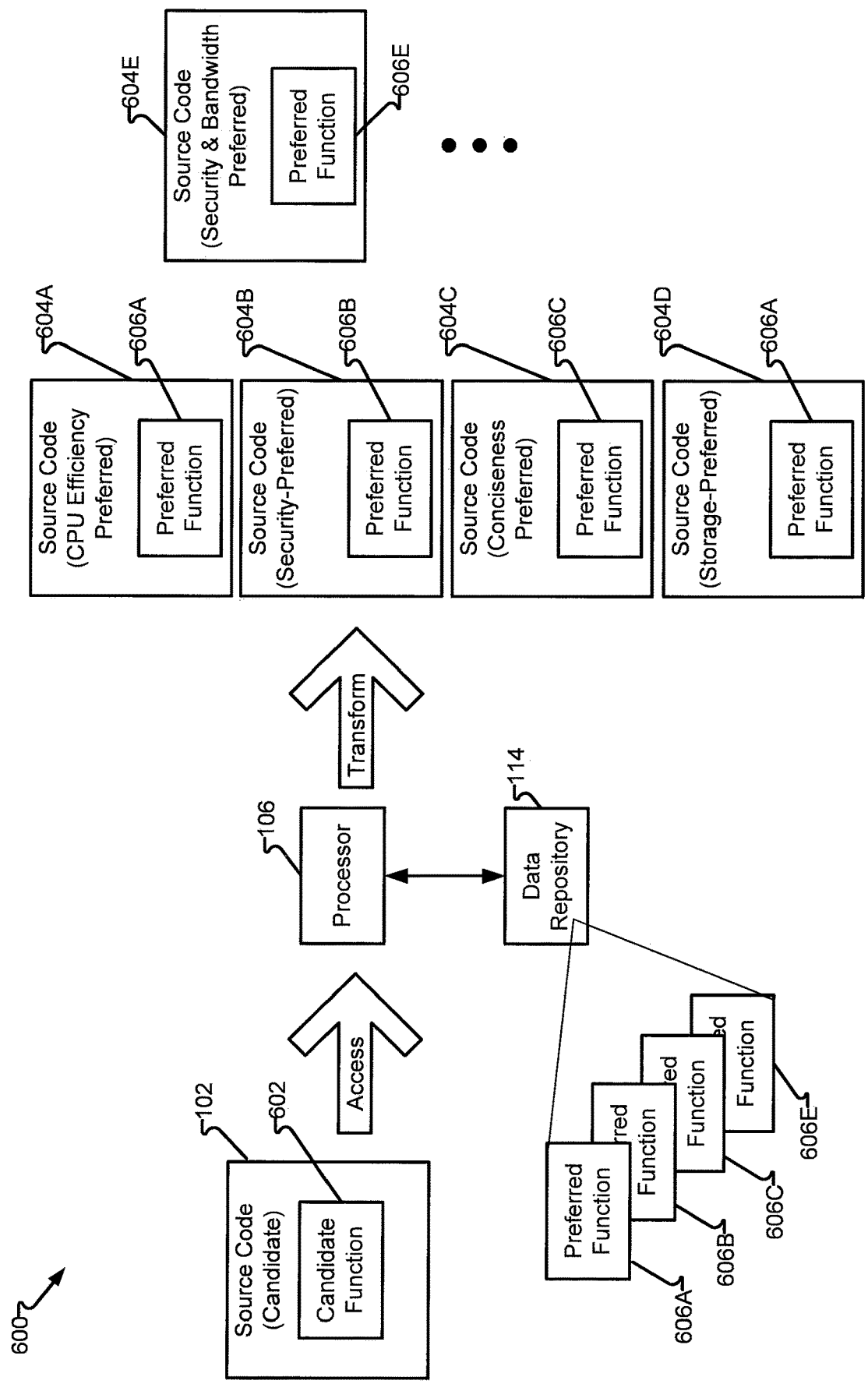
FIG. 6 depicts a fifth system in accordance with embodiments of the present disclosure.

FIG. 6 depicts system 600 in accordance with embodiments of the present disclosure. System 600 depicts processor 106 accessing candidate source code 102 comprising candidate function 602. In one embodiment, processor 106 determines that candidate function 602 is functionally equivalent within a defined hypothesis strength and/or resource limitation to at least one preferred function 606A-606n maintained in data repository 114.

In one embodiment, processor 106 transforms candidate source code into one of preferred source codes 604A-606E. In another embodiment, processor 106 transforms candidate source code into two or more of preferred source codes 604A-604E. Processor 106 transforms source code 102 into one or more of preferred source codes 604A-604E to output source code, such as a source code file, satisfying at least one preferred aspect. The preferred source code may result in a more optimal operation of a machine or component of a machine, such as by performing fewer operations, faster operations, less storage requirements, performing an operation with fewer resource demands, utilizing less expensive (e.g., power, response, etc.) resource, performing more secure operations, etc. The preferred aspect is variously embodied and includes, but is not limited to, security, CPU efficiency, bandwidth efficiency, storage requirement, conciseness of code, database accesses, or a combination of two or more.

In one embodiment, processor 106 determines that candidate function 602 is functionally equivalent, within a defined hypothesis strength and/or resource limitation, to the preferred function 606A, which has been identified as being preferred in terms of CPU usage (e.g., clock cycles, operations, etc.) Accordingly, processor 106 transforms source code 102 into preferred source code 604A, comprising preferred function 606A in place of candidate function 602. As a result, source code 102 is transformed into source code 604A.

In another embodiment, processor 106 determines that candidate function 602 is functionally equivalent, within a defined hypothesis strength and/or resource limitation, to the preferred function 606B, which has been identified as being preferred in terms of security. For example, function 606B may utilize a previously approved communication encryption protocol, approved communication port, approved error-handling routine, etc.

In another embodiment, processor 106 determines that candidate function 602 is functionally equivalent, within a defined hypothesis strength and/or resource limitation, to the preferred function 606C, which has been identified as being preferred in terms of conciseness of code. For example, function 606C may utilize human-readable source code that has been determined to be more concise, such as to promote readability and optionally machine efficiency. For example, it may be preferred to utilize source code that uses fewer operators, such as "X++" over "X=X+1."

In another embodiment, processor 106 determines that candidate function 602 is functionally equivalent, within a defined hypothesis strength and/or resource limitation, to the preferred function 606D, which has been identified as being preferred in terms of storage. Even with modern data storage technology, data storage may still be an issue, particularly with embedded systems and mobile technology where chip and board "footprint" are more critical. For example, function 606D may utilize source code that requires less storage space, such as "i=r*b" may be preferred over the more verbose "interest=rate*balance."

In another embodiment, processor 106 determines that candidate function 602 is functionally equivalent, within a defined hypothesis strength and/or resource limitation, to the preferred function 606E, which has been identified as being preferred in terms of both security and bandwidth. For example, preferred function 606E may utilize fewer network-dependent operations and a preferred port and/or security protocol.

Figure 7:
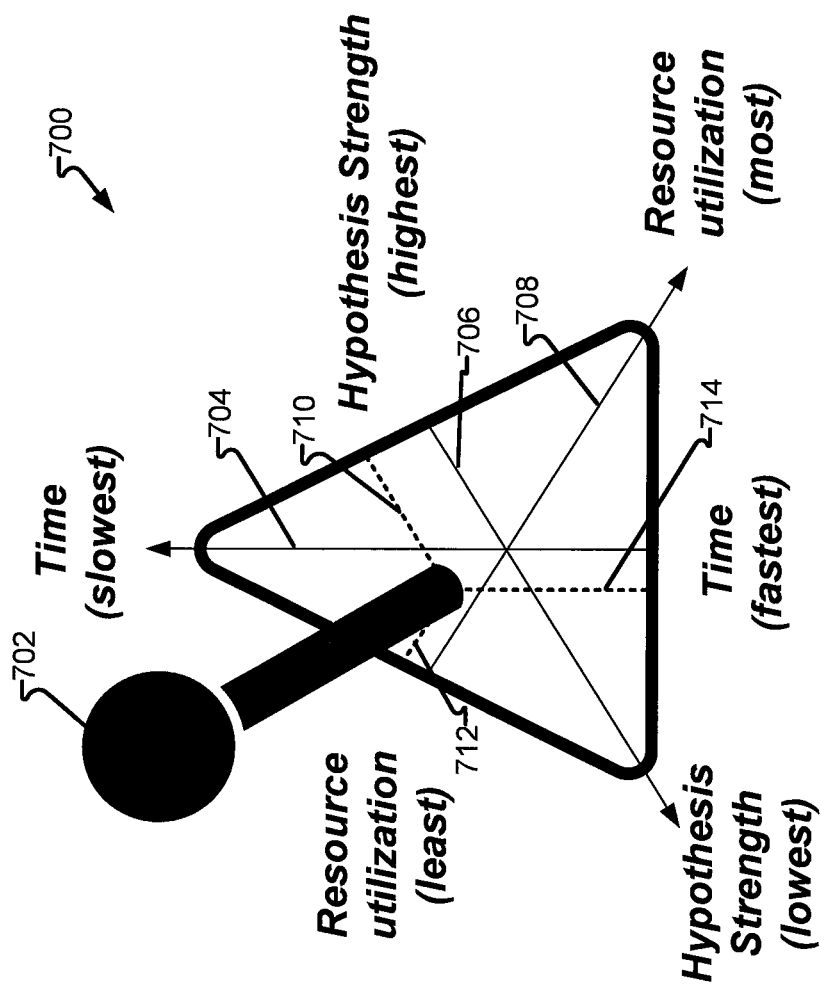
FIG. 7 depicts an equivalence determination limitation component in accordance with embodiments of the present disclosure.

FIG. 7 depicts equivalence determination component 700 in accordance with embodiments of the present disclosure. In one embodiment, equivalence is determined with absolute certainty. For example, every possible input is provided to both candidate source code (e.g., candidate source code 102, candidate function 1 (104A), candidate function 2 (104B), etc.) and a preferred source code (e.g., preferred source code 112, preferred function A (108A), preferred function B (108B), etc.), and then equivalence can be determined with absolute certainty if, for ones of the inputs, the resulting output is identical for both the candidate source code and the preferred source code. However, in other embodiments, testing to exhaustion is not an option. Resources, such as processing, time, and bandwidth resources are not unlimited. Often such resources are mutually exclusive. Accordingly, equivalence may be determined if the candidate source code and the preferred source code are determined to be equivalent when compared within the constraints of a resource limitation.

Often the resource limitations and/or an acceptable hypothesis strength requirement make testing equivalence to exhaustion undesirable or unnecessary. For example, a complex candidate source code may be evaluated against a preferred source code. An assumption, such as by a human, may be made that the candidate source code is likely to be equivalent to a particular preferred source code or a particular set of preferred source code. However, often such assumptions cannot be made or are made inaccurately. For example, a fully automated system may be unable to ascertain any preliminary candidate matches to a particular preferred source code or set of codes and, therefore, must determine equivalence to an entire pool of preferred source codes until a sufficient equivalence is determined. In other embodiments, a candidate source code may comprise names of variables, functions, modules, etc. that may provide a cue as to which preferred source code or codes are a best candidate to determine equivalence. For example, if variables are named "interest" and "account number" then "banking." "account management," or similar candidate source code(s) may be considered for equivalence, or at least considered first. If no match is detected, then another domain of preferred source code (e.g., insurance, brokerage, etc.) may be selected. As a result, the failure to determine equivalence may be considered as a failure to determine equivalence with a candidate source code and a particular preferred source code. Another source code may be equivalent.

In one embodiment, equivalence is determined with regard to a system limitation in view of a time constraint. Given an unlimited amount of time, even the most meager of processors can perform even the most intensive processing activity. Similarly, given an unlimited amount of hardware, only a trivial amount of time is required to perform the same intensive processing activity. Such unbounded constrains are often outside the realm of reality as processing tasks must be performed on a limited processing platform and/or within a limited timeframe. If equivalence is disproven, the task may be terminated. However, proving equivalence may be the absence of any finding of non-equivalence during a resource-constrained assessment for equivalence.

In one embodiment, the processing resource is fixed and the time available for the processing resource to perform the equivalence assessment is variable. For example, a desktop computer may be performing the assessment and an answer is desired within one hour. It should be appreciated that a fixed resource may be entirely fixed (e.g., dedicated solely to the assessment task) or partially fixed (e.g., multitasking processor performing the assessment task and other tasks). A partially fixed resource may perform more or fewer assessment processing setups based on the demands placed on the processor by other tasks. Accordingly, an assessment for a fixed amount of time may result in a variable number of processor operations or a fixed number of processor operations may result in a variable duration. Preferable a human or supervising computer process is provided with the potential impact that may exist when extraneous processing demands are placed on the processor performing the assessment for management (e.g., setting a priority level sufficient to allocate the processor to perform the assessment within the number of operations/time desired, disabling extraneous tasks, modifying a requested resource limitation in view of additional resource limitations imposed by extraneous tasks, etc.).

In one embodiment, equivalence limitation component 700 indicates a relative priority to an equivalence operation. For example, joystick 702 may select a relative position along time axis 704, hypothesis strength axis 706, and resource utilization axis 708. Joystick 702, as illustrated, is near the middle of equivalence limitation component 700 indicating a nearly balanced strategy. In particular, reducing resource utilization is emphasized but not maximized, as indicated by line segment 712 having a non-zero length but shorter than line segment 710 and segment 714. Hypothesis strength is the second axis emphasized, as illustrated by line segment 710 being longer than line segment 712 but shorter than line segment 714. Time is the third axis and, relatively, de-emphasized as illustrated by line segment 714 being the longer than line segment 710 and line segment 712

In another embodiment, a system, such as utilizing processor 106 may receive inputs from equivalence limitation component 700 and execute an equivalence determination based on a reduced utilization of resources, a more reduced hypothesis strength, and with less regard to time required. The system may convert such inputs into machine-executable instructions, for example, to allocate a single processor to execute an equivalence process with high priority (e.g., a reduced utilization of resources), determine equivalence and/or the absence of non-equivalence with an 85% hypothesis strength (e.g., a more reduced hypothesis strength), and to execute the instructions for twenty hours (e.g., less regard to time required).

It should be appreciated by those of ordinary skill in the art that hypothesis strength may be determined as successfully completing a number of equivalence assessments satisfying a specified standard deviation or other statistical requirement. The system may provide an output to a user, based on a particular setting in equivalence limitation component 700. For example, "In order to determine equivalence with at least your selected hypothesis strength, the processor will run nearly exclusively on this machine for twenty hours and perform twelve million operations to determine if 'candidate source code' is equivalent to 'preferred source code(s)', and, if successful, equivalence will be provided with a 85.04% hypothesis strength. Press 'start' to begin."

In another embodiment, a system may execute until interrupted and equivalence limitation component 700 may be an output display indicating a current state. For example, upon initiating an equivalence operation, joystick 702, which may be physical or a display element, may be near the bottom of FIG. 7 to indicate that time is currently at a lowest value. As the number of operations may be trivial, joystick 702 may indicate hypothesis strength is at its lowest. As more operations occur, joystick 702 may move accordingly to indicate a current time of execution and a current hypothesis strength.

In another embodiment, equivalence limitation component 700 may omit certain axis, such as resource 712, such as when processing resources are, at least substantially, fixed or at least not significantly variable. For example, a user having a rack of blade servers at their disposal may not be able to increase the processing capacity of the rack without adding additional blades. While resource limitation component 700 may indicate an option to add hardware, in other embodiments, resource limitation component 700 is restricted to currently available options, such as those available within the few seconds a user may require to input the desired parameters and initiate the equivalence operations.

In another embodiment, a system limitation may be determined and utilized to quantify an operation. For example, if a particular candidate code can be traversed with a single set of input variables in 1 millisecond and an exhaustive set of the input variables would comprise 10 million values, then equivalence would be determined with absolute certainty in approximately 2.8 hours. For simplicity, the example assumes traversing the preferred source code has already been performed with input-output combinations held memory requiring negligible access time. It should be appreciated that, if not previously provided, the time to traverse the preferred source code with the set of inputs to obtain the set of output values may need to be added to provide a better estimate of the time required. Similarly, the time required to compare individual outputs from the candidate and preferred source code may be added to the time required.

Presented with the time required, an alternative may be selected, such as to perform the determination on a different computing system and/or to perform fewer operations. For example, assuming a standard distribution, and where a 50% hypothesis strength corresponding to a 50% cumulative percentile, a first test may be performed. To increase to a 75% hypothesis strength corresponding to a 75% cumulative percentile, within the same time window, an additional, or higher performing, processor(s) may be utilized. It should be appreciated that tests may vary from a particular statistical curve due to overhead or details of a particular value being tested. For example, performing 1,000 tests on a portion of code may require a setup or other overhead that may cause such a test to be different from performing two sets of 500. Additionally, a particular value may cause a particular code portion to be executed that is exceptionally time-demanding or time-conserving. For example, randomly testing code with a numeric input may, for a relatively small number of values for such an input, cause an offline operation (e.g., access a remote server, mount a tape volume, etc.). Accordingly, performing a test comprising a fixed number of iterations, two or more times, may cause the time required for each test to vary. In yet another embodiment, such times may be plotted and a probability curve of times with resulting confidences produced (e.g., based on a plurality of tests, each with 1,000 iterations, a test with 1,000,000 inputs will take, with 97.7% confidence, 75 seconds+/-10 seconds).

In another embodiment, the user decides that a target defect (error) rate for functional equivalence is some percentage (D). The user further chooses a black-box statistical sampling regime, given a sample size N. In such an embodiment, when no instance of differing outputs given the same inputs to a candidate and preferred code is discovered, hypothesis strength (HS) is calculated as a random probability of not discovering a defect given the hypothesized defect rate, such as provided by Formula 1.

$$HS=1-(1-D)^N \qquad \text{Formula 1:}$$

Functional equivalence is the property of two computing functions to be equivalent. Equivalence if variously embodied. One embodiment is formal (or deductive) and another embodiment is empirical (or inductive). According to the formal embodiment, two functions are equivalent when the successive operations executed by one can be mathematically or logically reduced to the successive operations executed by the other. According to the empirical embodiment, the value returned by the two functions are the same whenever the arguments entered as an input are the same. The formal embodiment may entails the empirical embodiment, but not the other way around.

The empirical embodiment assumes a theoretical non-zero probability of failure, even if such a probability is very small. The functional equivalence hypothesis strength is then the level of confidence that this probability of failure is bounded by an extremely low upper limit.

Functional equivalence, or the Functional Equivalence Hypothesis Strength (FEHS) may be defined as follows:

Where "G" and "F" are functions with a functional equivalence to each other being presently unknown. The G-F Functional Equivalence Hypothesis is the hypothesis that the functions G and F are inductively equivalent, i.e. with respect to their inputs and outputs. Formally, for all inputs ("x"), G(x) is equivalent to F(x), therefore we have Formula 2:

$$\forall x, G(x)=F(x). \qquad \text{Formula 2:}$$

The Defect Rate (DR) of a G-F Functional Equivalence Hypothesis is the probability, given one input, for F and G to return two different values. Formally, if x is a random input for F and G, then Formula 3:

$$DR(F,G)=Pr[F(X) \neq G(X)]. \qquad \text{Formula 3:}$$

We define a parameter called the Maximum Defect Rate (MDR) as the maximum defect rate acceptable in a specific context. As a default, this rate is set at MDR=0.0001.

The strength, see Formula 4, of the G-F Functional Equivalence Hypothesis is the level of confidence for its Defect Rate selected to be between 0 and 0.0001 after N successful attempts is Formula 5.

$$S^{G-F}(N) \qquad \text{Formula 4:}$$

$$S=1-0.9999^N. \qquad \text{Formula 5:}$$

Formally, in accordance with Formula 6:

$$FEHS(F,G)=P[0<DR(F,G)<0.0001/N \text{ successes}]. \qquad \text{Formula 6:}$$

It should be appreciated that the Defect Rate, is a value between 0 and 1 or a narrower portion therein. For example, and as used herein (see Formula 5) Defect Rate is 0.0001. It should also be appreciated that other defect rates may be selected. Also, in another embodiment, the inputs selected may be random (e.g., non-biased selection of values across all potential values for a particular datatype), weighted random (e.g., a favored tendency to select a more likely value, such as a normal distribution curve of inputs may cause a selection to follow a similar normal distribution curve), historic (e.g., set of known prior inputs), or other value sets as may be determined in accordance with known or suspected distributions. For example, an input for a short integer ("short"), when signed, is -32,768 to 32,767, however, if the input has a variable name of "month" then, via a lookup or other record, the value for the short may be selected from the set of numbers from 1 to 12, indicative of possible values for a month. However, for the sake of potential errors in making such a selection (e.g., months may be accumulative from some event and not just a calendar value), additional, and/or other distributions of inputs may be utilized. It should be appreciated that such an approach is an optional embodiment, as comparing two functions utilizing calendar months and inputting a large value should both return an error code or otherwise provide equivalent processing.

In another embodiment, hypothesis strength may be equivalent to a statistical confidence. In other embodiments, hypothesis strength represents a similar concept, but different representation of the input selected, such as when the values selected as inputs are not random or not entirely random. Accordingly, and in another embodiment, when less than all possible inputs are considered, the selection of the set of inputs may be a random sampling of all potential inputs. However, in other embodiments, the inputs may be partially random (e.g., random, but with at least one particular value, such as zero and/or one for an integer), non-random, fixed, or targeted, such as a result of path analysis to ensure conformity with an objective to have branches of code tested at least a desired number of times. For example, a candidate source code may be analyzed and determined to comprise a branching that occurs when an integer is between 1 and 50. Accordingly, values may be selected whereby a greater than random portion of the inputs are between 1 and 50. Additionally or alternatively, a candidate source code with a limited or enumerated branching based on a relatively small number of inputs, compared to all potential values for an input, may be weighted to utilize more, or even all, values deterministic of the branch or other operation. Time and/or other resource estimations may be made accordingly. For example, if an integer between 1 and 50 makes a call to a backup tape requiring ten second per call, and any other value does not perform such a time-intensive operation, the time estimate may then reflect such occurrence based on the number of input values that will, or are estimated, to fall within the 1 to 50 range. In yet another embodiment, a different system, such as one utilizing solid-state backup, may be selected as an alternative, such as to avoid the time required to access data on a magnetic tape. An associated cost (e.g., setup requirements, allocation of other resources, other programs being de-prioritized, etc.) may be presented for consideration. As a benefit, am equivalence determination may be made to a selected degree based upon the computational requirements and system capabilities available and vice versa.

Input values may be selected in accordance with their data type. For example, testing all possible alphabetic character combinations of a string is unlikely to be particular useful. However, testing different number of characters, different mix of upper and lower case, special characters, numbers, and/or other inputs may have more testing value as errors in processing strings may be known to occur more often when unexpected values are provided. Data structures (e.g., a particular combination of a plurality of datatypes) may have a testing time estimated from its constitute datatypes. However, for some data structures as well as standard datatypes, a small sampling may be executed and timed to more accurately determine the time required for a particular equivalence test to provide the selected hypothesis strength. As a benefit, datatypes and/or data structures that selectively access resources having an unknown response time may be more accurately benchmarked by such a pilot test. The size of the sample may be fixed or dynamically determined based on the variability of the time for a particular iteration to produce an output. For example, if twenty pilot testing iterations are performed and the deviation of the test duration for each iteration is substantial, then additional testing may be required, as compared to a different equivalence test of twenty pilot iterations producing a response within the same timeframe. Alternatively, a test time range or probability curve may be provided in place of a single time estimate. Similarly, certain resources may be selectively available, utilized, and/or needed during an equivalence test. A resource and/or time range may be provided to indicate the fluctuating availability of a particular resource utilized for a test of equivalence.

Figure 8:
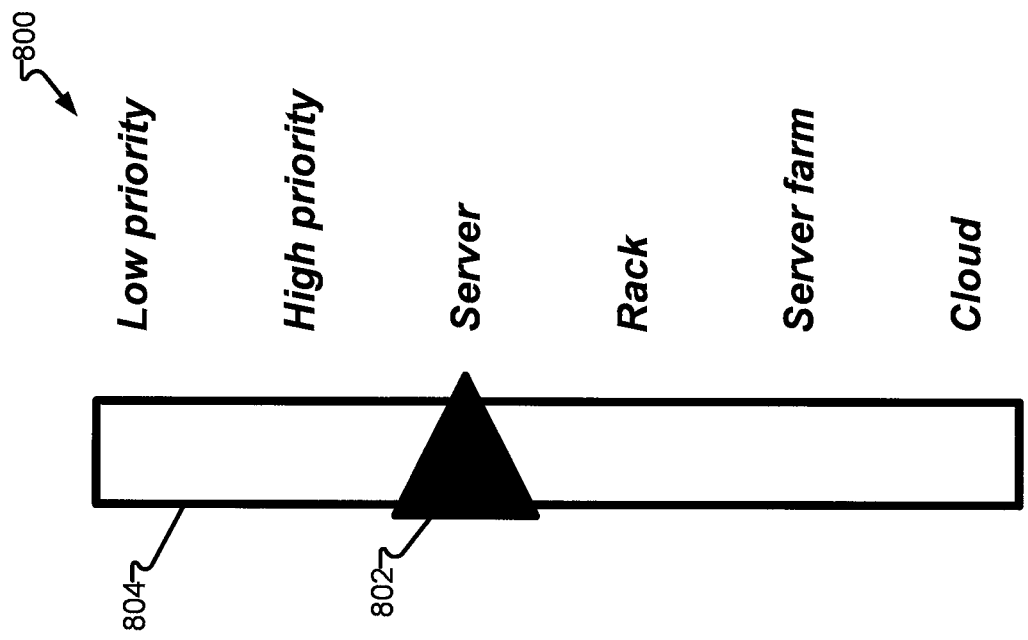
FIG. 8 depicts an equivalence determination resource allocation component in accordance with embodiments of the present disclosure.

FIG. 8 depicts equivalence determination resource allocation component 800 in accordance with embodiments of the present disclosure. In one embodiment, a more explicit allocation of resources may be provided, such as to provide indicia of specific resource available/utilized for various positions along axis 708. For example, scale 804 may indicate a particular resource or resources available. Indicator 802 may indicate a resource(s) utilized in the performance of an equivalence operation. For example, a particular system may comprise a local machine having a processor that may be shared (e.g., execute a process having a low priority), not shared (e.g., execute a process having a high priority), or offload the processing, such as to a server, rack of servers, server farm, or "cloud" comprising many, often thousands, of high-performance servers.

Equivalence determination resource allocation component 800 may indicate resources available for the performance of an equivalence determination. Accordingly, scale 804 may be configured to display processing elements and combinations available which may, or may not, be exclusive to a particular setting. For example, while a single microprocessor executing a "high priority" task may also be performing operations of a "low priority" task, but allocating another component, such as a "server" may de-allocate a local processor. In other embodiments, the use of another component, such as a "server," may be additional and a local processor performs at least some of the operations. In other embodiments, equivalence determination resource allocation component 800 allows a user to pick-and-choose which components, from a pool of available components, will be utilized for the equivalence determination.

In another embodiment, equivalence determination resource allocation component 800 is an output providing indicia of computing resources that are, may, and/or have been utilized for the performance of an equivalence determination.

Figure 9:
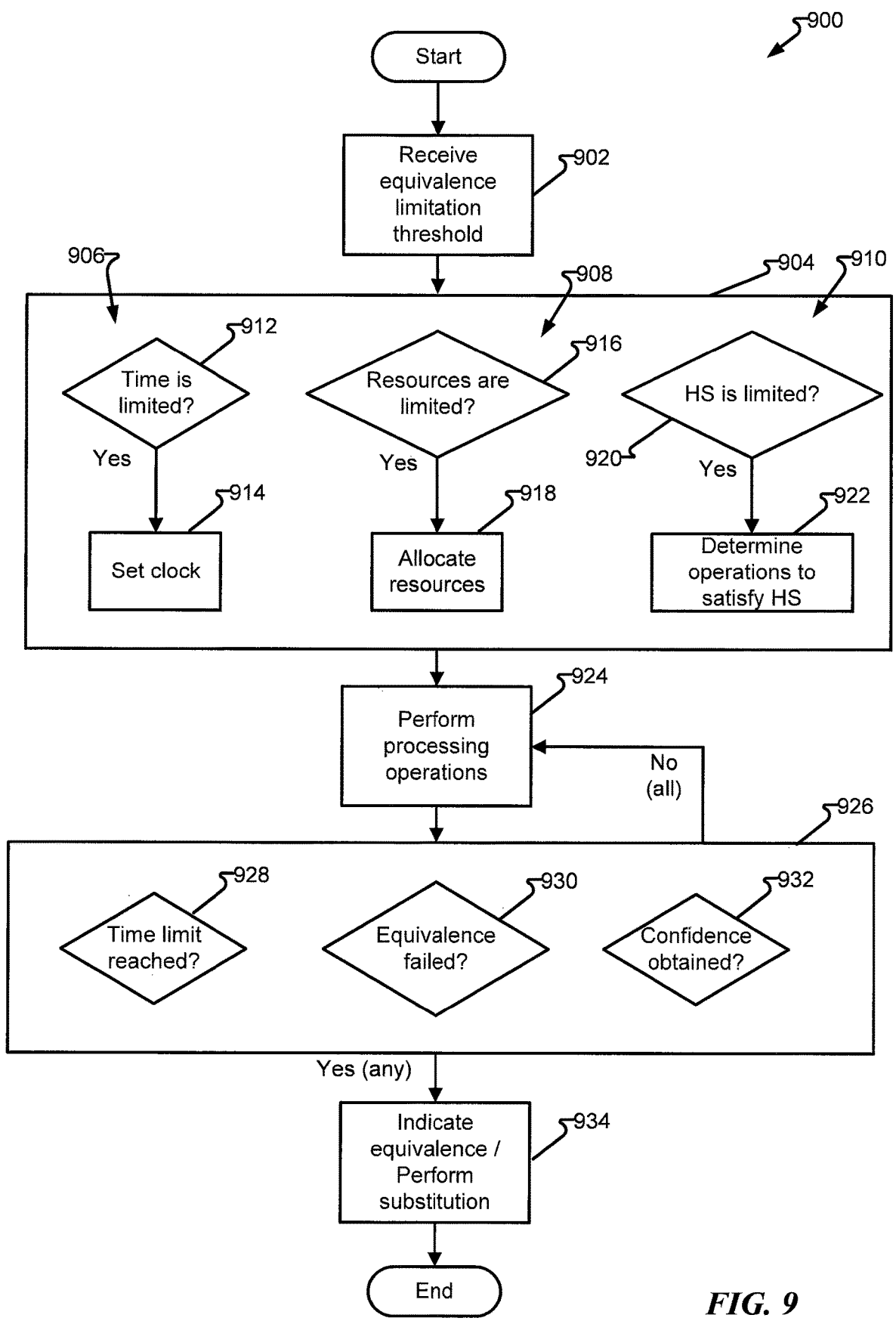
FIG. 9 depicts a sixth process in accordance with embodiments of the present disclosure.

FIG. 9 depicts process 900 in accordance with embodiments of the present disclosure. In one embodiment, process 900 illustrates steps for execute by one or more processors. Process 900 may, entirely or partially, be executed by a processor distinct from the processor(s) utilized to perform equivalence determination (e.g., step 924) the steps of process 900. It should be appreciated that the steps of process 900 may be executed by a processor, such as processor 106, a processor of a server, blade, core, and/or other processing device. Virtual processors provide advantages, such as by allowing the appearance of a dedicated hardware component when such components may be one of a plurality of components, a shared component, a changing hardware component, or provide an interface simulating one processor command set while the underlying hardware component utilizes a different processor command set (e.g., an emulator). While certain embodiments described herein may be implemented on a virtual processor, such as a "cloud" or virtual machine, the actual processor operations may give the appearance of software performing processor operations, however, the underlying hardware remains and ultimately performs the operations described herein.

In one embodiment, step 902 receives an equivalence limitation threshold. Step 902 may be performed, such as by equivalence limitation component 700, equivalence determination resource allocation component 800, accessing a record in a memory or a data storage component, and/or other input means. Step 904 executes one or more of subprocesses 906, 908, and 910 in accordance with the input received in step 902. Subprocesses 906, 908, and 910 may be executed in parallel or in sequence as a matter of design choice. Subprocess 906 is executed and step 912 determines if the input received in step 902 is a time limitation. If yes, step 912 is executed such as to set a clock, countdown, timer, or other means by which processing (e.g., steps 924 and 926) may be terminated upon the occurrence of a temporal state indicated by the input received in step 902. Subprocess 908 is executed and step 916 determines if the resource is limited by the input received in step 902 and, if yes, step 918 executes the allocation step. Step 918 may allocate resources, such as by signaling a supervising resource to allocate use of supervised resources and/or deny access to extraneous processes for the supervised resource during execution of at least a portion of process 900 (e.g., steps 924 and 926). Subprocess 910 is executed and step 920 determines if process 900 is hypothesis strength ("HS") limited, such that steps 924 are to be performed until a specified hypothesis strength of the result is determined.

In one embodiment, at least one of steps 912, 916, 920 is determined in the affirmative. If any of steps 912, 916, 920 is determined in the negative the next step (e.g., 914, 918, 922, respectively) may be omitted. If any of steps 912, 916, 920 are executed in series, upon completion of any one or more of steps 912, 916, 920, an unexecuted step 912, 916, 920 may then be executed.

In another embodiment, step 904 may resolve a conflict between two or more of subprocesses 906, 908, and 910. For example, a user may input a request to perform an equivalence determination, utilizing a fixed processing resource, to produce a 99.8% hypothesis strength and to stop after fifteen minutes. A processor, such as processor 106, may be executing steps of process 900 and determine that the particular equivalence determination requested cannot be performed within the time limit specified to provide a result with the specified degree of hypothesis strength. Accordingly, process 900 may loop back (not shown) to step 902 to receive an alternative input from the user. As can be appreciated, system executing process 900 may prompt a user input an achievable result with respect to time, hypothesis strength, and resources. Alternatively, process 900 may continue until any one of the conditionals (see, step 926) are true and thereby prompt the user as to whether the results are sufficient or to continue. For example, after a first threshold (e.g., step 928 determines that fifteen minutes has passed), the user may be prompted, such as to say, "The fifteen minute time limit has been reached with a 9.8% hypothesis strength. End? Continue?" and resume or terminate accordingly. Alternatively, the user may be prompted to authorize and/or allocate additional processing resources and/or an automatic resource allocation component may allocate processing resources to comply with a hypothesis strength and/or time limitation.

Once limitations are known, or become known (e.g., an interrupt), step 924 performs processing operations associated with the determination of equivalence. In one embodiment, processing operations may be a number of iterations of a test, whereby a particular input is provided to both a candidate source code and a preferred source code and the outputs of each are then assessed for equivalence, processor clock cycles, processor operations, FLOPs, etc. Additionally or alternatively, a conversion of one value to another may be provided and utilized (e.g., number of iterations may be converted to processor cycles, etc.)

Next, in step 924, processing operations are performed by the selected/allocated processing resource. Step 926 determines if processing step 924 should be terminated. Step 926 comprises substeps 928, 930, and 932. In one embodiment, if any of substeps 928, 930, and 932 is true, processing is to be interrupted and process 900 continues to step 934. In another embodiment, if all of substeps 928, 930, and 932 are determined in the negative, process 900 continues and step 924 continues. Step 928 comprises step 928 which determines whether a time limit has been reached, such as a time, duration, etc., set in step 914. Step 928 comprises step 930 which determines whether equivalence has failed, that is, an operation of step 924 found that a candidate source code and a preferred source code, when provided with equivalent inputs, fail to produce equivalent outputs. Step 928 comprises step 932 which determines whether a specified hypothesis strength ("HS"), such as set in step 922, has been reached. Next, step 934 is executed whereby an indication of equivalence is indicated or the lack of equivalence if step 930 is determined in the affirmative. Optionally, step 934 may execute a substitution operation whereby the preferred source code replaces the candidate source code.

Figure 13:
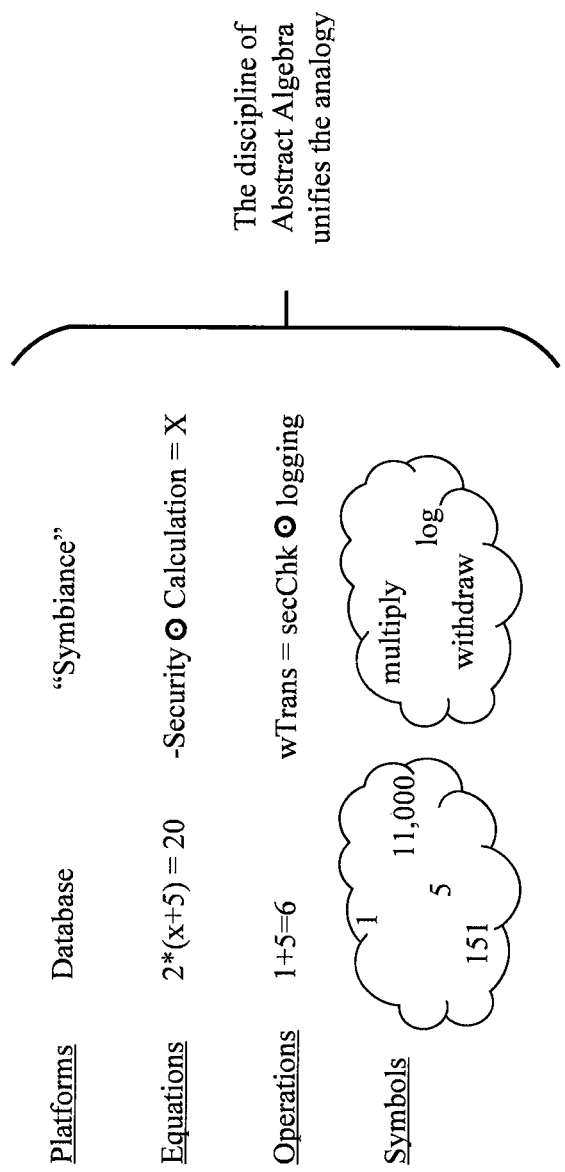
Figure 71:
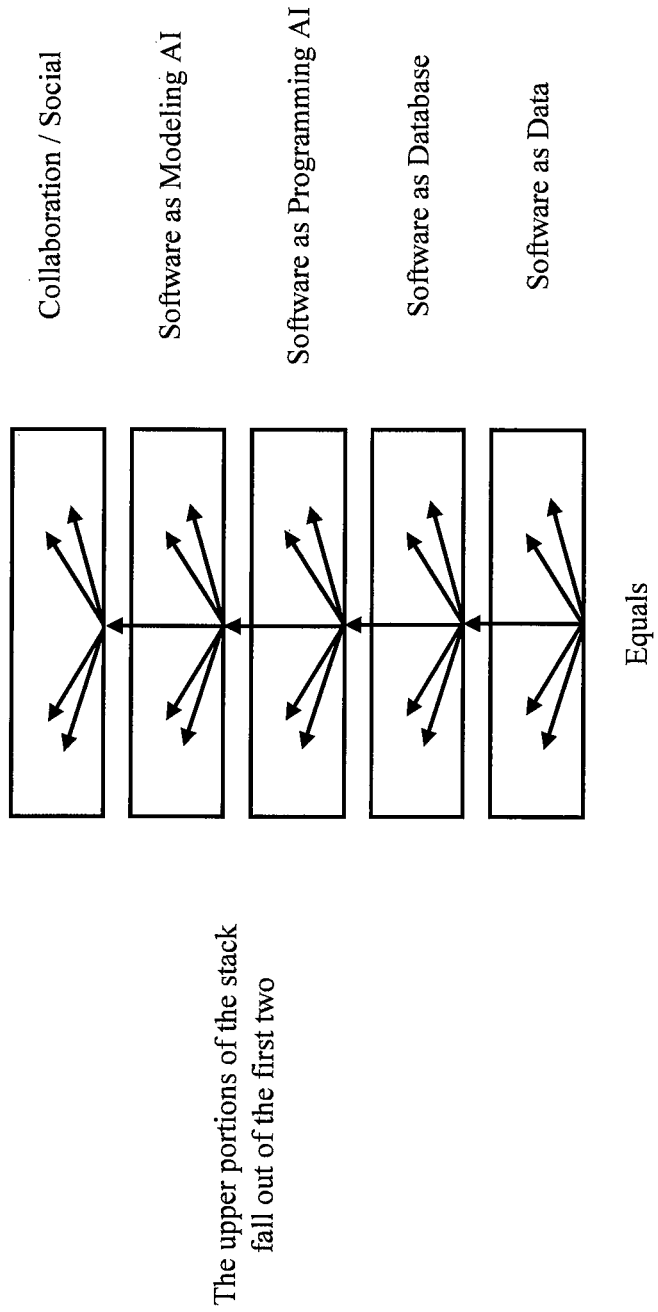

FIGS. 10-71 depict a solution in accordance with embodiments of the present disclosure. FIG. 10 depicts at least a portion of an overview of a problem and solution in accordance with embodiments of the present disclosure. FIG. 11 depicts at least a portion of an additional overview of problems solved in accordance with embodiments of the present disclosure. FIG. 12 depicts at least a portion of a goal in accordance with embodiments of the present disclosure. FIG. 13 depicts at least a portion of an analogy in accordance with embodiments of the present disclosure. FIG. 14 depicts at least a portion of an additional overview portion in accordance with embodiments of the present disclosure. FIG. 15 depicts at least a portion of an additional overview portion in accordance with embodiments of the present disclosure.

Figure 17:
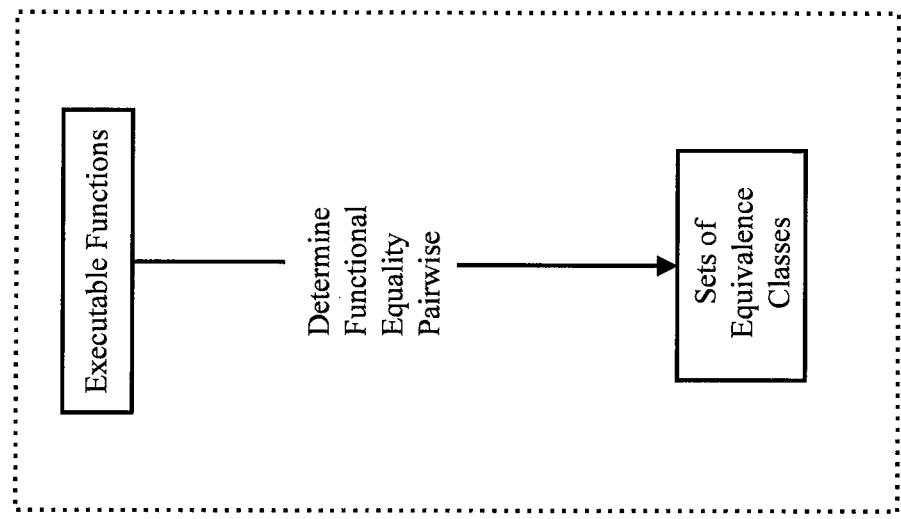
Figure 18:
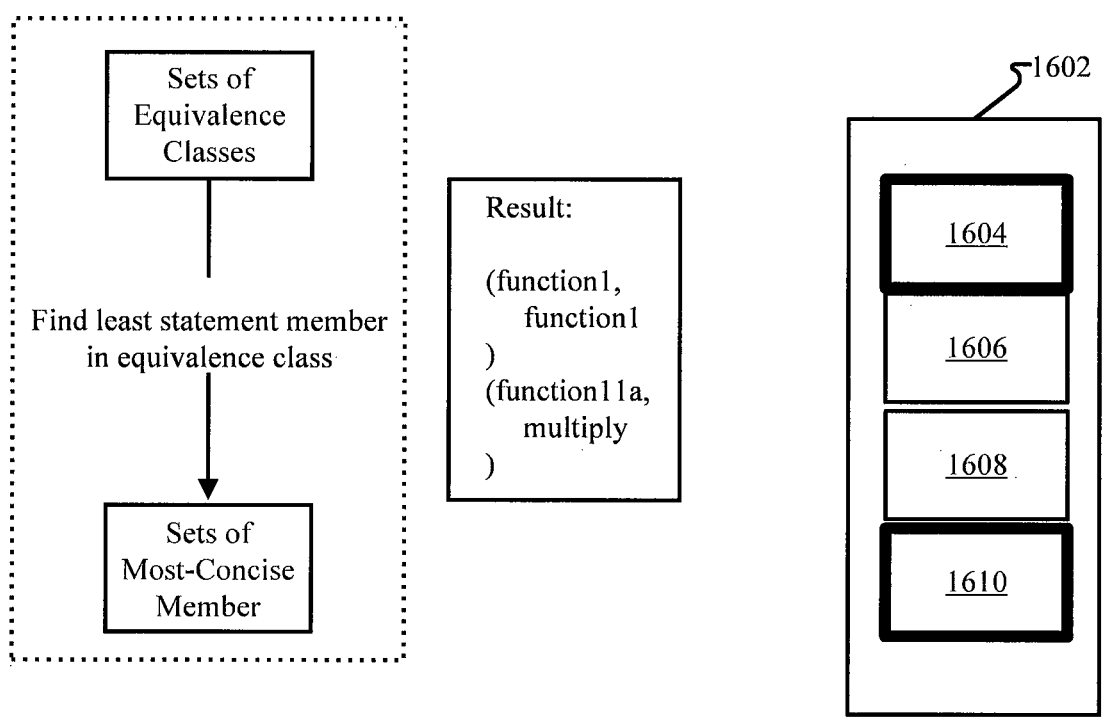
Figure 19A:
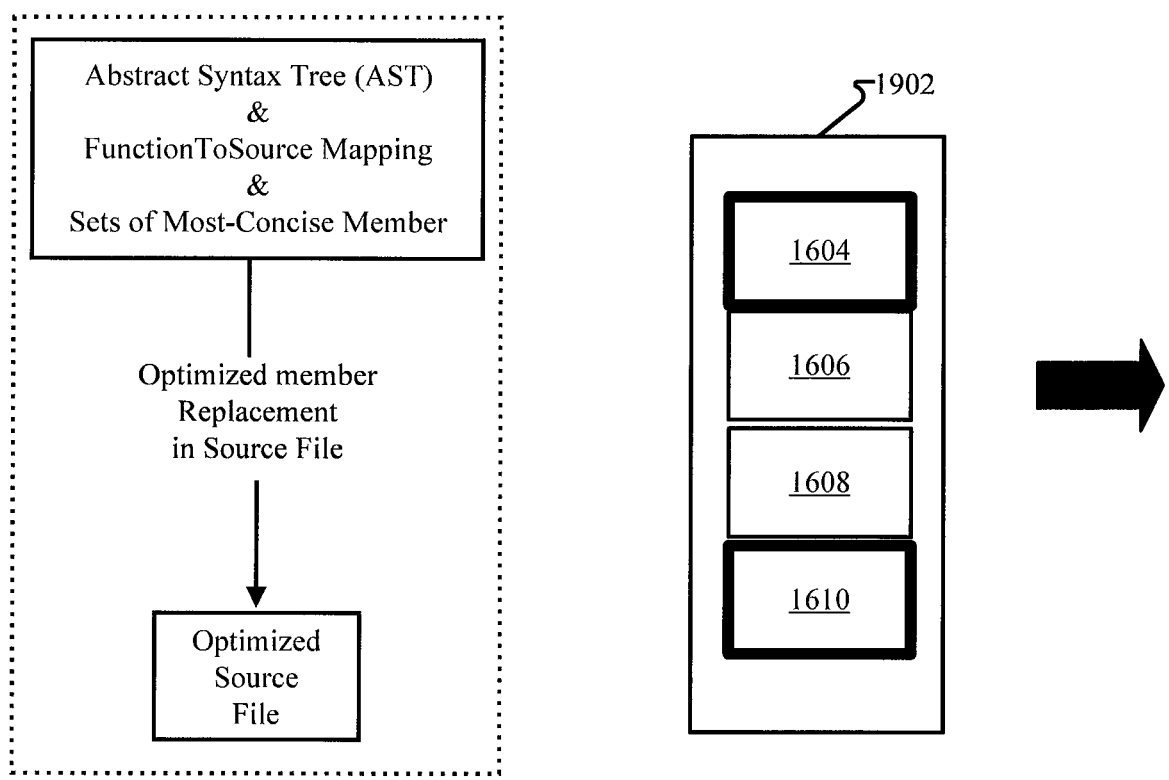

FIG. 16 depicts at least one portion of the solution provided by FIGS. 10-71, comprising code 1602 having function 1604, function 1606, function 1608, and function 1610. FIG. 17 depicts at least one portion of the solution provided by FIGS. 10-71, comprising code 1602 having function 1604, function 1606, function 1608, and function 1610. Function 1604 and function 1610 are emphasized. FIG. 18 depicts at least one portion of the solution provided by FIGS. 10-71, comprising code 1602 having function 1604, function 1606, function 1608, and function 1610. Function 1604 and function 1610 are emphasized. FIG. 19A depicts at least one portion of the solution provided by FIGS. 10-71, comprising code 1602 having function 1604, function 1606, function 1608, and function 1610. Function 1604 and function 1610 are emphasized.

Figure 19B:
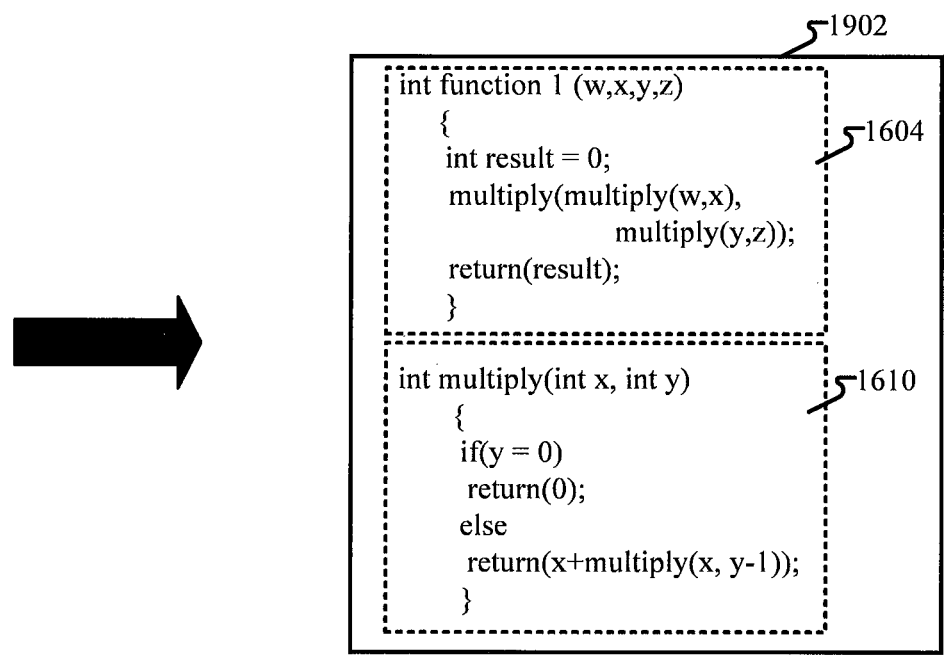
Figure 20:
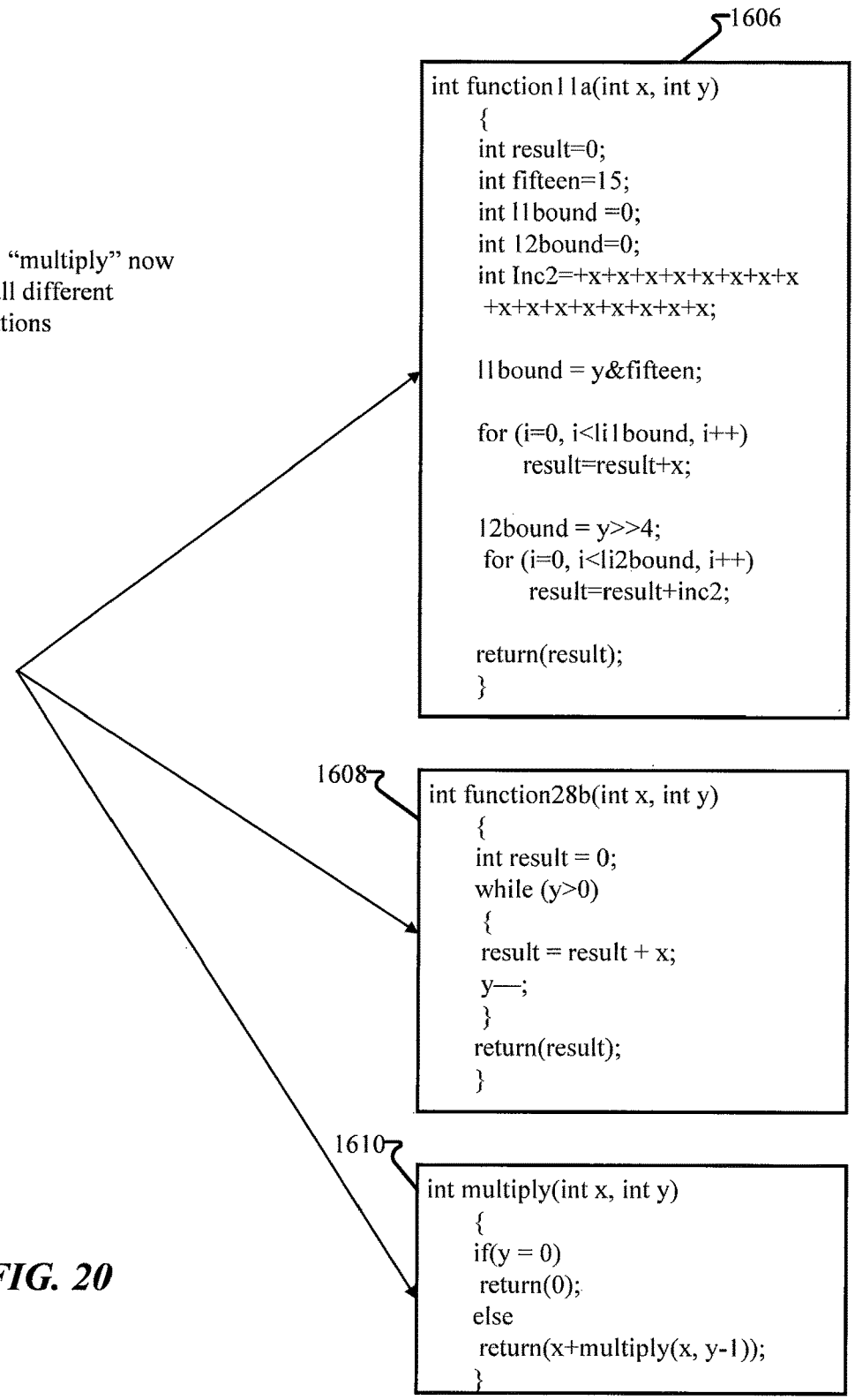

FIGS. 19B, 20, 27 each depict at least one portion of the solution provided by FIGS. 10-71, and each comprise code 1902 having function 1604 and function 1610. FIG. 19 is illustrated by FIG. 19A, illustrating the left-hand portion of FIG. 19 and FIG. 19B, illustrating the right-hand portion of FIG. 19. FIG. 20 depicts at least one portion of the solution provided by FIGS. 10-71, comprising function 1606, function 1608, and function 1610.

Figure 22:
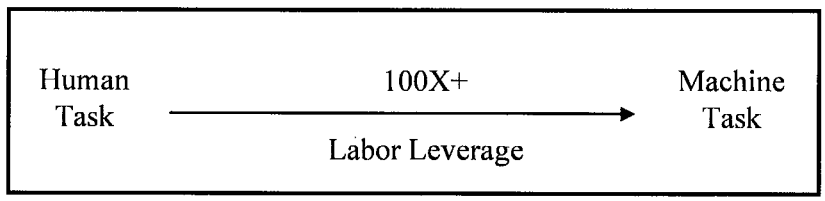
Figure 25:
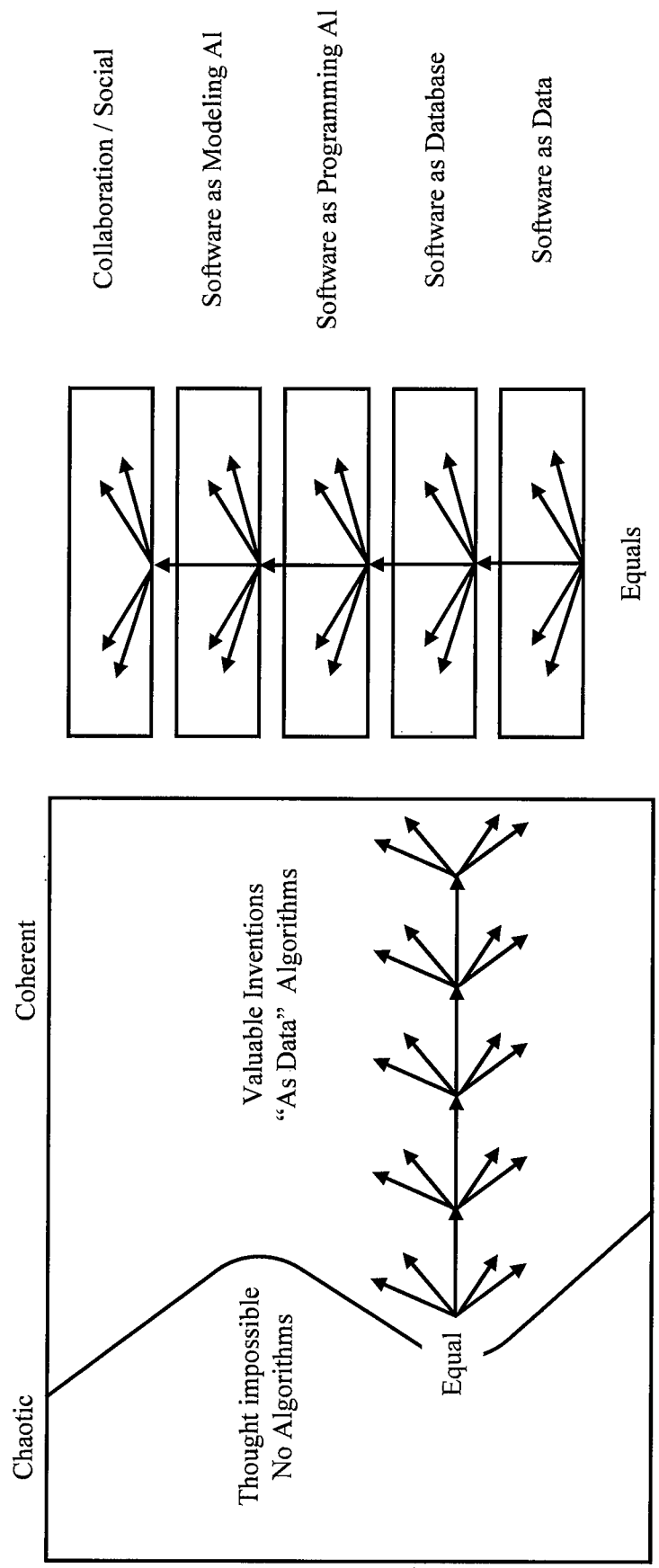
Figure 26:
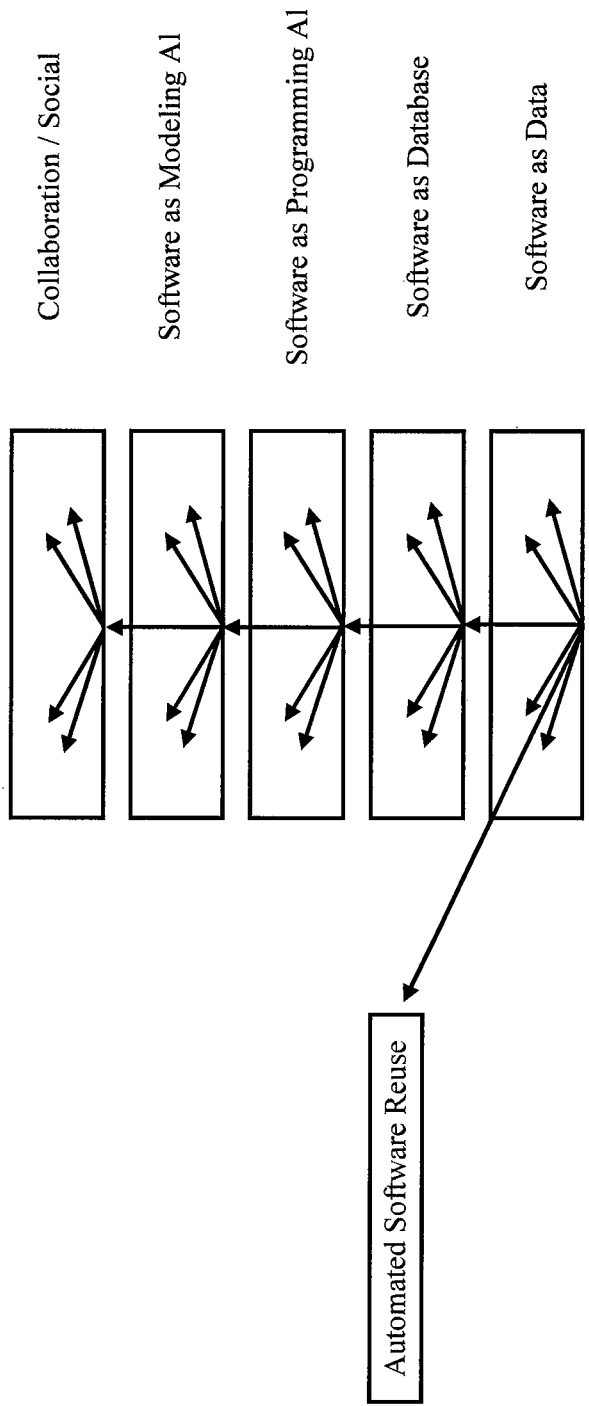
Figure 28:
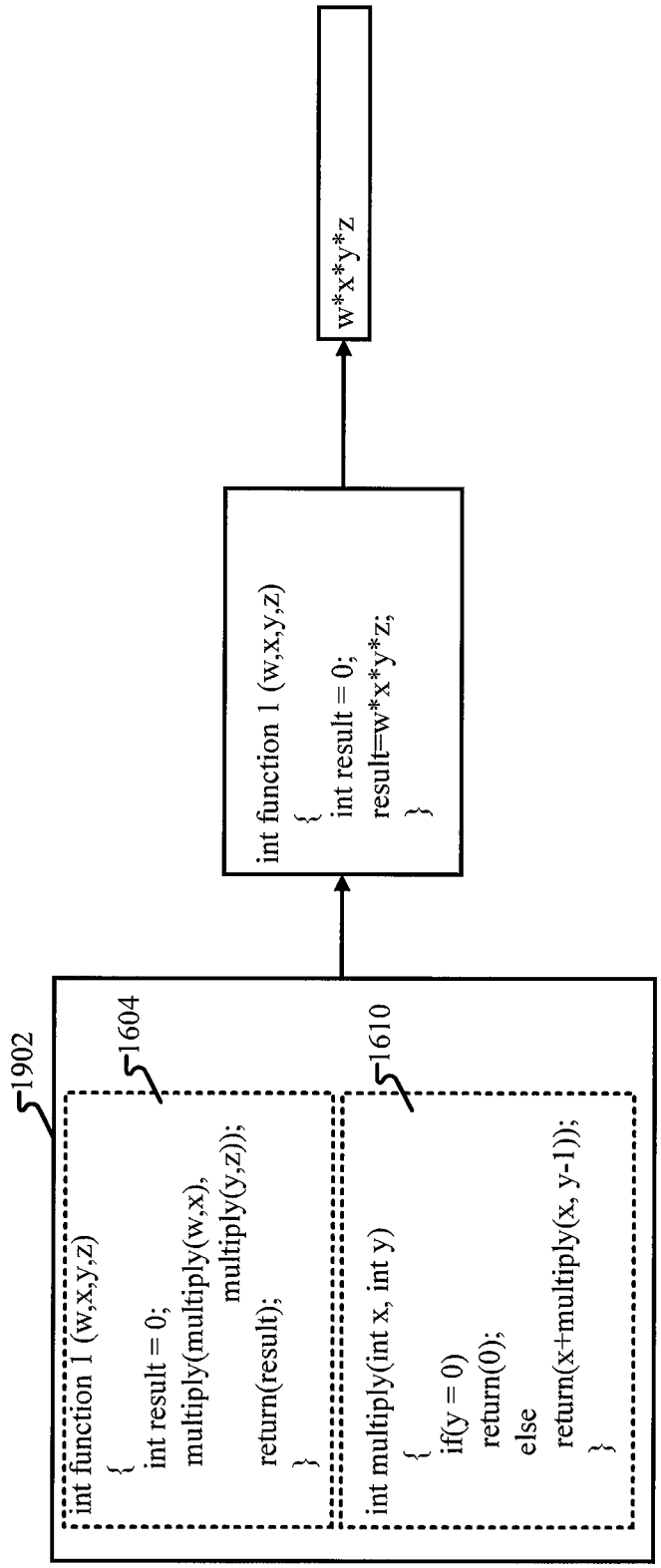

FIG. 21 depicts at least one portion of the solution provided by FIGS. 10-71. FIG. 21 depicts at least one portion of the solution provided by FIGS. 10-71. FIG. 22 depicts at least one portion of the solution provided by FIGS. 10-71. FIG. 23 depicts at least one portion of the solution provided by FIGS. 10-71. FIG. 24 depicts at least one portion of the solution provided by FIGS. 10-71. FIG. 24 depicts at least one portion of the solution provided by FIGS. 10-71. FIG. 25 depicts at least one portion of the solution provided by FIGS. 10-71. FIG. 26 depicts at least one portion of the solution provided by FIGS. 10-71. FIG. 27 depicts at least one portion of the solution provided by FIGS. 10-71 and comprising source code 1902, function 1604 and function 1610. FIG. 28 depicts at least one portion of the solution provided by FIGS. 10-71 and comprising source code 1902, function 1604 and function 1610. FIG. 29 depicts at least one portion of the solution provided by FIGS. 10-71. FIG. 30 depicts at least one portion of the solution provided by FIGS. 10-71. FIG. 31 depicts at least one portion of the solution provided by FIGS. 10-71.

FIG. 32 depicts at least one portion of the solution provided by FIGS. 10-71, comprising code 3502. FIG. 30A depicts at least one portion of the solution provided by FIGS. 10-71, comprising code 3202.

Figure 33B:
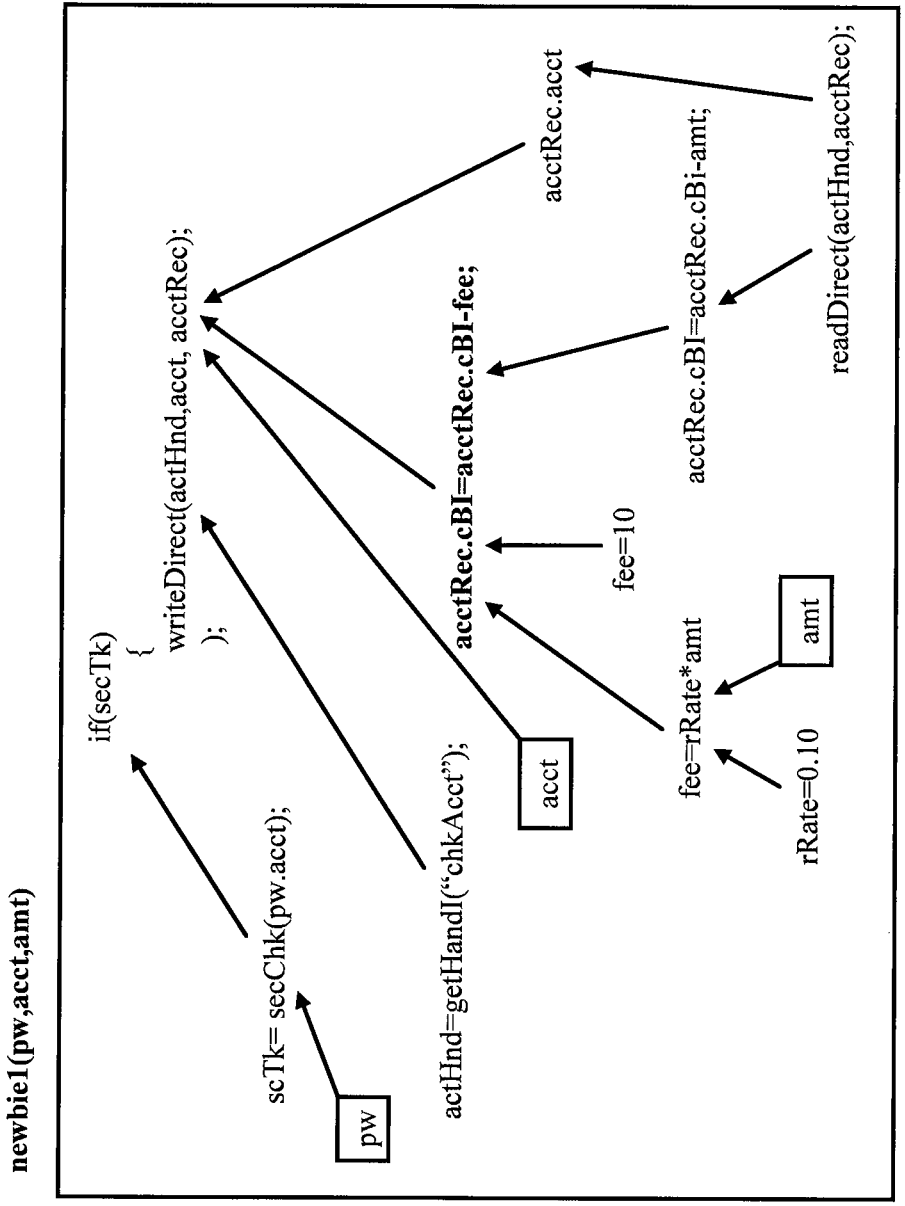
Figure 34B:
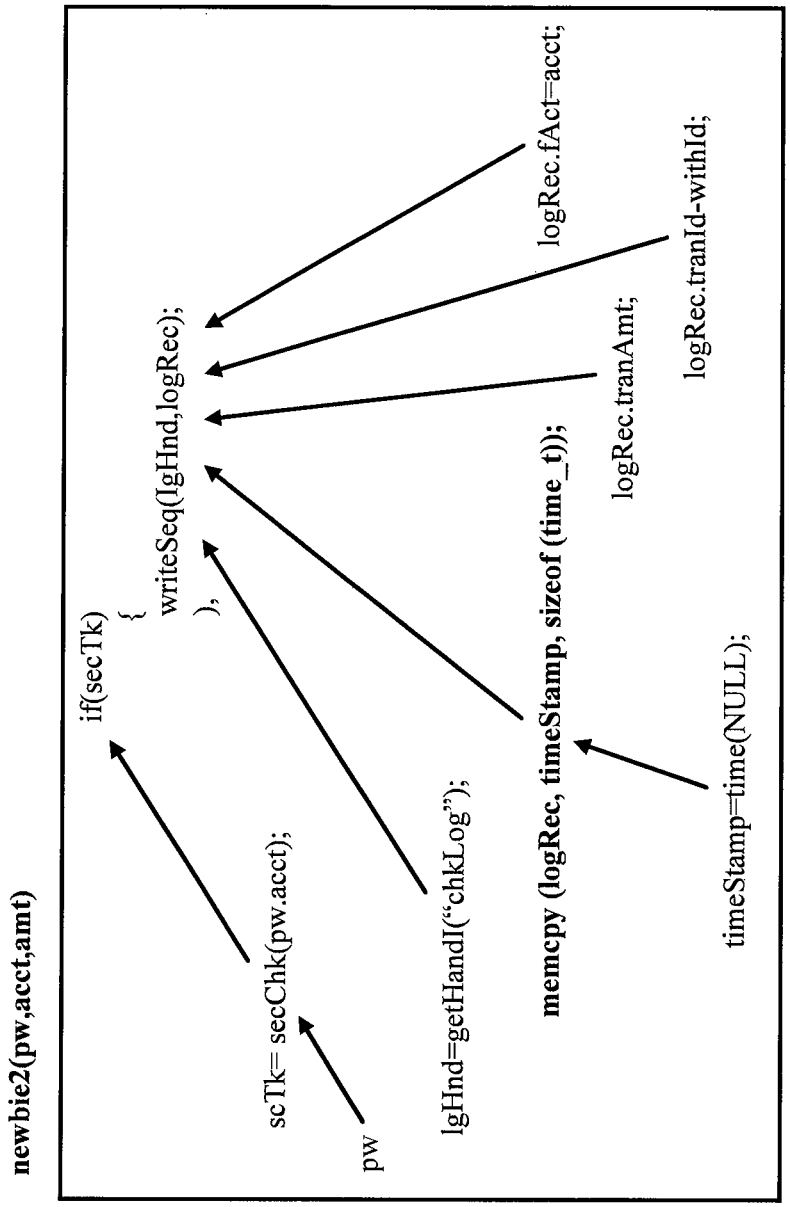
Figure 35C:
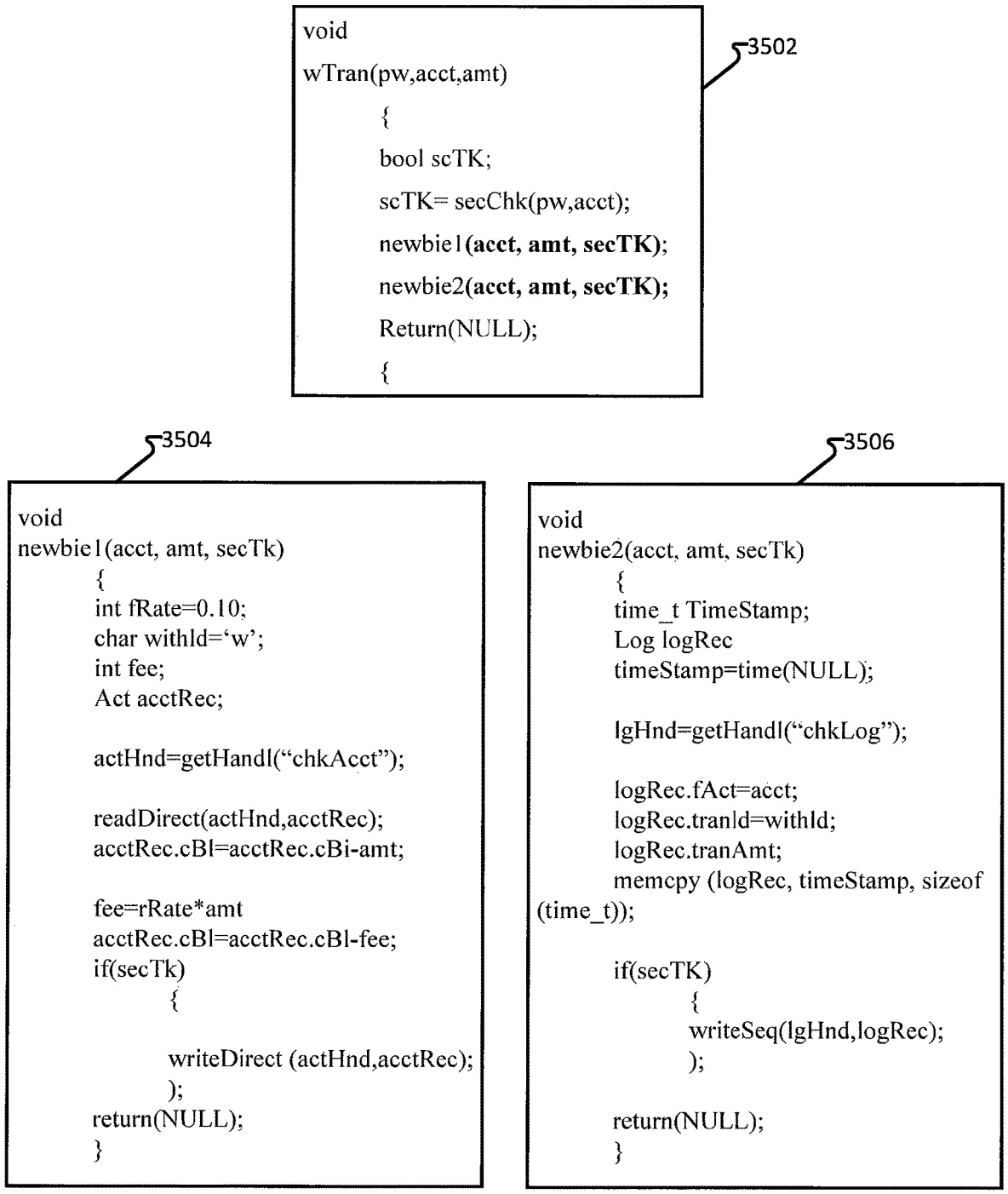
Figure 36:
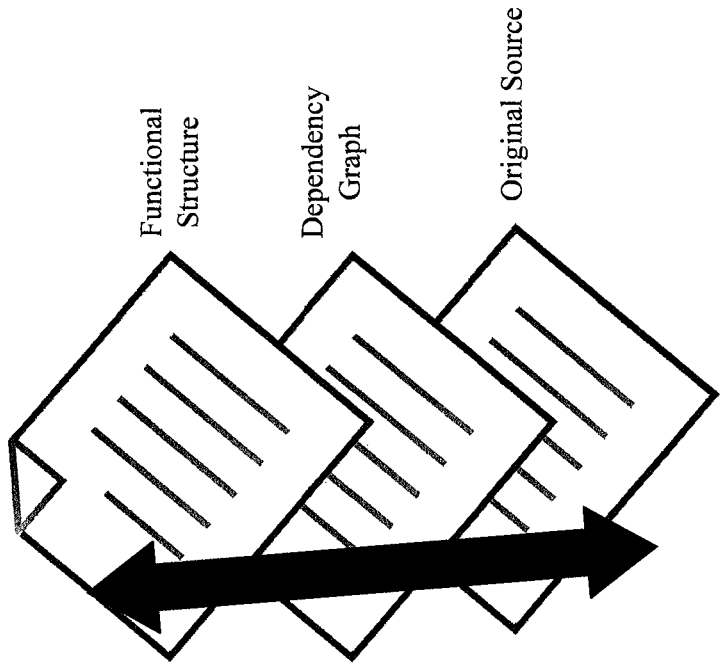
Figure 38:
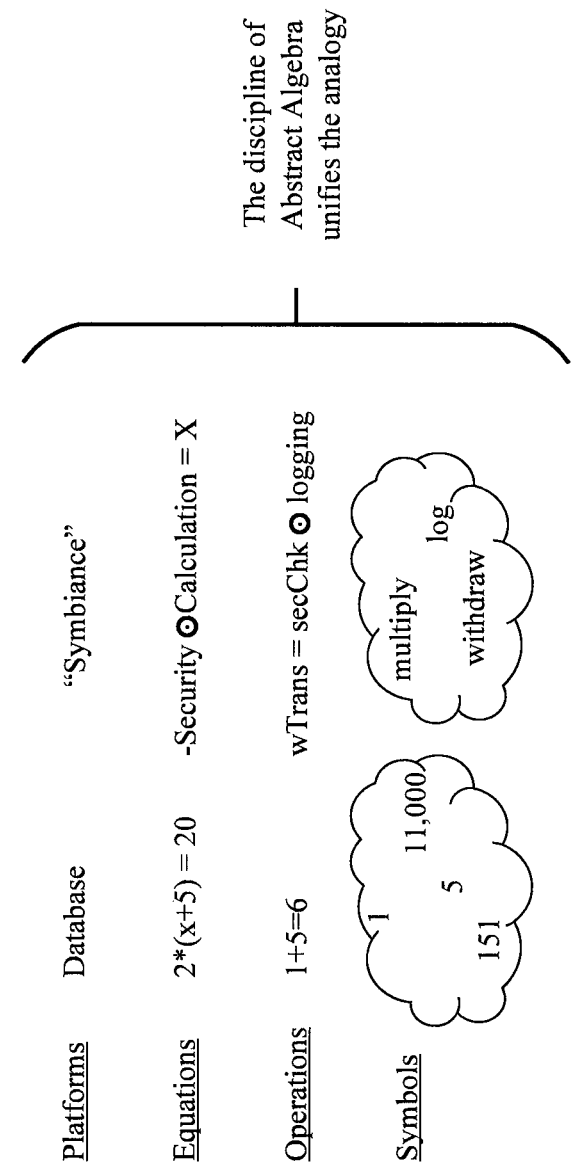

FIG. 33 is illustrated by FIG. 33A, illustrating the left-hand portion of FIG. 33, and FIG. 33B, illustrating the right-hand portion of FIG. 33. FIG. 34A depicts at least one portion of the solution provided by FIGS. 10-71, comprising code 3402. FIG. 38A depicts at least one portion of the solution provided by FIGS. 10-71, comprising code 3502. FIG. 34 is illustrated by FIG. 34A, illustrating the left-hand portion of FIG. 34, and FIG. 34B, illustrating the right-hand portion of FIG. 34. FIG. 35 is illustrated by FIG. 35A, illustrating the left-hand portion of FIG. 35, FIG. 35B, illustrating the central portion of FIG. 35, and FIG. 31C illustrating the right-hand portion of FIG. 35. FIG. 35C depicts at least one portion of the solution provided by FIGS. 10-71, comprising function 3502, function 3504, and function 3506. FIG. 36 depicts at least one portion of the solution provided by FIGS. 10-71. FIG. 37 depicts at least one portion of the solution provided by FIGS. 10-71. FIG. 38 depicts at least one portion of the solution provided by FIGS. 10-71. FIG. 39 depicts at least one portion of the solution provided by FIGS. 10-71. FIG. 40 depicts at least one portion of the solution provided by FIGS. 10-71, comprising function 3502, function 4002, and function 4004.

Figure 41:
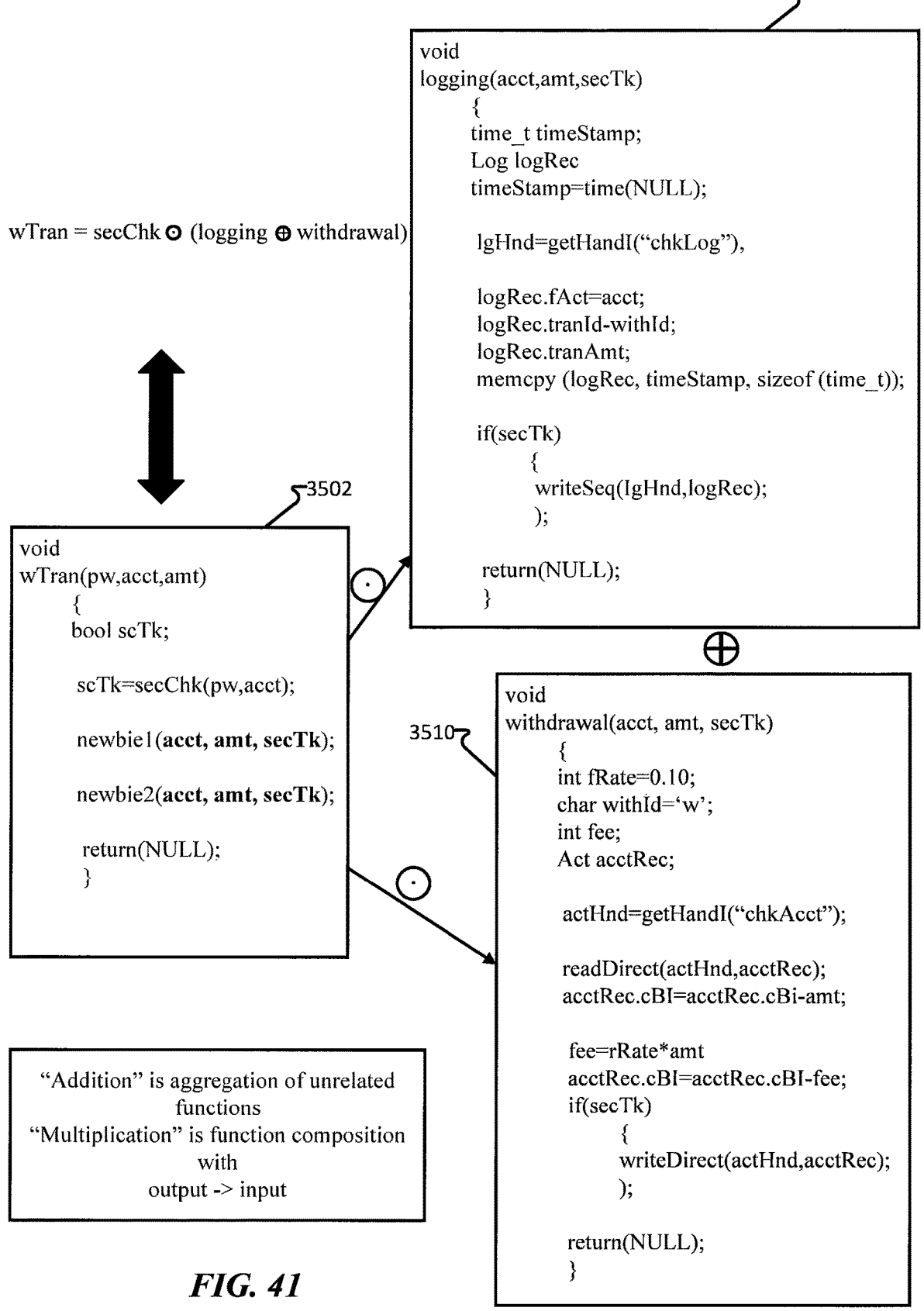

FIG. 41 depicts at least one portion of the solution provided by FIGS. 10-71, comprising function 3502, function 3508, and function 3510. FIG. 42 depict at least one portion of the solution provided by FIGS. 10-71, and each comprise functions 3502, function 3508, and function 3510.

Figure 43:
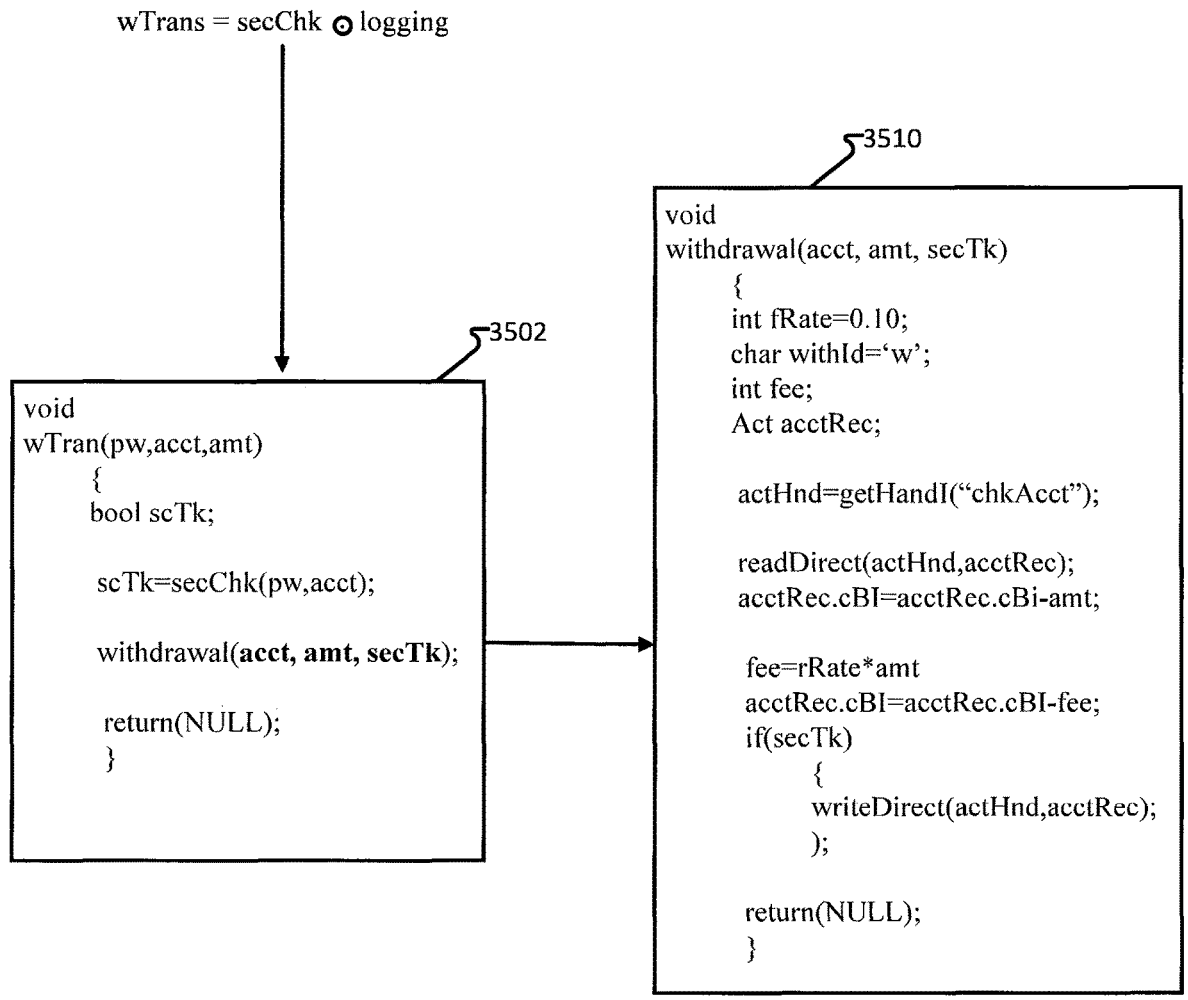

FIG. 43 depicts at least one portion of the solution provided by FIGS. 10-71, comprising functions 3502 and function 3510.

Figure 44:
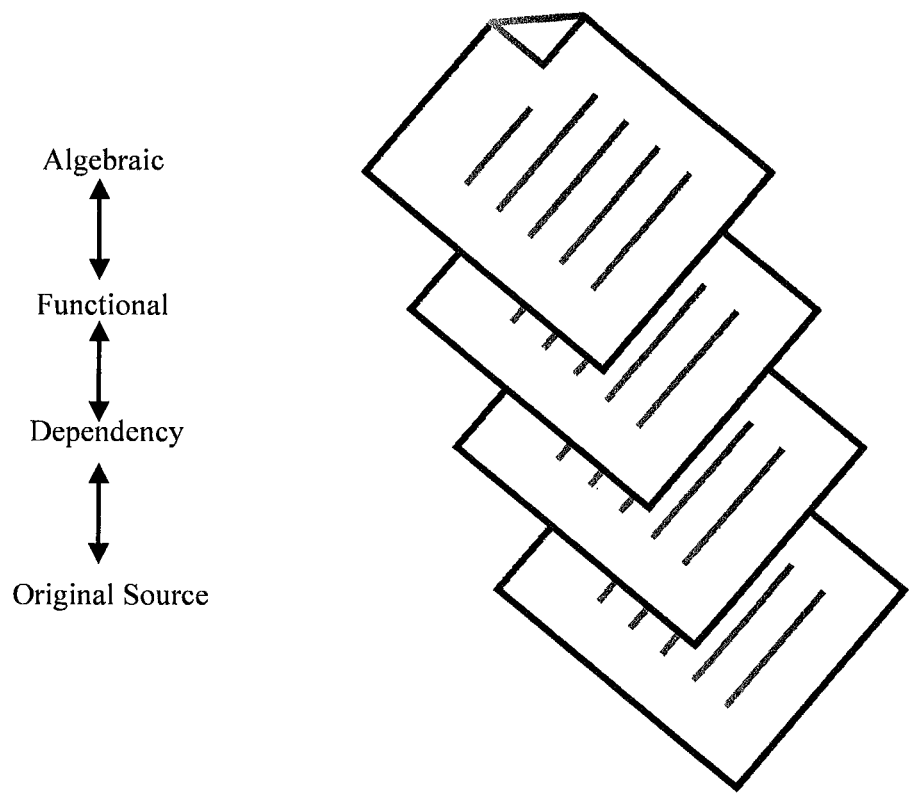
Figure 48:
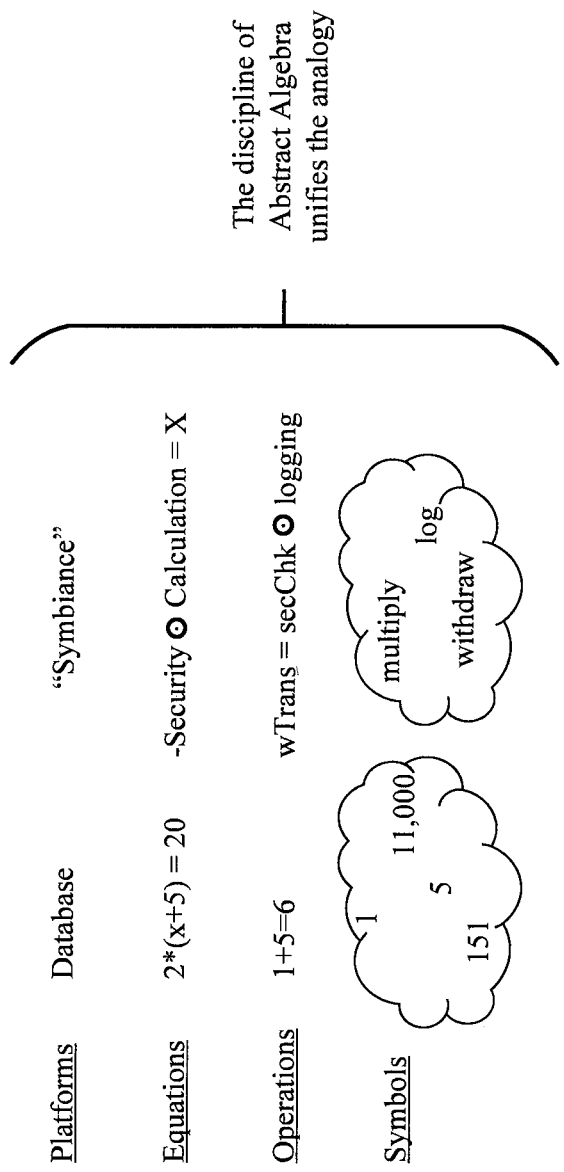
Figure 49:
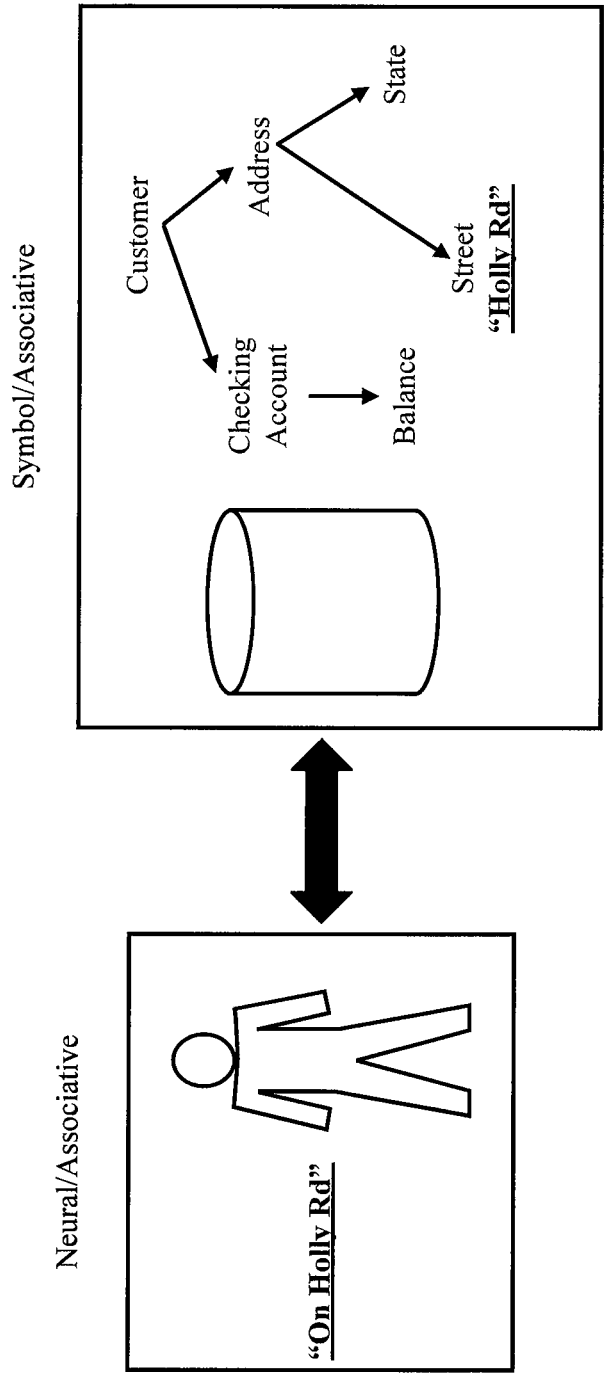
Figure 50:
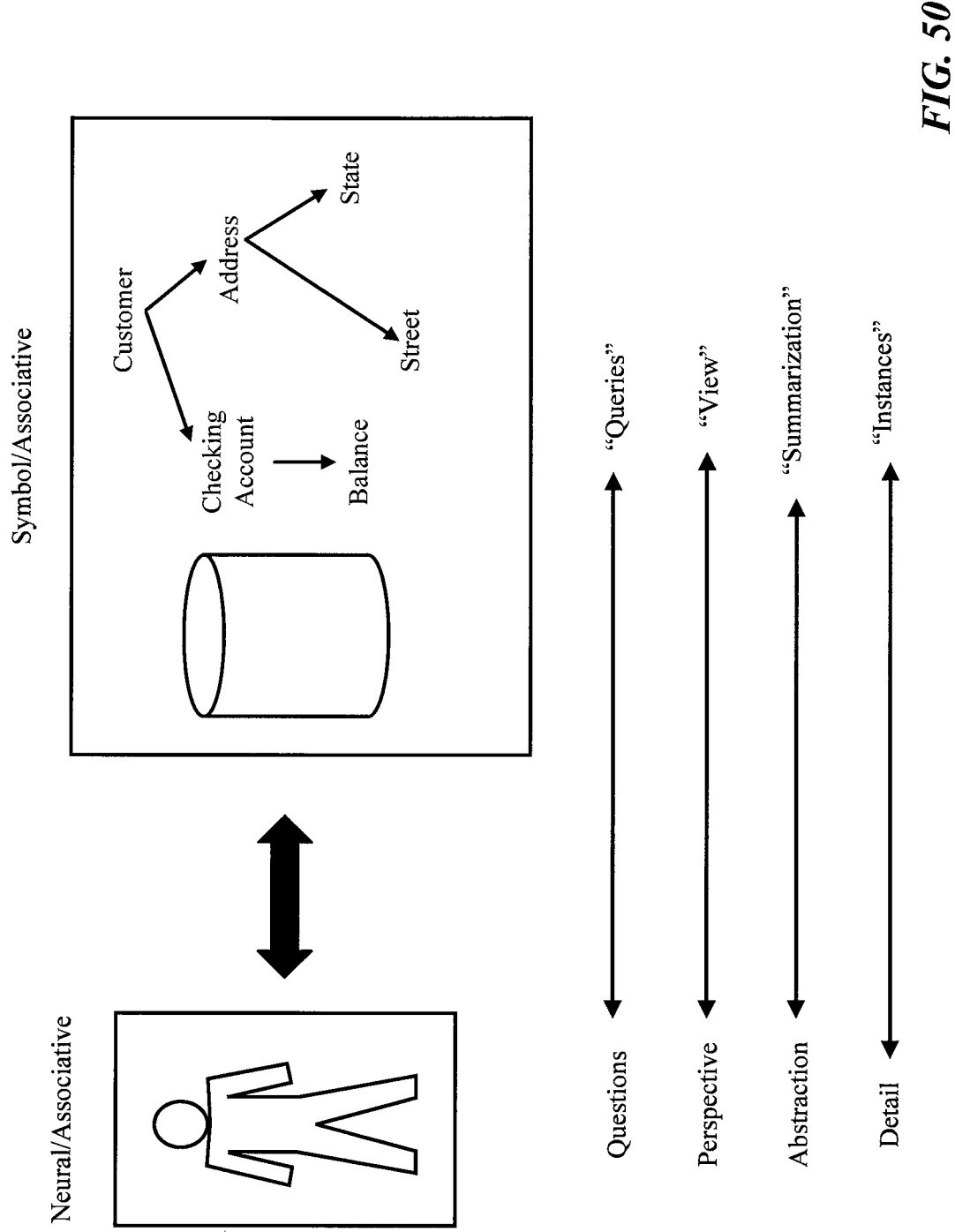
Figure 51A:
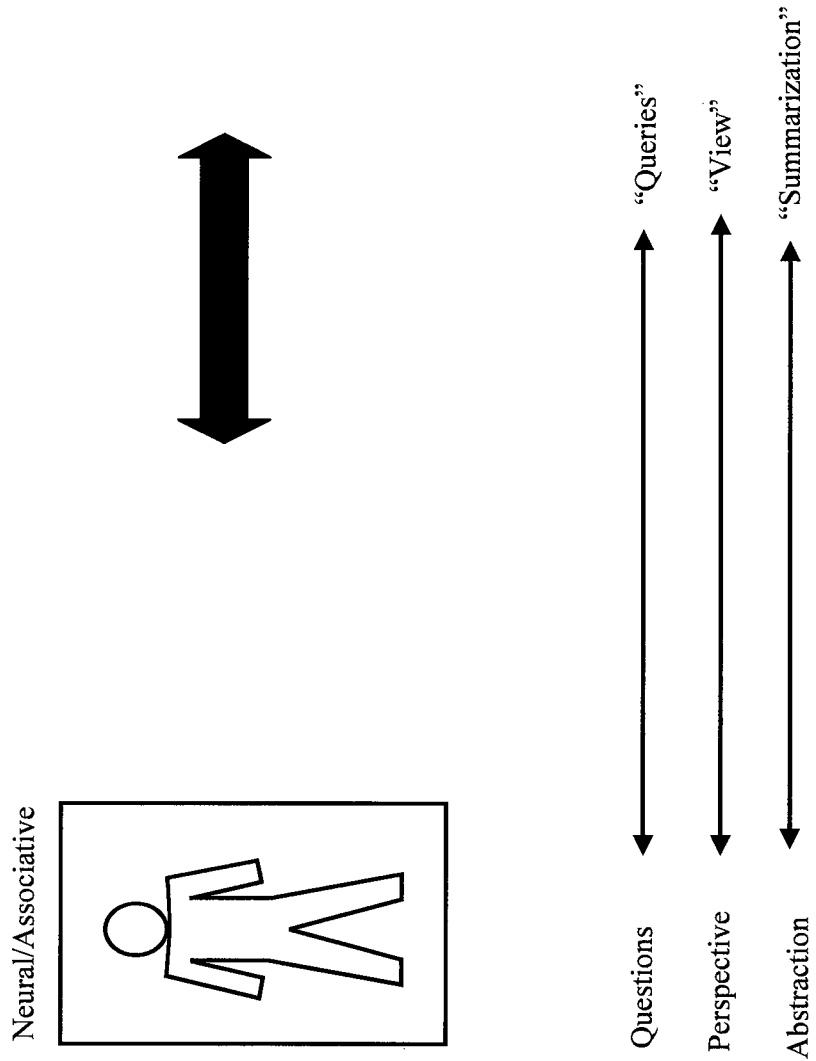
Figure 51B:
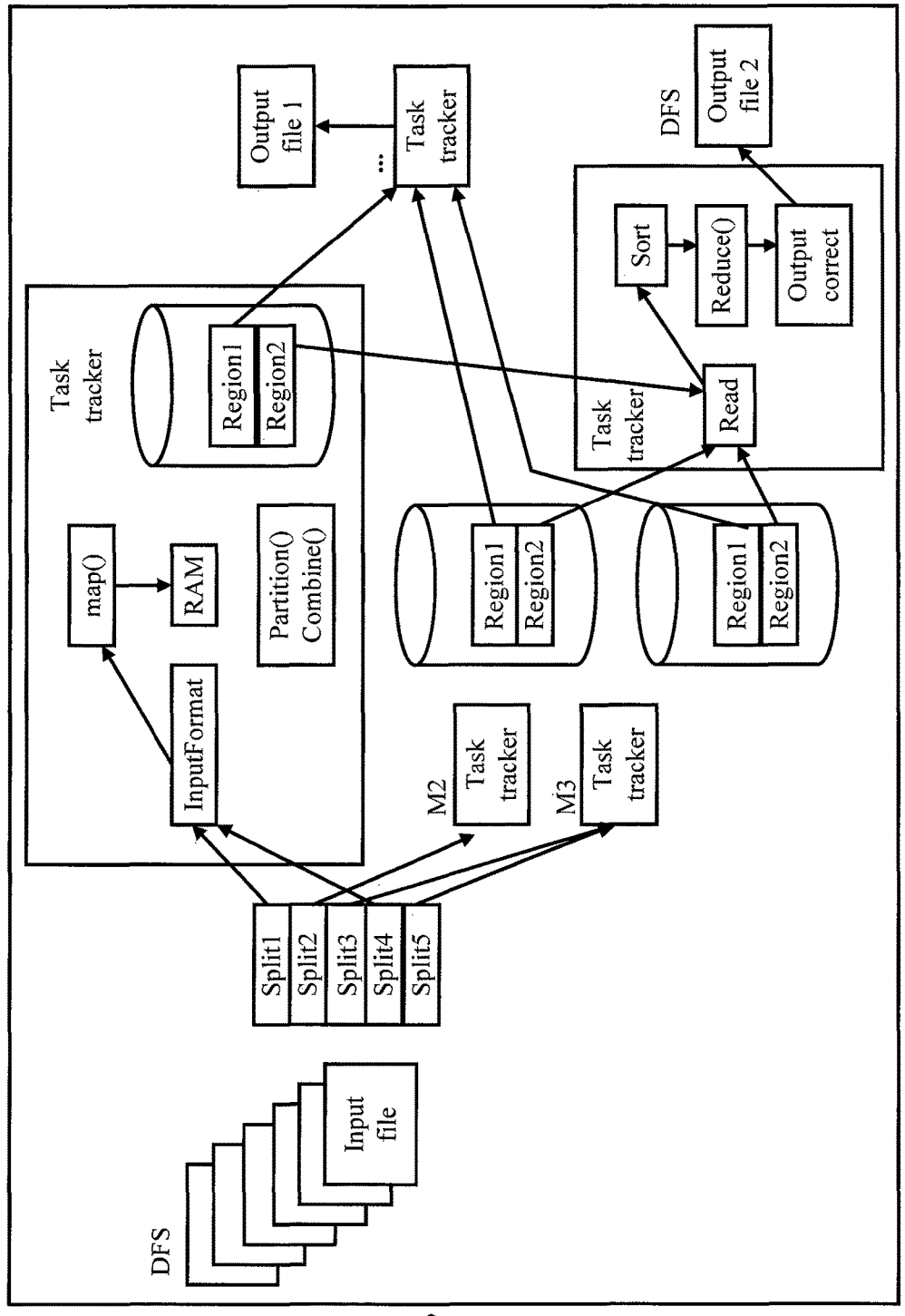
Figure 52:
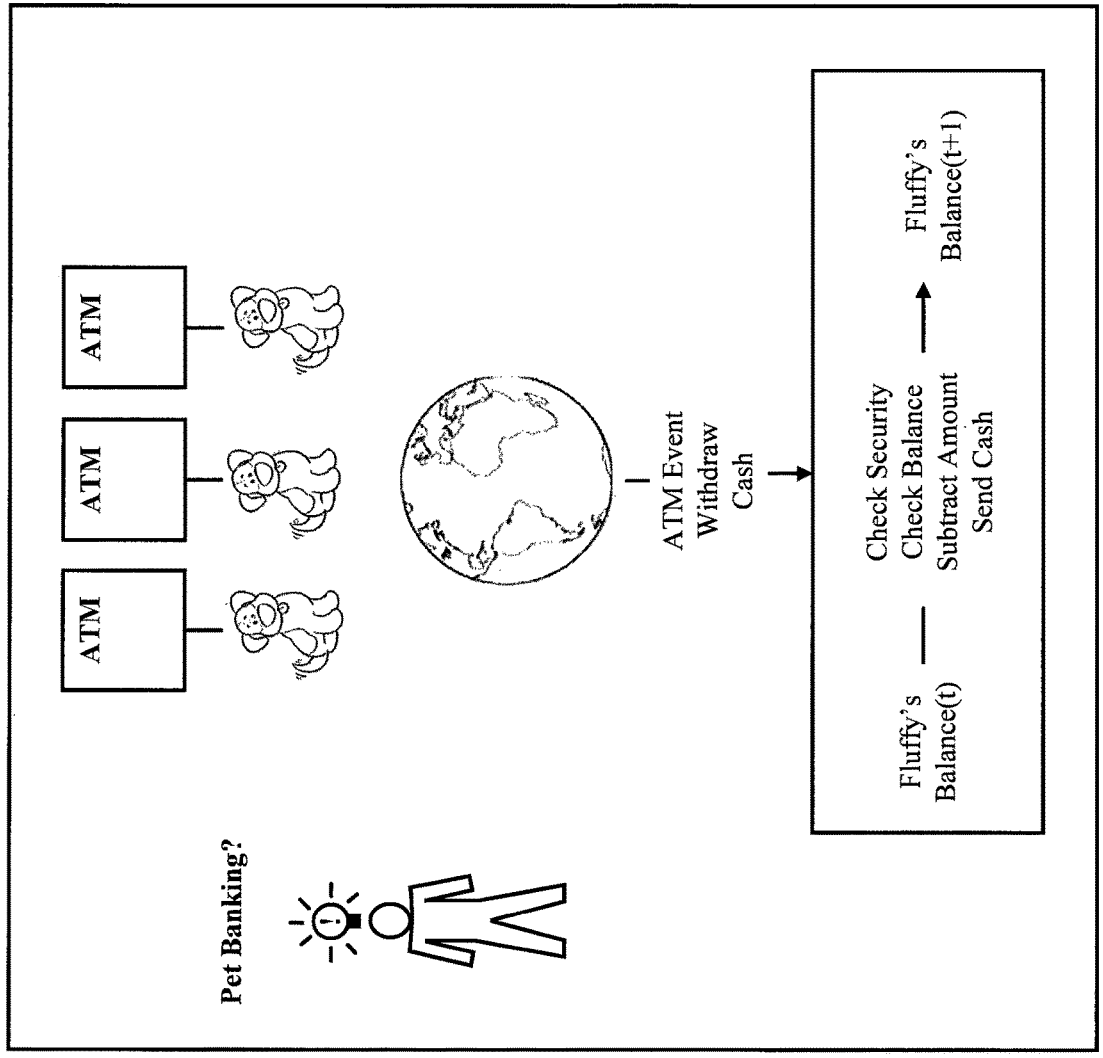
Figure 53:
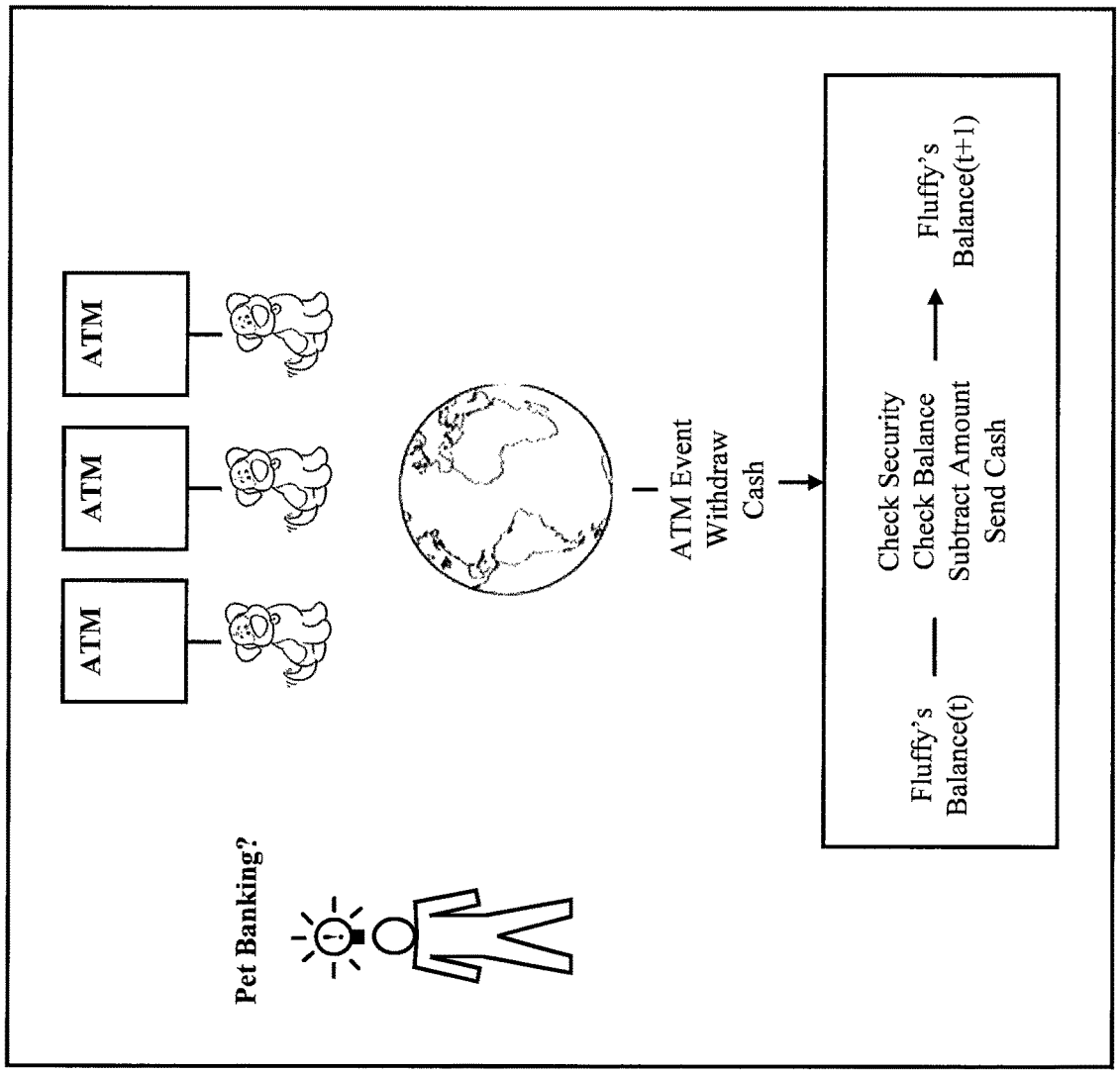

FIG. 44 depicts at least one portion of the solution provided by FIGS. 10-71. FIG. 45 depicts at least one portion of the solution provided by FIGS. 10-71. FIG. 46 depicts at least one portion of the solution provided by FIGS. 10-71. FIG. 47 depicts at least one portion of the solution provided by FIGS. 10-71. FIG. 48 depicts at least one portion of the solution provided by FIGS. 10-71. FIG. 49 depicts at least one portion of the solution provided by FIGS. 10-71. FIG. 50 depicts at least one portion of the solution provided by FIGS. 10-71. FIG. 51 depicts at least one portion of the solution provided by FIGS. 10-71 and is illustrated by FIG. 51A, illustrating the left-hand portion of FIG. 51, FIG. 51B, illustrating the right-hand portion of FIG. 51. FIG. 52 depicts at least one portion of the solution provided by FIGS. 10-71. FIG. 50 depicts at least one portion of the solution provided by FIGS. 10-71. FIG. 53 depicts at least one portion of the solution provided by FIGS. 10-71, comprising function 3202

Figure 54A:
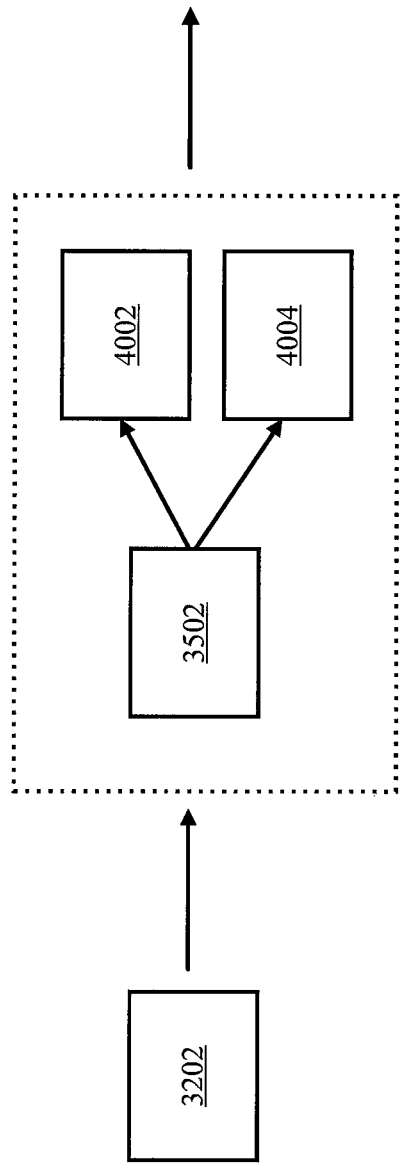
Figure 54B:
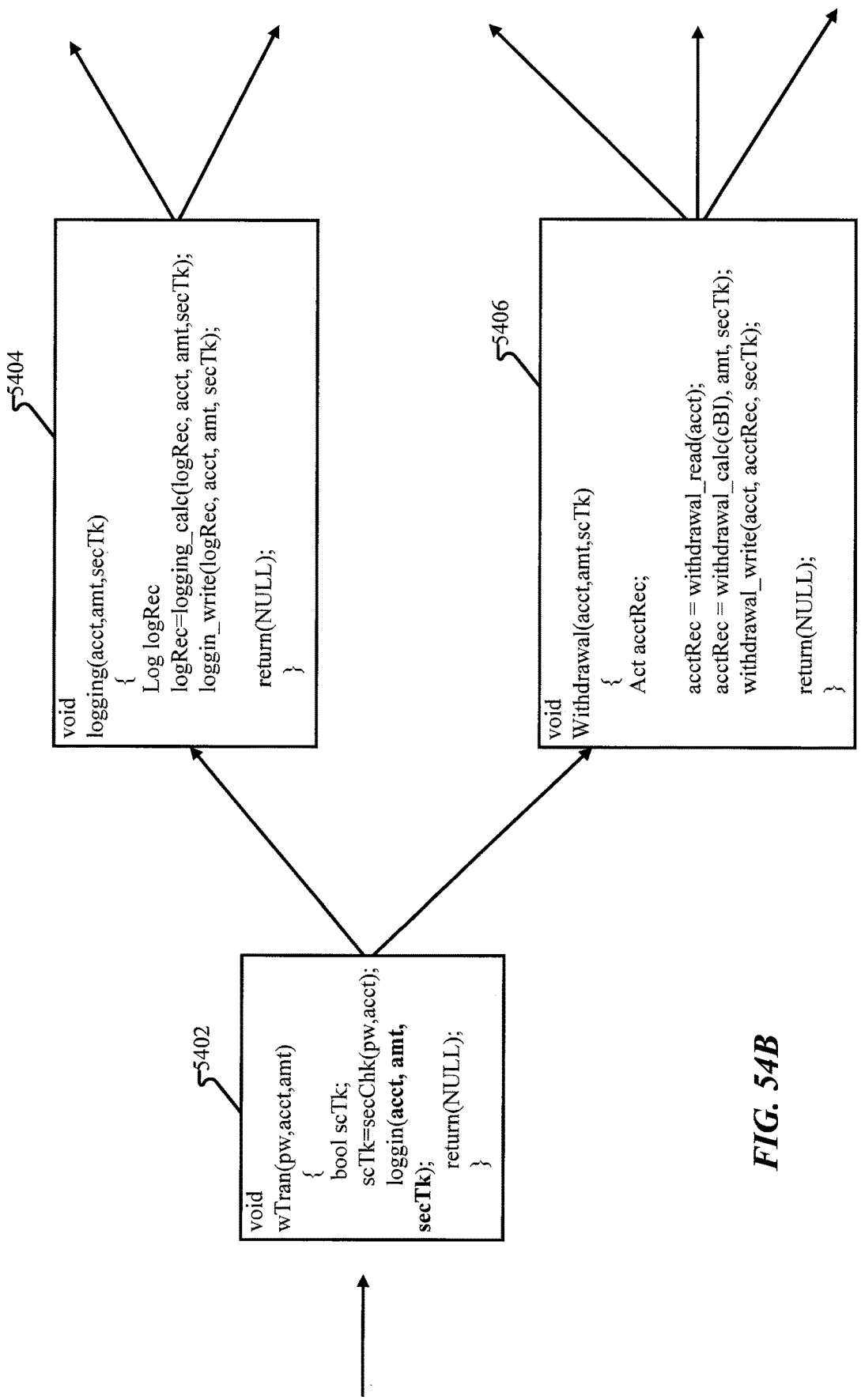
Figure 54C:
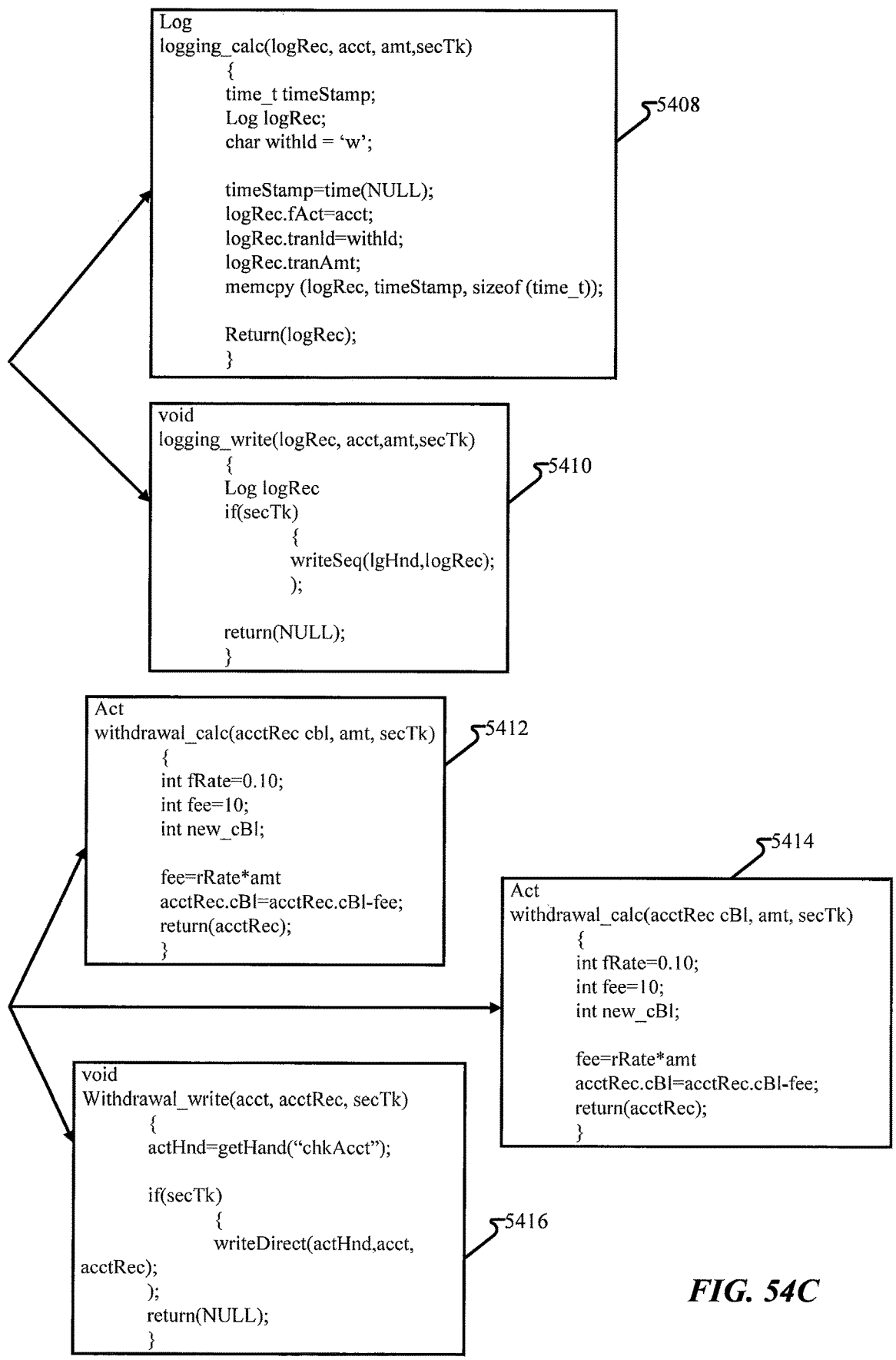

FIG. 54 is illustrated by FIG. 54A, illustrating the left-hand portion of FIG. 54, FIG. 54B, illustrating the central portion of FIG. 54, and FIG. 54C illustrating right-hand portion of FIG. 54. FIG. 54A depicts at least one portion of the solution provided by FIGS. 10-71, comprising code 3502, functions 3502, function 4002, and function 4004. FIG. 54B depicts at least one portion of the solution provided by FIGS. 10-71, comprising function 5402, function 5404, and function 5406. FIG. 54C depicts at least one portion of the solution provided by FIGS. 10-71, comprising function 5408, function 5410, function 5412, function 5414, and function 5416.

Figure 55:
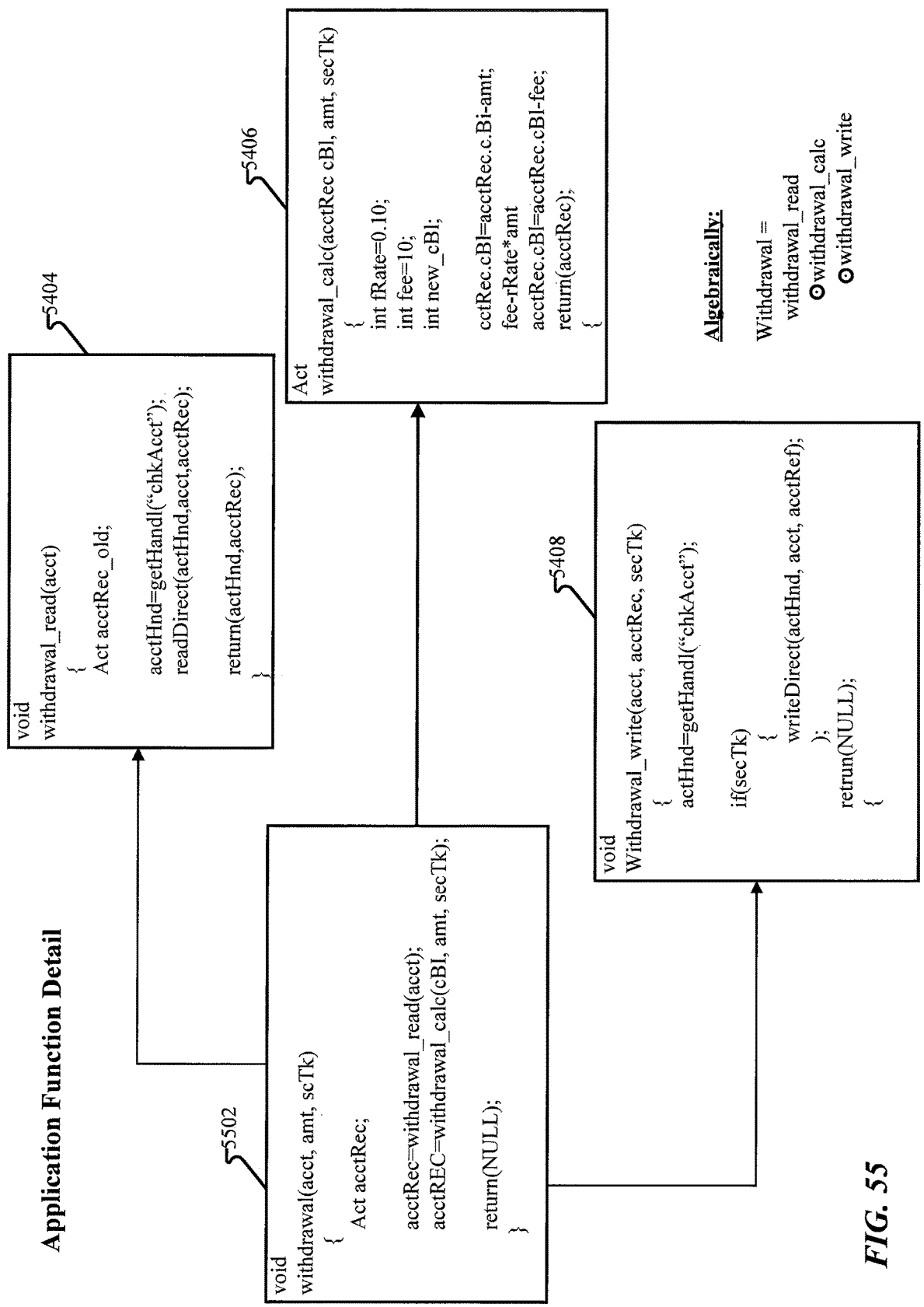
Figure 57:
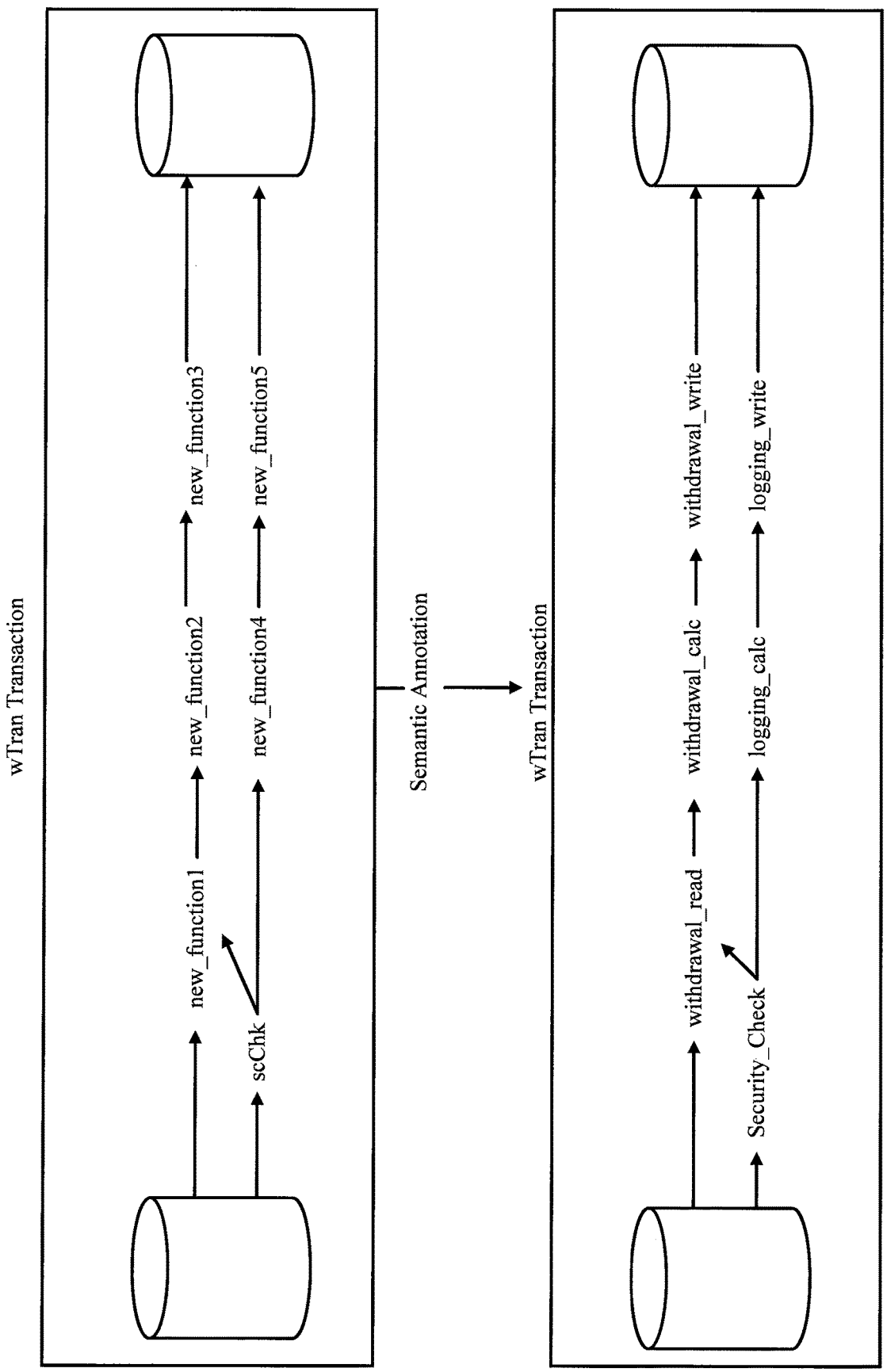
Figure 58:
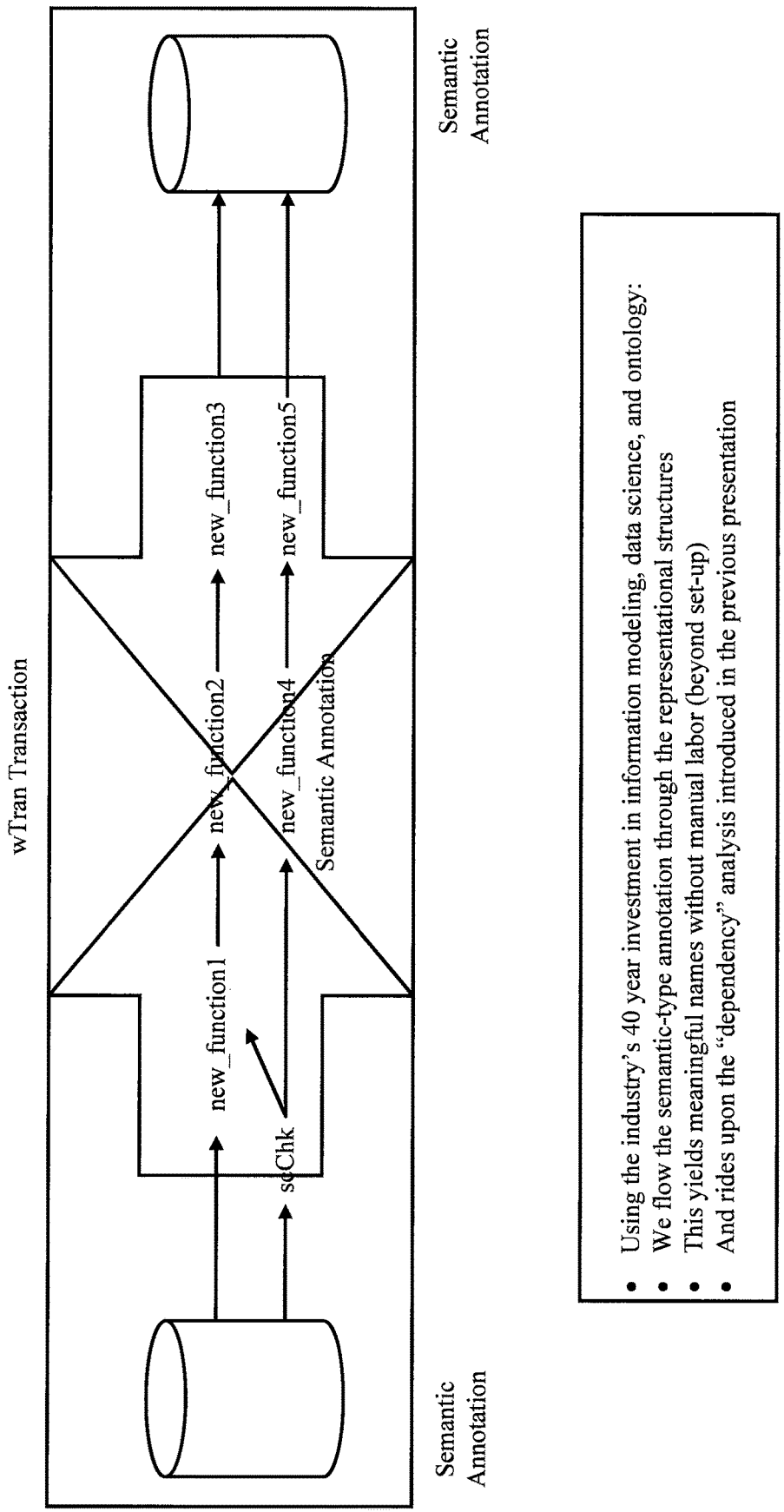
Figure 59:
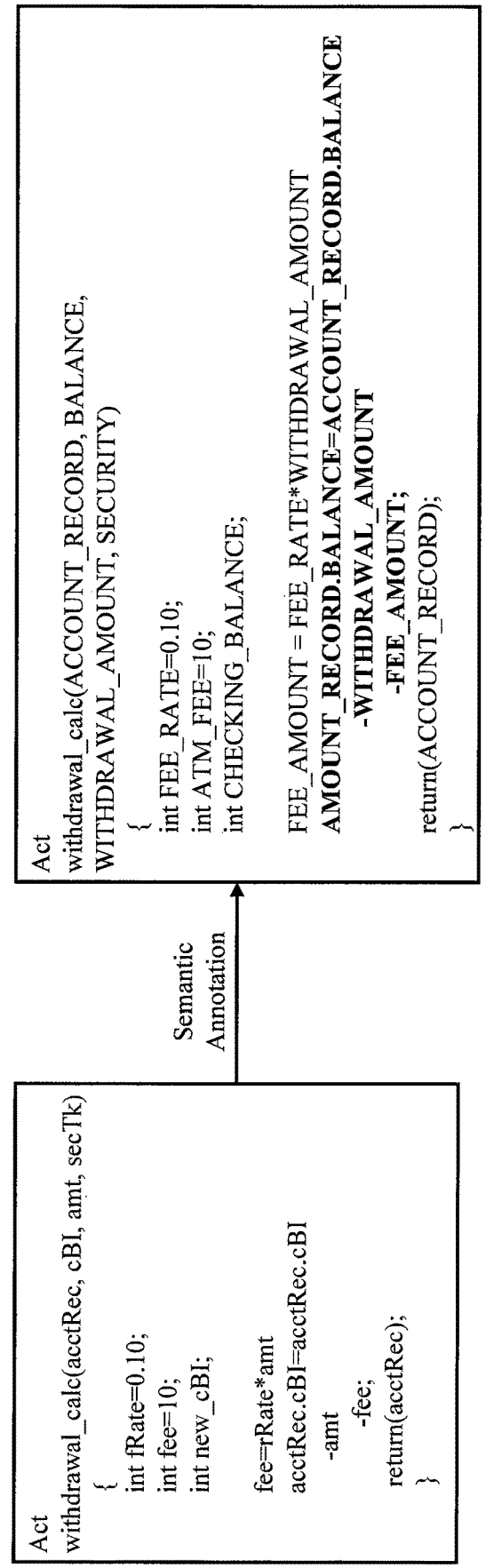

FIG. 55 depicts at least one portion of the solution provided by FIGS. 10-71, comprising function 5502, function 5404, function 5406, and function 5408. FIG. 56 depicts at least one portion of the solution provided by FIGS. 10-71. FIG. 57 depicts at least one portion of the solution provided by FIGS. 10-71. FIG. 58 depicts at least one portion of the solution provided by FIGS. 10-71. FIG. 59 depicts at least one portion of the solution provided by FIGS. 10-71. FIG. 59 depicts at least one portion of the solution provided by FIGS. 10-71.

Figure 60A:
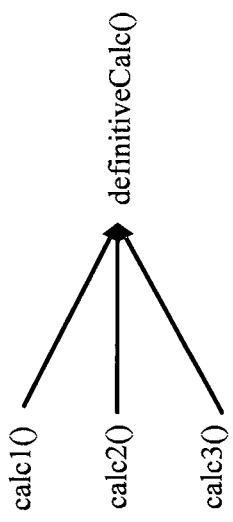
Figure 60B:
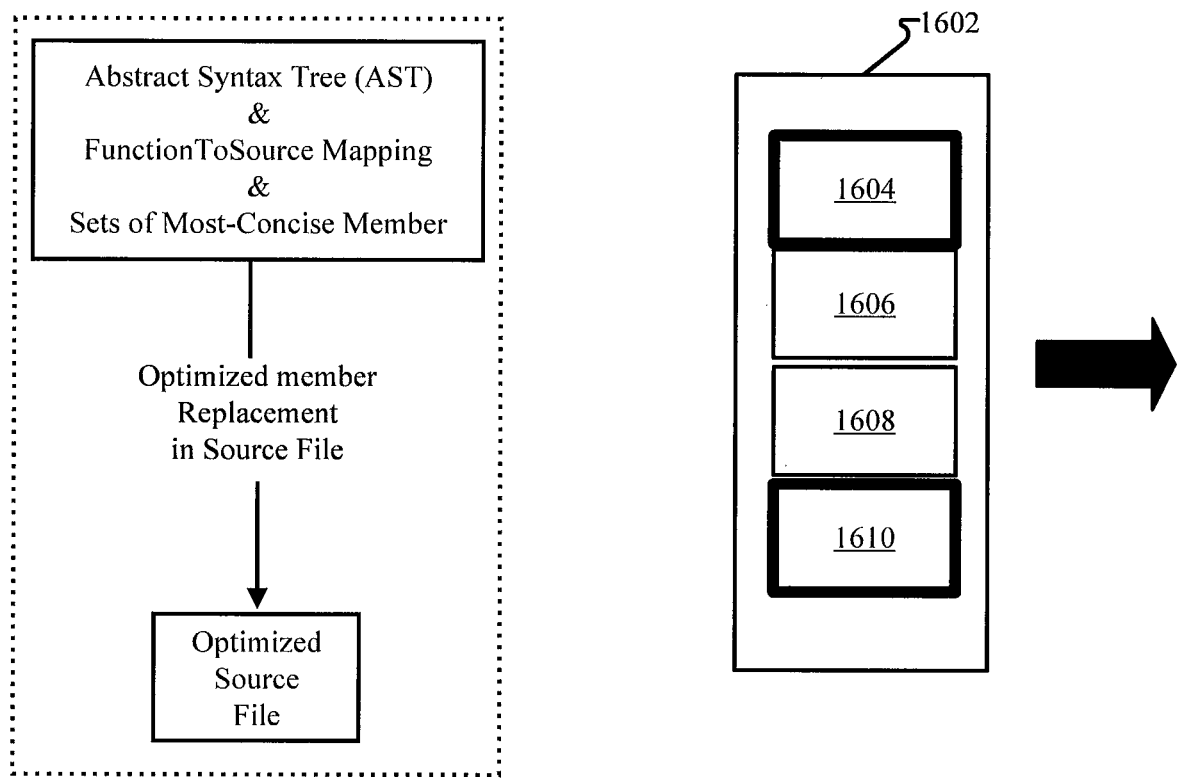
Figure 60C:

FIG. 60B depicts at least one portion of the solution provided by FIGS. 10-71, comprising code 1602 having function 1604, function 1606, function 1608, and function 1610. Function 1604 and function 1610 are emphasized. FIG. 60C depicts at least one portion of the solution provided by FIGS. 10-71, comprising function 6002. FIG. 60 is illustrated by FIG. 60A, illustrating a top portion FIG. 60 and the bottom portion of FIG. 60 being illustrated by FIG. 60B, illustrating the left-bottom portion of FIG. 60, and FIG. 60C, illustrating the right-bottom portion of FIG. 60.

Figure 62A:
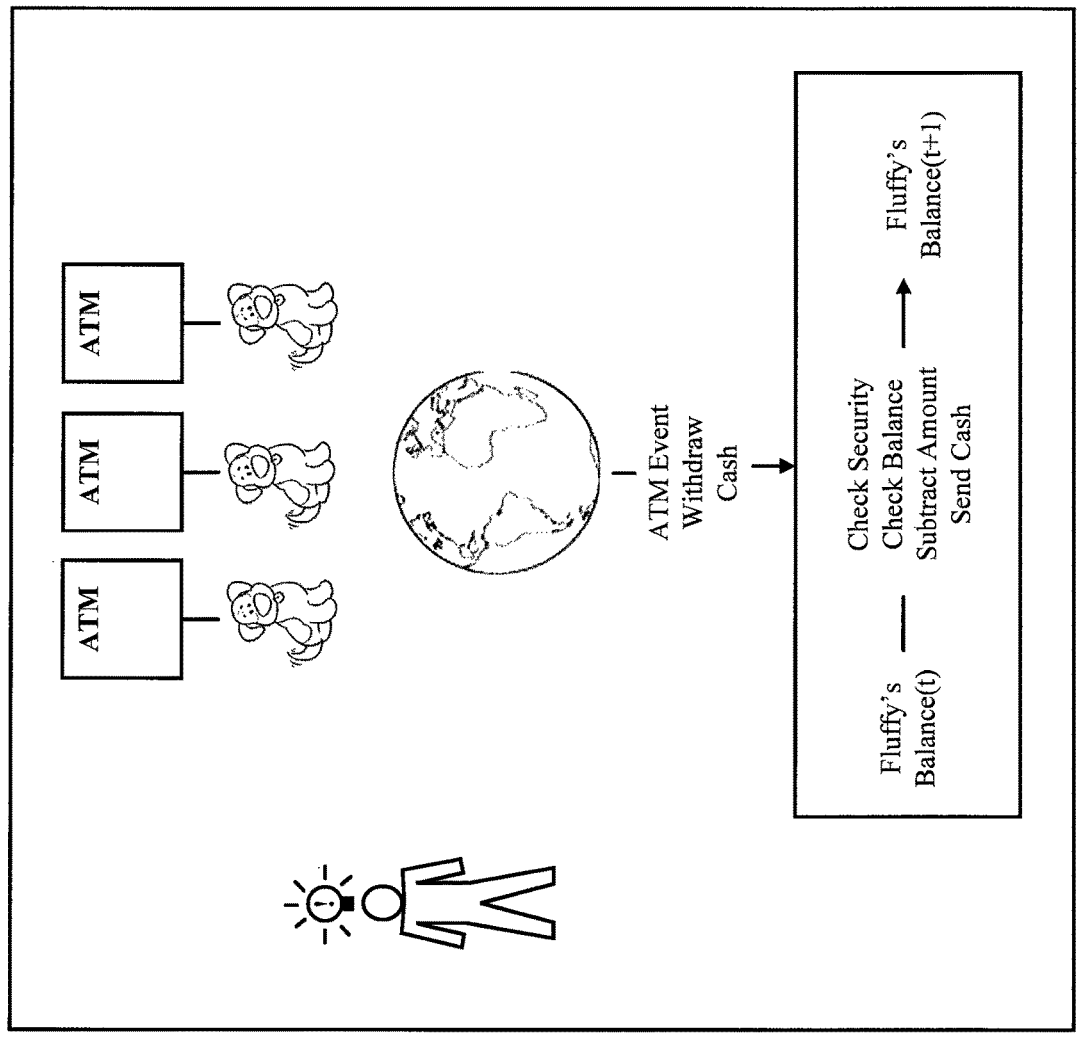
Figure 62B:
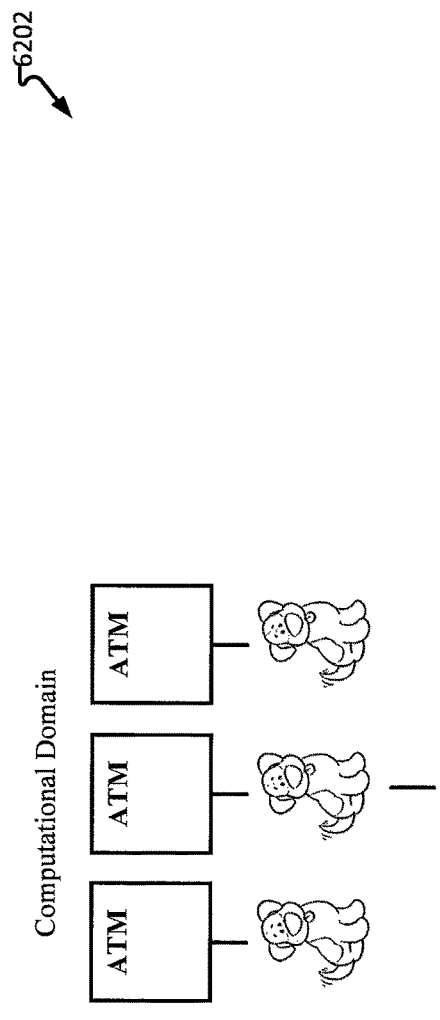
Figure 63A:
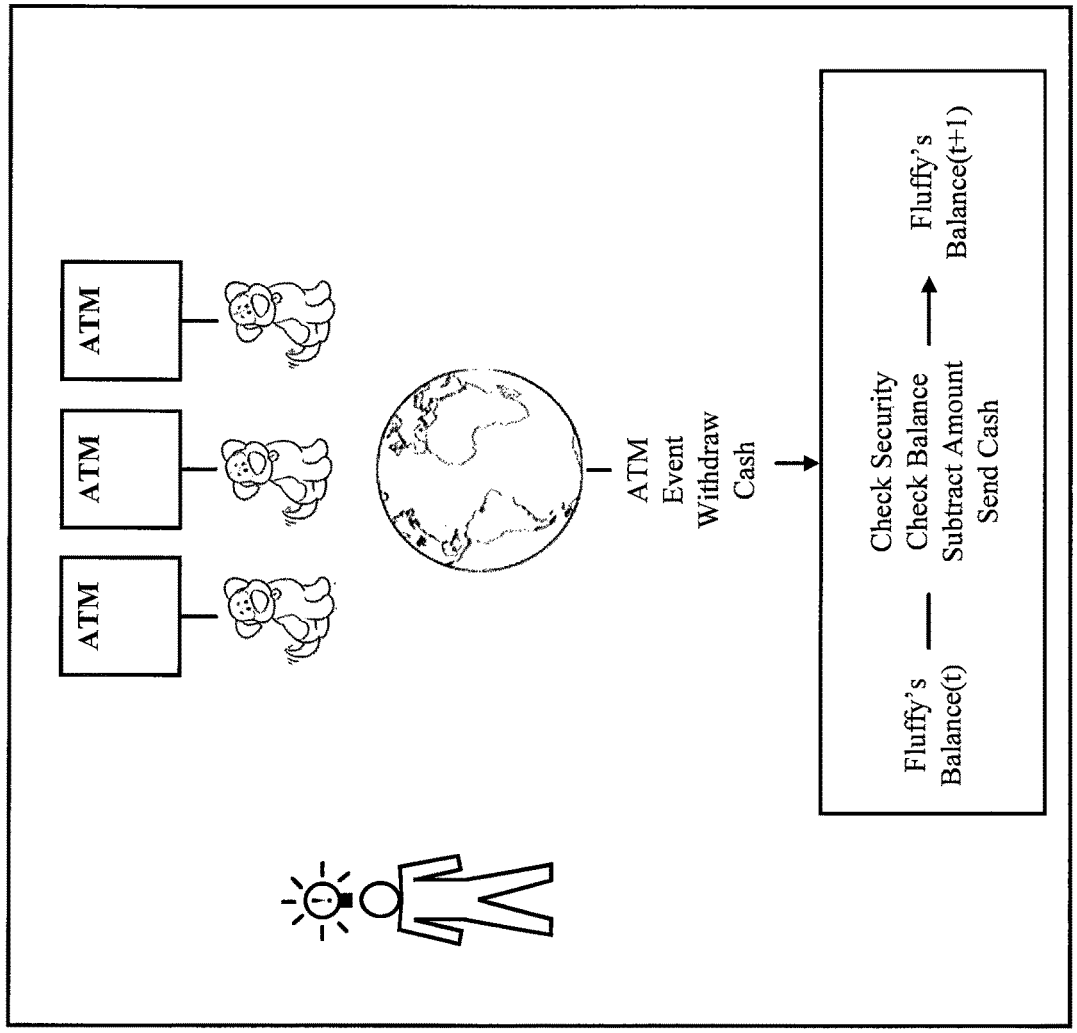
Figure 63C:
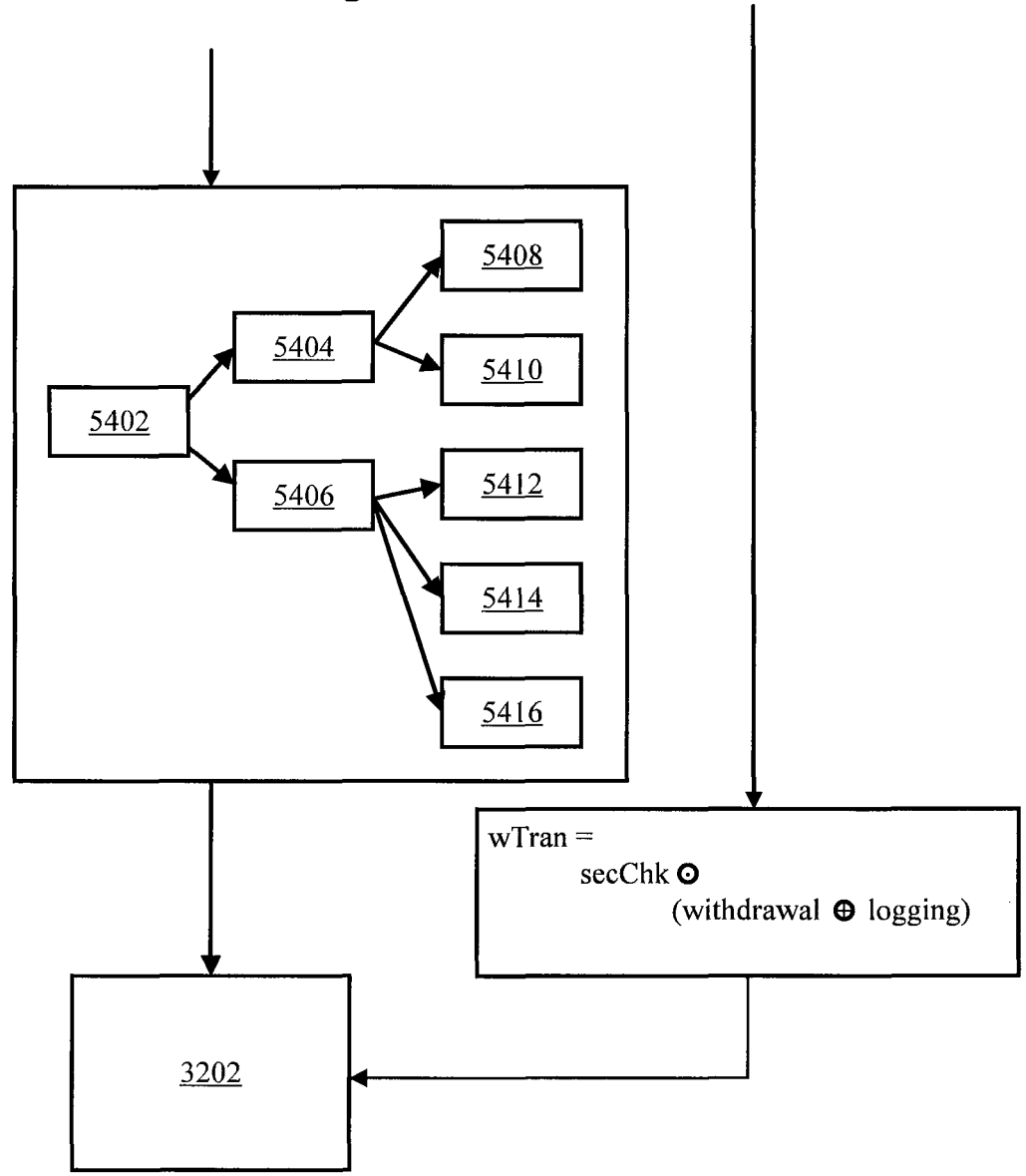

FIG. 61 depicts at least one portion of the solution provided by FIGS. 10-71. FIG. 62 depicts at least one portion of the solution provided by FIGS. 10-71, comprising interaction 6202. FIG. 62 is illustrated by FIG. 62A, illustrating the left-hand portion of FIG. 62, FIG. 62B, illustrating right-hand portion of FIG. 62. FIG. 63 depicts at least one portion of the solution provided by FIGS. 10-71, comprising code 3502 and function 5402, function 5404, function 5406, function 5408, function 5410, function 5412, function 5414, and function 5416. FIG. 63 depicts at least one portion of the solution provided by FIGS. 10-71 and is illustrated by FIG. 63A, illustrating the left-hand portion of FIG. 63 and FIG. 63B, illustrating the top-right portion of FIG. 63 and FIG. 63C illustrating the bottom-right portion of FIG. 63.

Figure 64:
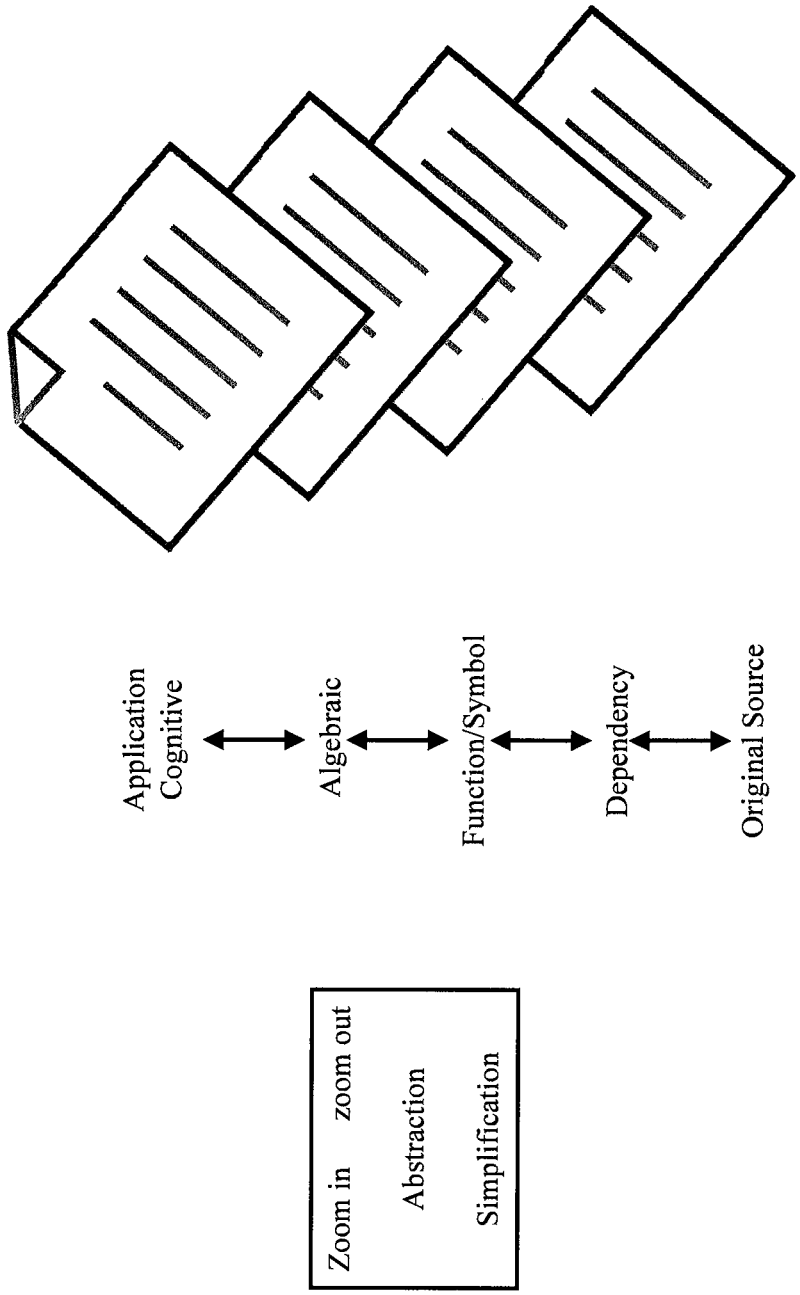
Figure 65:
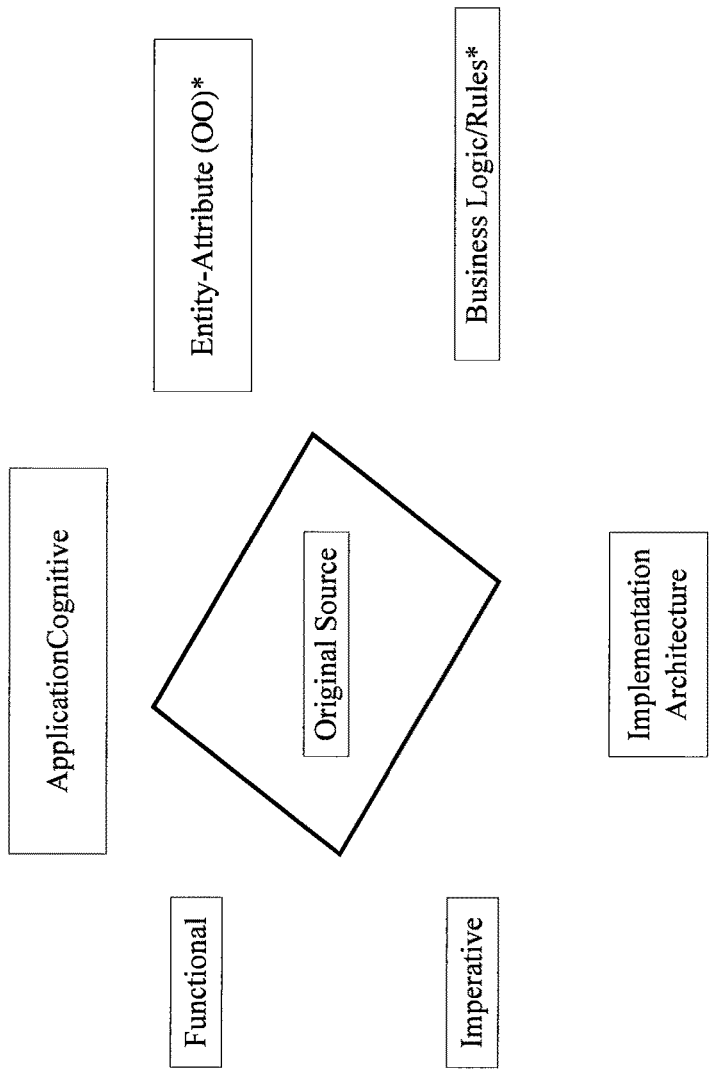
Figure 66:
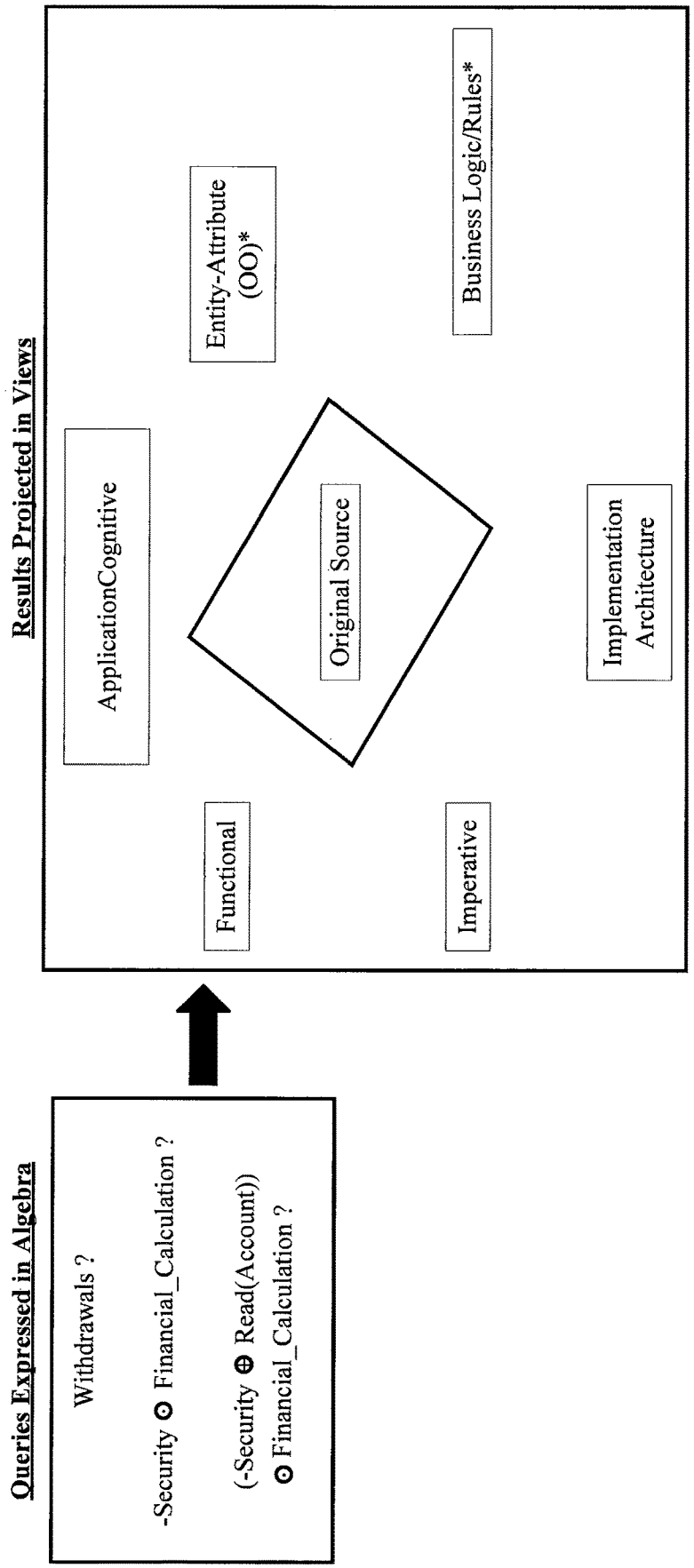
Figure 67:
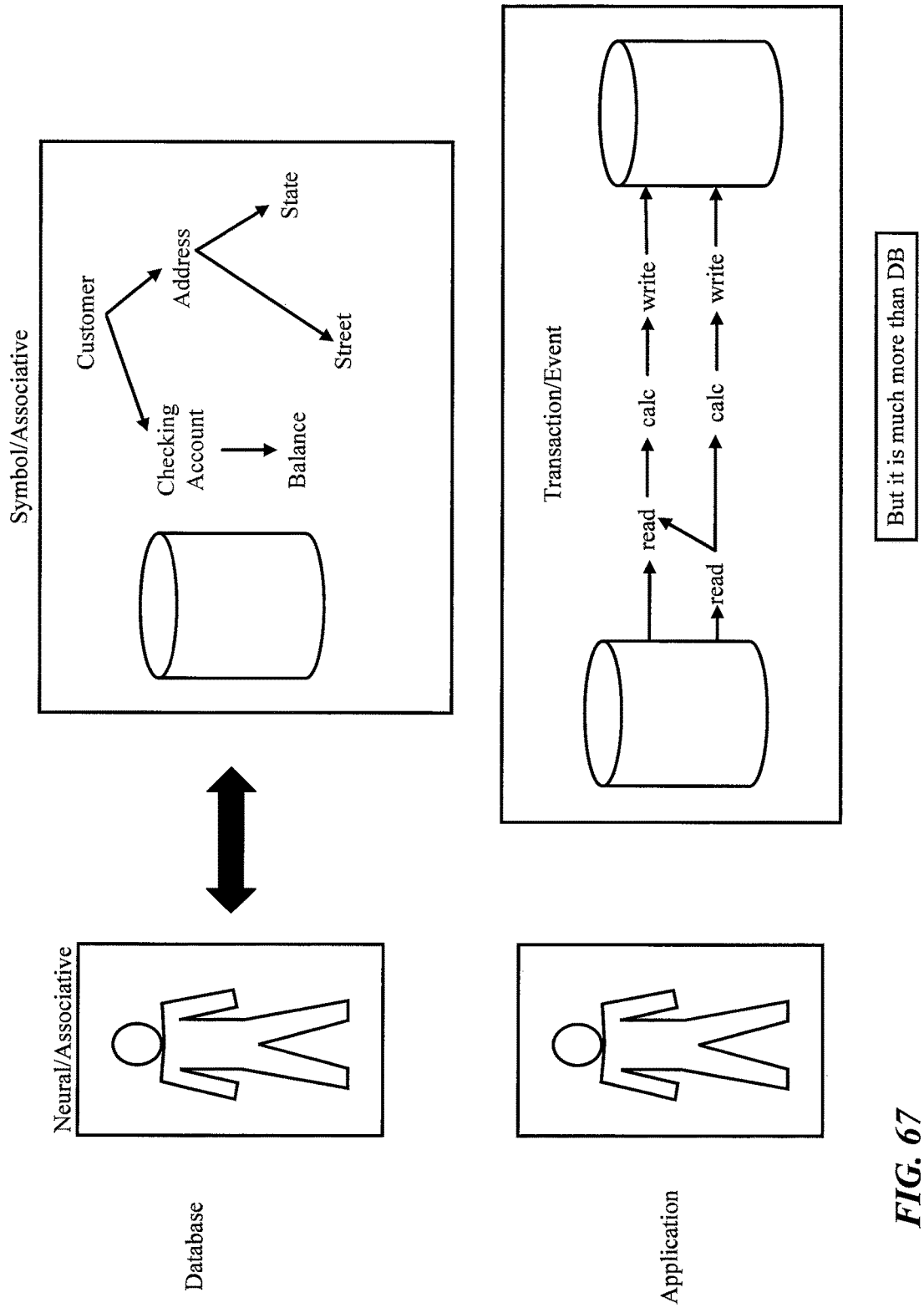

FIG. 64 depicts at least one portion of the solution provided by FIGS. 10-71. FIG. 65 depicts at least one portion of the solution provided by FIGS. 10-71. FIG. 66 depicts at least one portion of the solution provided by FIGS. 10-71. FIG. 67 depicts at least one portion of the solution provided by FIGS. 10-71.

Figure 68:
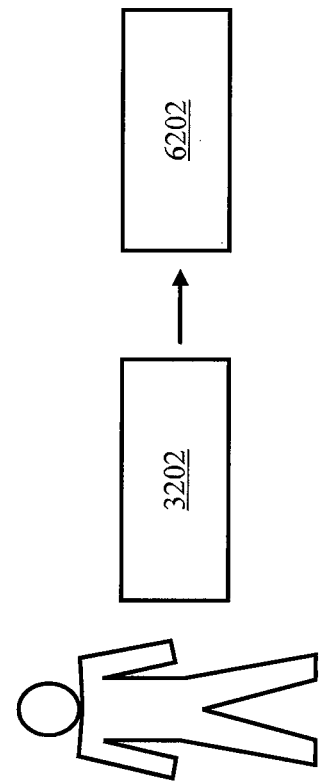

FIG. 68 depicts at least one portion of the solution provided by FIGS. 10-71, comprising code 3502 and interaction 6202. FIG. 69 depicts at least one portion of the solution provided by FIGS. 10-71. FIG. 69 is illustrated by FIG. 69A, illustrating the left-hand portion of FIG. 69 and FIG. 69B illustrating the right portion of FIG. 69. FIG. 70 depicts at least one portion of the solution provided by FIGS. 10-71. FIG. 71 depicts at least one portion of the solution provided by FIGS. 10-71.

Embodiments also disclosed include:

A method, comprising:

retrieving, by a processor from a data repository, a candidate source code, having a candidate function, and comprising a first human-readable machine instruction;

accessing, by the processor from the data repository, a preferred function comprising a second human-readable machine instruction and has been previously identified as an authorized source code;

accessing, by the processor, an equivalence limitation threshold;

automatically determining, by the processor, equivalence between the candidate function and the preferred function wherein the processor executes a plurality of processing operations, comprising the determination of equivalence between the candidate function and the preferred function, until the equivalence limitation threshold is reached;

upon equivalence being determined, automatically providing, by the processor, indicia of equivalence associated with the candidate function and the preferred function;

upon the indicia being provided, automatically transforming, by the processor, the candidate source code comprising replacing the candidate function with the preferred function; and outputting the transformed candidate source code.

Wherein the equivalence limitation threshold comprises at least one of a level of hypothesis strength, number of the processing operations required to reach the level of hypothesis strength, clock time, processor cycles, processing resources performing the processing operations in addition to the processor, and processing resources performing the processing operations excluding the processor.

Wherein the preferred function comprises human-readable elements not associated with the second human-readable machine instruction.

Wherein the step of determining equivalence fails upon determining that a number of input/output parameters differ between the candidate function and the preferred function.

Wherein the step of determining equivalence fails upon:

determining at least one input/output parameters differs between the candidate function and the preferred function; and wherein the difference comprises a difference of equivalence classes.

Providing a first machine-readable translation of the candidate function;

providing a second machine-readable translation of the preferred function;

executing both the first machine-readable translation and the second machine-readable translation with ones of a finite set of inputs; and determining equivalence upon the step of executing both the first machine-readable translation and the second machine-readable translation each outputting equivalent values from each of the first machine-readable translation and the second machine-readable translation of the candidate function.

Wherein the step of determining equivalence further comprises:

deriving a logic equation for the candidate function;
accessing a logic equation for the preferred function; and
wherein equivalence is failed to be determined upon the logic equation for the candidate function being determined to be different from the logic equation for the preferred function.

Wherein the determination of whether the logic equation of the candidate function is determined to be equivalent to the logic equation of the preferred function further comprises:

providing the logic equation for the candidate function and the logic equation for the preferred function to an automated theorem prover; and
receiving indicia from the automated theorem prover indicating equivalence.

Wherein the preferred function comprises a set of instructions, that when converted to machine code, cause a machine to perform the preferred function in a previously identified optimal manner.

Wherein the previously identified optimal manner comprises an identified manner compliant with at least one security objective.

Wherein the machine comprises a processor and the previously identified optimal manner comprises an identified number of processor operations.

Wherein the machine comprises a memory and the previously identified optimal manner comprises an identified size of the memory required to store the machine code.

Wherein the preferred function comprises a set of instructions previously identified as a concise source code.

Wherein the step of determining equivalence further comprises:

generating, from the candidate function, a set of equivalence classes for the candidate function, the equivalence classes comprising a set of equivalent functions, each element of the set having a function-to-source mapping.

Wherein the preferred function comprises a most-concise member selected in accordance with an abstract syntactic structure determination of equivalence between the candidate function and the preferred function.

Wherein the abstract syntactic structure comprises an abstract syntax tree (AST).

A system, comprising:

a processor, the processor further comprising a memory and a first communication interface;
a data repository, the data repository having a second accessible communication interface;
the processor:
retrieves, via the first and second communication interface, a candidate source code, having a candidate function, and comprising a first human-readable machine instruction;
accesses a preferred function comprising a second human-readable machine instruction and has been previously identified as an authorized source code;
accesses an equivalence limitation threshold;
determines equivalence between the candidate function and the preferred function wherein the processor executes a plurality of processing operations, comprising the determination of equivalence between the candidate function and the preferred function, until the equivalence limitation threshold is reached;
upon equivalence being determined, create and provide indicia of equivalence associated with the candidate function and the preferred function;
upon the indicia being provided, transform the candidate source code comprising replacing the candidate function with the preferred function; and
outputting, via the first communication interface, the transformed candidate source code.

A non-transitory computer readable medium with instructions thereon that, when executed by a computer cause the computer to:

retrieve from a data repository a candidate source code, having a candidate function, and comprising a first human-readable machine instruction;
accesses from the data repository a preferred function comprising a second human-readable machine instruction and has been previously identified as an authorized source code;
accesses an equivalence limitation threshold;
automatically determine equivalence between the candidate function and the preferred function by executing a plurality of processing operations, comprising the determination of equivalence between the candidate function and the preferred function, until the equivalence limitation threshold is reached;
upon equivalence being determined, automatically providing, by the processor, indicia of equivalence associated with the candidate function and the preferred function;
upon the indicia being provided, automatically transforming, by the processor, the candidate source code comprising replacing the candidate function with the preferred function; and
output the transformed candidate source code.

In addition to the forgoing, other embodiments are also contemplated by the embodiments disclosed herein. For example, a function may be a preferred function based upon comments (e.g., internal documentation). In another embodiment, a function may be preferred based upon being vetted and approved, and therefore a known function, versus an unvetted and/or unapproved, and therefore an unknown function.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such electrical circuitry embodied as a general-purpose or special-purpose processor (GPU or CPU), or logic circuits programmed with the instructions to perform the methods (FPGA). The machine comprises and/or accesses, via an electrical and/or optical communication interface, data and/or instruction storage components via an interface. These machine-executable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process, which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Additionally, the systems, methods and protocols can be implemented to improve one or more of a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a modem, a transmitter/receiver, any comparable means, or the like. In general, any device capable of implementing a state machine that is in turn capable of implementing the methodology illustrated herein can benefit from the various communication methods, protocols and techniques according to the disclosure provided herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, Broadcom® AirForce BCM4704/BCM4703 wireless networking processors, the AR7100 Wireless Network Processing Unit, other industry-equivalent processors, and may perform computational functions using any known or future-developed standard, instruction set, libraries, and/or architecture.

Furthermore, the disclosed methods may be readily implemented in software using objects of a object-oriented software language that provide portable source code that can be used on a variety of computer or workstation platforms. Alternatively, the disclosed system may be implemented partially or fully in hardware using standard logic circuits or VLSI design. Whether software or hardware is used to implement the systems in accordance with the embodiments is dependent on the speed and/or efficiency requirements of the system, the particular function, and the particular software or hardware systems or microprocessor or microcomputer systems being utilized. The communication systems, methods, and protocols illustrated herein can be readily implemented in hardware and/or software using any known or later developed systems or structures, devices and/or software by those of ordinary skill in the applicable art from the functional description provided herein and with a general basic knowledge of the computer and telecommunications arts.

Moreover, the disclosed methods may be readily implemented in software and/or firmware that can be stored on a storage medium to improve the performance of: a programmed general-purpose computer with the cooperation of a controller and memory, a special purpose computer, a microprocessor, or the like. In these instances, the systems and methods can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications transceiver.

Various embodiments may also or alternatively be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

Provided herein are exemplary systems and methods for machine-based instruction editing. While the embodiments have been described in conjunction with a number of embodiments, it is evident that many alternatives, modifications, and variations would be or are apparent to those of ordinary skill in the applicable arts. Accordingly, this disclosure is intended to embrace all such alternatives, modifications, equivalents and variations that are within the spirit and scope of this disclosure.

The invention claimed is:
1. A method comprising:
retrieving, by a processor from a data repository, candidate code, having a candidate relation, and comprising a first human-readable machine instruction;
accessing, by the processor from the data repository, a preferred relation comprising a second human-readable machine instruction that has been previously identified as authorized code;
accessing, by the processor, an equivalence limitation threshold,
automatically determining, by the processor, equivalence between the candidate relation and the preferred relation including:
deriving a logic equation for the candidate relation; and accessing a logic equation for the preferred relation, wherein equivalence is failed to be determined upon the logic equation for the candidate relation being determined to be different from the logic equation for the preferred relation, wherein the processor then further executes a plurality of processing operations, comprising the determination of equivalence between the candidate relation and the preferred relation, until the equivalence limitation threshold to reached, upon equivalence being determined, automatically providing, by the processor, indicia of equivalence associated with the candidate relation and the preferred relation;

upon the indicia being provided, automatically transforming, by the processor, the candidate code comprising replacing the candidate relation with the preferred relation, and outputting the transformed candidate code; and wherein the equivalence limitation threshold comprises at least one of: a level of hypothesis strength, number of the processing operations required to reach the level of hypothesis strength, clock time, processor cycles, processing resources performing the processing operations in addition to the processor, and processing resources performing the processing operations excluding the processor.

2. The method of claim 1, wherein the preferred relation comprises puma readable elements not associated with the second human-readable machine instruction.

3. The method of claim 1, wherein the step of determining equivalence fails upon determining that at least one input/output parameter differs between the candidate relation and the preferred relation.

4. The method of claim 1, wherein the step of determining equivalence fails upon:

determining at least one input/output parameters differs between the candidate relation and the preferred relation; and wherein the difference comprises at least a difference of equivalence classes.

5. The method of claim 1, providing a first machine-readable translation of the candidate relation;

providing a second machine-readable translation of the preferred relation;

executing both the first machine-readable translation and the second machine-readable translation with ones of a finite set of inputs; and determining equivalence upon the step of executing both the first machine-readable translation and the second machine-readable translation each outputting equivalent values from each of the first machine-readable translation and the second machine-readable translation of the candidate relation.

6. The method of claim 1, wherein the determination of whether the logic equation of the candidate relation is determined to be equivalent to the logic equation of the preferred relation further comprises:

providing the logic equation for the candidate relation and the logic equation for the preferred relation to an automated theorem prover; and receiving indicia from the automated theorem prover indicating whether there is equivalence.

7. The method of claim 1, wherein the preferred relation comprises a set of instructions, that when converted to machine code, cause a machine to perform the preferred relation in a previously identified manner.

8. The method of claim 7, wherein the previously identified manner comprises an identified manner compliant with at least one security objective.

9. The method of claim 7, wherein the machine comprises a processor and the previously identified optimal manner comprises an identified number of processor operations.

10. The method of claim 7, wherein the machine comprises a memory and the previously identified manner comprises an identified size of the memory required to store the machine code.

11. The method of claim 1, wherein the preferred relation comprises a set of instructions previously identified as concise source code.

12. The method of claim 1, wherein the step of determining equivalence further comprises:

generating, from the candidate relation, a set of equivalence classes for the candidate relation, the equivalence classes comprising a set of equivalent relations, each element of the set having a relation-tip-source mapping.

13. The method of claim 1, wherein the preferred relation comprises a most-concise member selected in accordance with an abstract syntactic structure determination of equivalence between the candidate relation and the preferred relation.

14. The method of claim 13, wherein the abstract syntactic structure comprises an abstract syntax tree (AST).

15. A system comprising:

a processor and a memory in communication with a first communication interface;

a data repository, the data repository having a second communication interface;

the processor configured to:

retrieve, via the first and second communication interface, a candidate cade, having a candidate relation, and comprising a first human-readable machine instruction;

access a preferred relation comprising a second human-readable machine instruction and has been previously identified as authorized cade;

access an equivalence limitation threshold;

determine equivalence between the candidate relation and the preferred relation including deriving a logic equation for the candidate relation and accessing a logic equation for the preferred relation, wherein equivalence is failed to be determined upon the logic equation for the candidate relation being determined to be different from the logic equation for the preferred relation, wherein the processor then further executes a plurality of processing operations, comprising the determination of equivalence between the candidate relation and the preferred relation, until the equivalence limitation threshold is reached;

upon equivalence being determined, create and provide indicia of equivalence associated with the candidate relation and the preferred relation;

upon the indicia being provided, transform the candidate code comprising replacing the candidate relation with the preferred relation; and outputting, via the first communication interface, the transformed candidate cade; and wherein the equivalence limitation threshold comprises at least one of: a level of hypothesis strength, number of the processing operations required to reach the level of hypothesis strength, clock time, processor cycles, processing resources performing the processing operations in addition to the processor, and processing resources performing the processing operations excluding the processor.

16. The system of claim 15, wherein the preferred relation comprises human-readable elements not associated with the second human-readable machine instruction.

17. The system of claim 15, wherein determining equivalence fails upon determining that a number of input/output parameters differ between the candidate relation and the preferred relation.

18. The system of claim 15, wherein determining equivalence fails upon:
   the processor determining at least one input/output parameter differs between the candidate relation and the preferred relation; and
   wherein the difference comprises a difference of equivalence classes.

19. E system of claim 15, wherein the processor further:
   provides a first machine-readable translation of the candidate relation;
   provides a second machine-readable translation of the preferred relation;
   executes both the first machine-readable translation and the second machine-readable translation with ones of a finite set of inputs; and
   determines equivalence upon the step of executing both the first machine-readable translation and the second machine-readable translation each outputting equivalent values from each of the first machine-readable translation and the second machine-readable translation of the candidate relation.

20. The system of claim 15, wherein the determination of whether the logic equation of the candidate relation is determined to be equivalent to the logic equation of the preferred relation further comprises:
   the processor providing the logic equation for the candidate relation and the logic equation for the preferred relation to an automated theorem prover; and
   the processor receiving indicia from the automated theorem prover indicating equivalence.

* * * * *